(12) United States Patent
Pena et al.

(10) Patent No.: US 11,727,958 B2
(45) Date of Patent: *Aug. 15, 2023

(54) REAL TIME VIDEO SPECIAL EFFECTS SYSTEM AND METHOD

(71) Applicants: Henry M. Pena, Round Rock, TX (US); Thomas F. Bryant, III, Round Rock, TX (US)

(72) Inventors: Henry M. Pena, Round Rock, TX (US); Thomas F. Bryant, III, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,271

(22) Filed: May 23, 2022

(65) Prior Publication Data

US 2022/0284925 A1  Sep. 8, 2022

Related U.S. Application Data

(63) Continuation of application No. 16/936,350, filed on Jul. 22, 2020, now Pat. No. 11,367,465, which is a
(Continued)

(51) Int. Cl.
*H04N 23/667* (2023.01)
*G11B 27/028* (2006.01)
(Continued)

(52) U.S. Cl.
CPC .......... *G11B 27/028* (2013.01); *G06F 3/0484* (2013.01); *H04N 23/667* (2023.01); *H04N 23/951* (2023.01); *G11B 27/34* (2013.01)

(58) Field of Classification Search
CPC ... G06F 3/0484; G11B 27/005; G11B 27/028; G11B 27/031; G11B 27/34; H04N 5/232;
(Continued)

(56) References Cited

U.S. PATENT DOCUMENTS 1,042,012 A  10/1912  Leuthesser
1,132,015 A  3/1915  Jacobus
(Continued)

FOREIGN PATENT DOCUMENTS

AU  2014259879 A1  11/2015
EP  1531474 A1  5/2005
(Continued)

OTHER PUBLICATIONS

Non Final Rejection dated Oct. 2, 2019, on a U.S. Appl. No. 16/456,589, filed Jun. 28, 2019.
(Continued)

*Primary Examiner* — Antoinette T Spinks
(74) *Attorney, Agent, or Firm* — Franklin & Associates International Inc; Matthew F. Lambrinos

(57) ABSTRACT

The present technology is a video recording system and method of recording a video while applying special effects in real time prior to and/or while recording. The system includes a processing unit in communication with a camera and a memory unit. The processor receives a raw video data at a native speed rate from the camera or remote video stream, and an input from an interface. The system determines if the native speed rate of the raw video data is to be changed, and if so then modifies at least one frame in the raw video data to create a modified video data at a modified speed rate that is different to the native speed rate. The system then generates an output video recording data and writes it to memory. This allows for the continuous recording of video from the camera or video feed at different speed rates without altering camera operations or settings.

22 Claims, 28 Drawing Sheets

Related U.S. Application Data continuation of application No. 16/456,589, filed on Jun. 28, 2019, now Pat. No. 10,755,743, which is a continuation of application No. 16/173,033, filed on Oct. 29, 2018, now Pat. No. 10,388,322.

(51) Int. Cl.
  *G06F 3/0484* (2022.01)
  *H04N 23/951* (2023.01)
  *G11B 27/34* (2006.01)

(58) Field of Classification Search
  CPC ........... H04N 5/23232; H04N 5/23245; H04N 5/772; H04N 5/783; H04N 9/8205; H04N 23/60; H04N 23/667; H04N 23/951
  See application file for complete search history.

(56) References Cited

U.S. PATENT DOCUMENTS

| | | | |
|---|---|---|---|
| 1,162,014 A | 11/1915 | Arrighi | |
| 3,282,003 A | 11/1966 | Laurence, Jr. | |
| 4,282,011 A | 8/1981 | Terpay | |
| 4,302,013 A | 11/1981 | Kavis | |
| 5,182,005 A | 1/1993 | Schwiegk et al. | |
| 5,192,005 A | 3/1993 | Zimmerman | |
| 6,132,013 A | 10/2000 | Ganzel | |
| 6,302,014 B1 | 10/2001 | Kuan | |
| 6,424,789 B1 | 7/2002 | Abdel-Mottaleb | |
| 6,546,188 B1 | 4/2003 | Ishii et al. | |
| 6,590,586 B1 | 7/2003 | Swenton-Wall et al. | |
| 7,102,014 B2 | 9/2006 | Weber et al. | |
| 7,136,093 B1 | 11/2006 | Itch et al. | |
| 7,142,016 B2 | 11/2006 | Kim | |
| 7,152,209 B2 | 12/2006 | Jojic et al. | |
| 8,122,378 B2 | 2/2012 | Ciudad et al. | |
| 8,132,012 B2 | 3/2012 | Labaton | |
| 8,202,013 B2 | 6/2012 | Kubota | |
| 8,249,299 B1 | 8/2012 | Dhawan et al. | |
| 8,292,017 B2 | 10/2012 | Inoue et al. | |
| 8,515,241 B2 | 8/2013 | Forsyth et al. | |
| 8,934,762 B2 | 1/2015 | Schmit et al. | |
| 9,077,957 B2 | 7/2015 | Kano | |
| 9,208,819 B1 | 12/2015 | Gregg et al. | |
| 9,302,004 B2 | 4/2016 | Baumler et al. | |
| 9,749,676 B2 | 8/2017 | Sood et al. | |
| 9,756,091 B1 | 9/2017 | Davies | |
| 10,070,044 B2 | 9/2018 | Shimosato | |
| 10,098,204 B1 | 10/2018 | Byers et al. | |
| 10,252,016 B2 | 4/2019 | Pedro et al. | |
| 10,272,009 B2 | 4/2019 | Schem | |
| 10,372,052 B2 | 8/2019 | Zwartz et al. | |
| 10,388,322 B1 | 8/2019 | Pena et al. | |
| 10,404,767 B2 | 9/2019 | Chen | |
| 10,404,923 B1 | 9/2019 | Pena | |
| 10,433,400 B1 | 10/2019 | Byers et al. | |
| 10,534,525 B1 | 1/2020 | Suchland | |
| 10,600,220 B2 | 3/2020 | Choi et al. | |
| 10,659,499 B2 | 5/2020 | Davies | |
| 10,734,025 B2 | 8/2020 | Bradley et al. | |
| 10,755,743 B2 | 8/2020 | Pena et al. | |
| 10,771,736 B2 | 9/2020 | Inkpen et al. | |
| 10,863,109 B2 | 12/2020 | Pena et al. | |
| 11,044,420 B2 | 6/2021 | Pena et al. | |
| 11,218,646 B2 | 1/2022 | Pena et al. | |
| 11,367,465 B2 | 6/2022 | Pena et al. | |
| 2003/0052909 A1 | 3/2003 | Mo et al. | |
| 2004/0189691 A1 | 9/2004 | Jojic et al. | |
| 2005/0053356 A1 | 3/2005 | Mate et al. | |
| 2005/0108765 A1 | 5/2005 | Barletta et al. | |
| 2006/0277454 A1 | 12/2006 | Chen | |
| 2007/0074115 A1 | 3/2007 | Patten et al. | |
| 2008/0307307 A1 | 2/2008 | Ciudad et al. | |
| 2008/0184121 A1 | 7/2008 | Kulas | |
| 2009/0058842 A1 | 3/2009 | Bull et al. | |
| 2010/0172624 A1 | 7/2010 | Watts | |
| 2010/0302059 A1 | 12/2010 | Hnatiuk et al. | |
| 2011/0097059 A1 | 4/2011 | Sekiguchi et al. | |
| 2012/0079386 A1 | 3/2012 | Kim et al. | |
| 2012/0274662 A1 | 11/2012 | Kim et al. | |
| 2012/0301114 A1 | 11/2012 | Johnson | |
| 2013/0148940 A1 | 6/2013 | Schmit et al. | |
| 2013/0163955 A1 | 6/2013 | Yamamoto | |
| 2013/0194476 A1 | 8/2013 | Shimosato | |
| 2014/0035944 A1 | 2/2014 | Kulkarni | |
| 2014/0099074 A1 | 4/2014 | Kano | |
| 2014/0193140 A1 | 7/2014 | Fliderman et al. | |
| 2014/0237365 A1 | 8/2014 | Oberbrunner et al. | |
| 2014/0355960 A1 | 12/2014 | Paulus et al. | |
| 2014/0355961 A1 | 12/2014 | Paulus et al. | |
| 2014/0359447 A1 | 12/2014 | Kannan et al. | |
| 2014/0359448 A1 | 12/2014 | Paulus et al. | |
| 2015/0212667 A1 | 7/2015 | Holt et al. | |
| 2015/0212694 A1 | 7/2015 | Ho | |
| 2015/0213840 A1 | 7/2015 | Holt et al. | |
| 2015/0261305 A1 | 9/2015 | Lee et al. | |
| 2015/0318020 A1 | 11/2015 | Pribula | |
| 2015/0381930 A1 | 12/2015 | Quinn et al. | |
| 2016/0259412 A1 | 9/2016 | Flint et al. | |
| 2016/0315986 A1 | 10/2016 | Chen | |
| 2017/0034444 A1 | 2/2017 | Song et al. | |
| 2018/0033173 A1 | 2/2018 | Choi et al. | |
| 2018/0158486 A1 | 6/2018 | Gilley | |
| 2019/0237104 A1 | 8/2019 | Jeon et al. | |
| 2019/0289271 A1 | 9/2019 | Paulus et al. | |
| 2020/0092493 A1 | 3/2020 | McCauley | |
| 2020/0196004 A1 | 6/2020 | Kulas | |
| 2020/0311120 A1 | 10/2020 | Zhao et al. | |
| 2020/0382723 A1 | 12/2020 | Pena et al. | |
| 2020/0411057 A1 | 12/2020 | Gilley | |
| 2021/0051278 A1 | 2/2021 | Pena et al. | |
| 2021/0160435 A1 | 5/2021 | Pena et al. | |
| 2022/0124258 A1 | 4/2022 | Pena et al. | |
| 2022/0284925 A1 | 9/2022 | Pena et al. | |

FOREIGN PATENT DOCUMENTS

| | | |
|---|---|---|
| EP | 3874736 A1 | 9/2021 |
| EP | 3874762 A2 | 9/2021 |
| JP | 6012384 B2 | 10/2016 |
| WO | 2011052045 A1 | 5/2011 |
| WO | 2014179466 A1 | 11/2014 |
| WO | 2016112346 A1 | 7/2016 |
| WO | 2018034371 A1 | 2/2018 |
| WO | 2020092326 A1 | 5/2020 |
| WO | 20202292301 A2 | 5/2020 |
| WO | 2021167595 A1 | 8/2021 |
| WO | 2022040308 A1 | 2/2022 |

OTHER PUBLICATIONS

Notice of Allowance dated Apr. 15, 2020, on a U.S. Appl. No. 16/456,589, filed Jun. 28, 2019.
Non Final Rejection dated May 25, 2021, on a U.S. Appl. No. 16/936,350, filed Jul. 22, 2020.
Notice of Allowance dated Feb. 23, 2022, on a U.S. Appl. No. 16/936,350, filed Jul. 22, 2020.
Notice of Allowance dated Jun. 5, 2019, on a U.S. Appl. No. 16/173,033, filed Oct. 29, 2018.
International Search Report dated May 26, 2020, on a PCT No. PCT/US2020/018709, filed Feb. 18, 2020.
Written Opinion dated May 26, 2020, on a PCT No. PCT/US2020/018709, filed Feb. 18, 2020.
International Search Report dated Jan. 14, 2020, on a PCT No. PCT/US2019/058503, filed Oct. 29, 2019.
Written Opinion dated Jan. 14, 2020, on a PCT No. PCT/US2019/058503, filed Oct. 29, 2019.
International Search Report dated Dec. 28, 2021, on a PCT No. PCT/US2021/046499, filed Aug. 18, 2021.
Written Opinion dated Dec. 28, 2021, on a PCT No. PCT/US2021/046499, filed Aug. 18, 2021.

(56) References Cited

OTHER PUBLICATIONS

Non Final Rejection dated Nov. 13, 2020, on a U.S. Appl. No. 16/793,747, filed Feb. 18, 2020.
Notice of Allownace dated Aug. 25, 2021, on a U.S. Appl. No. 16/793,747, filed Feb. 18, 2020.
Non Final Rejection dated Sep. 14, 2022, on a U.S. Appl. No. 17/563,433, filed Dec. 28, 2021.
Non Final Rejection dated Aug. 16, 2021, on a U.S. Appl. No. 16/996,711, filed Aug. 18, 2020.
Final Rejection dated May 11, 2022, on a U.S. Appl. No. 16/996,711, filed Aug. 18, 2020.
Notice of Allowance dated Dec. 21, 2022, on a U.S. Appl. No. 16/996,711, filed Aug. 18, 2020.
Notice of Allowance dated Jan. 5, 2023, on a U.S. Appl. No. 16/996,711, filed Aug. 18, 2020.
Non Final Rejection dated Dec. 10, 2020, on a U.S. Appl. No. 16/996,748, filed Aug. 18, 2020.
Notice of Allowance dated Mar. 17, 2021, on a U.S. Appl. No. 16/996,748, filed Aug. 18, 2020.
Notice of Allowance dated Apr. 21, 2021, on a U.S. Appl. No. 16/996,748, filed Aug. 18, 2020.
Non Final Rejection dated Jul. 13, 2022, on a U.S. Appl. No. 17/165,854, filed Feb. 2, 2021.
Notice of Allowance dated Feb. 10, 2023, on a U.S. Appl. No. 17/165,854, filed Feb. 2, 2021.
Non Final Rejection dated Oct. 23, 2019, on a U.S. Appl. No. 16/456,639, filed Jun. 28, 2019.
Notice of Allowance dated Jul. 21, 2020, on a U.S. Appl. No. 16/456,639, filed Jun. 28, 2019.
Non Final Rejection dated Aug. 31, 2021, on a U.S. Appl. No. 17/088,582, filed Nov. 4, 2020.
Notice of Allowance dated May 20, 2022, on a U.S. Appl. No. 17/088,582, filed Nov. 4, 2020.
Non Final Rejection dated Oct. 25, 2022, on a U.S. Appl. No. 17/088,582, filed Nov. 4, 2020.
Notice of Allowance dated Feb. 4, 2019, on a U.S. Appl. No. 16/173,066, filed Oct. 29, 2018.
Notice of Allowance dated May 20, 2019, on a U.S. Appl. No. 16/173,066, filed Oct. 29, 2018.
International Search Report dated Jan. 27, 2020, on a PCT No. PCT/US2019/058,458, filed Oct. 29, 2019.
Written Opinion dated Jan. 27, 2020, on a PCT No. PCT/US2019/058,458, filed Oct. 29, 2019.
Mobotix, "Software Camera Manual Security-Vision-Systems Part 2", Mobotix AG—Security-Vision-Systems Made in German, Retrieved from the Internet http://www.mobotix.com/sites/default/files/2017-10/Mx_ML_Software_en_20061010.pdf pp. 1-136.
Mobotix, "Software Camera Manual Security-Vision-Systems Part 2", Mobotix AG—Security-Vision-Systems Made in German, Retrieved from the Internet http://www.mobotix.com/sites/default/files/2017-10/Mx_ML_Software_en_20061010.pdf pp. 137-273.
Lou et. al. "A real-time interactive multi-view video system." Proceedings of the 13th annual ACM International Conference on Multimedia, 2005. Nov. 6, 2005 (Nov. 6, 2005) Retrieved on Dec. 7, 2021 (Dec. 7, 2021) from <https://dl.acm.org/doi/abs/10.1145/1101149.1101173> entire document.
European Search Report dated Jun. 27, 2022 on a EPO No. 19,879,645.0 filed Oct. 29, 2019, in the name of Pena Henry et. al., SubscribeMeUp.
Supplementary European Search Report dated Jun. 27, 2022 on a EPO No. 19,879,645.0 filed Oct. 29, 2019, in the name of Pena Henry et. al., SubscribeMeUp.
European Search Report dated Jun. 28, 2022 on a EPO No. 19,878,478.7 filed Oct. 29, 2019, in the name of Pena Henry et. al., SubscribeMeUp.
Supplementary European Search Report dated Jun. 28, 2022 on a EPO No. 19,878,478.7 filed Oct. 29, 2019, in the name of Pena Henry et al., SubscribeMeUp.
First Examination Report dated Dec. 30, 2022, on an INDIAN Application No. 202117021181, filed May 11, 2021.

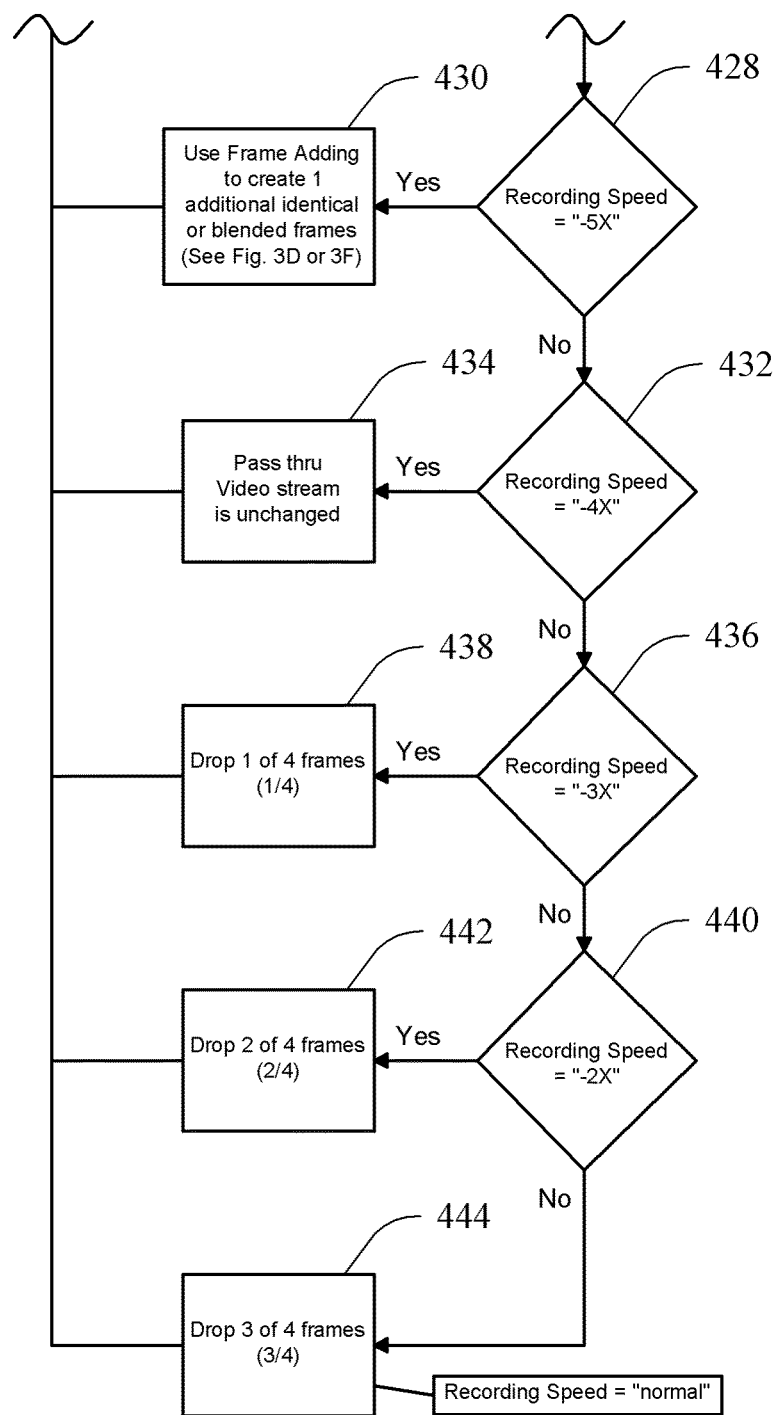
FIG. 17 - Continued

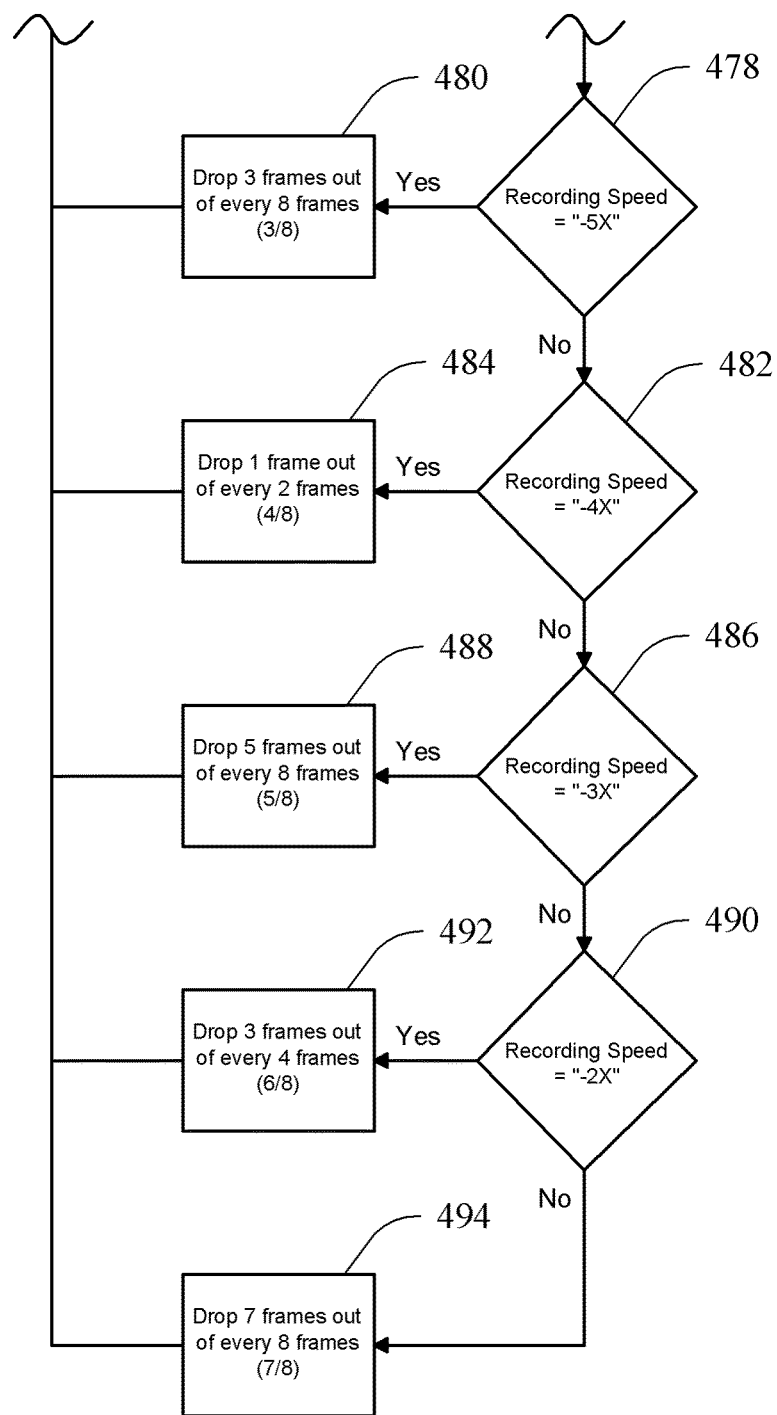
FIG. 18 - Continued

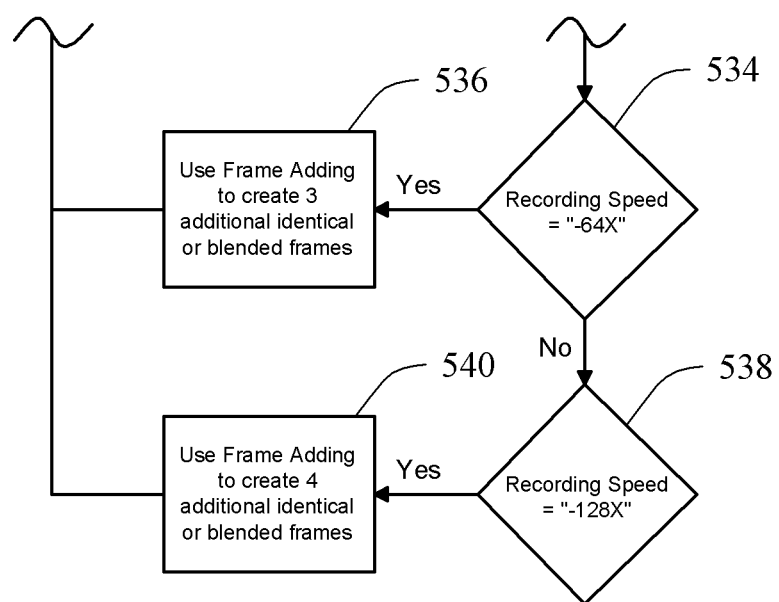
FIG. 19 - Continued

REAL TIME VIDEO SPECIAL EFFECTS SYSTEM AND METHOD

CROSS-REFERENCE TO RELATED APPLICATIONS

This application claims the benefit of priority of and is a continuation application under 35 U.S.C. § 120 based upon co-pending U.S. patent application Ser. No. 16/936,350, filed on Jul. 22, 2020, which claims the benefit of priority of and is a continuation application under 35 U.S.C. § 120 based upon U.S. patent application Ser. No. 16/456,589, filed on Jun. 28, 2019, now U.S. Pat. No. 10,755,743 issued on Aug. 25, 2020, which claims the benefit of priority of and is a continuation application under 35 U.S.C. § 120 based upon U.S. patent application Ser. No. 16/173,033, filed on Oct. 29, 2018, now U.S. Pat. No. 10,388,322 issued on Aug. 20, 2019. The entire disclosure of the prior applications are incorporated herein by reference.

BACKGROUND

Technical Field

The present technology relates to a real time video special effects system and method for use in connection with controlling or creating special effects in video recordings while recording is in progress. More particularly, the present technology relates to a system and method of decoding and altering a speed rate of a video stream from a device live or in real time prior to being recorded and written to long term memory storage with no post editing.

Background Description

Modern video formats utilize a variety of frame rates. Film, which was almost universally shot at 24 frames per second, could not be displayed at its native frame rate, which required pulldown conversion, often leading to "judder". For example, to convert 24 frames per second into 60 frames per second, every odd frame is doubled and every even frame is tripled, which creates uneven motion. Other conversions have similar uneven frame doubling. Newer video standards support 120, 240, or 300 frames per second, so frames can be evenly multiplied for common frame rates such as 24 frames per second (fps) film and 30 fps video, as well as 25 and 50 fps video in the case of 300 fps displays. These standards also support video that is natively in higher frame rates, and video with interpolated frames between its native frames.

Native camera applications (app) in devices running on electronic devices, such as smartphones, can record in regular time and then process the video data stream to create slow motion and in speed up time or time-lapse. However, these known systems or methods do not utilize a user interface where the user can manually control the "time special effects" within the video in real time while recording. For example, the native camera app in the Samsung Galaxy S9+® has a special effect feature where the camera changes the frames per second capture rate when the app detects that the an object has crossed inside a portion of the screen, as indicated with a box outline in the middle of the screen in this case.

Third party apps like Instagram®, Facebook® and Snapchat® uses cameras from mobile devices, but these apps have no feature that allows the user of the app to modify the slowing down or speeding up of the recording speed in real time while recording is in progress.

With higher end feature-rich camera apps like FILMiC Pro®, users can preset the recording frame rate speed and playback frame rate speed independently of each other, thus, creating slow motion and speed up effects in the final produced video.

Time remapping of optical flow is known like with Premiere Pro CC 2015, which enables users to achieve smooth speed and framerate changes by interpolating missing frames. Optical Flow interpolation modifies the speed of clips containing objects with no motion blur that are moving in front of a mostly static background that contrasts highly with the object in motion.

Motion interpolation or motion-compensated frame interpolation (MCFI) is a form of video processing in which intermediate animation frames are generated between existing ones by means of interpolation, in an attempt to make animation more fluid and to compensate for display motion blur.

It can be appreciated that the use of motion interpolation as it reduces motion blur produced by camera pans and shaky cameras and thus yields better clarity of such images. It may also be used to increase the apparent framerate of video game software for a more realistic feel, though the addition of input lag may be an undesired side effect. This "video look" is created deliberately by the Video Field Interpolation Restoration Effect (VidFIRE) technique to restore archive television programs that only survive as film telerecordings. VidFIRE is a restoration technique intended to restore the video-like motion of footage originally shot with television cameras now existing only in formats with telerecording as their basis. The main differences between an artificially and naturally high framerate (via interpolation versus in-camera), are that the latter is not subject to any of the aforementioned artifacts, contains more accurate (or "true to life") image data, and requires more storage space and bandwidth since frames are not produced in real time.

Motion compensation is an algorithmic technique used to predict a frame in a video, given the previous and/or future frames by accounting for motion of the camera and/or objects in the video. It is employed in the encoding of video data for video compression, for example in the generation of MPEG-2 files. Motion compensation describes a picture in terms of the transformation of a reference picture to the current picture. The reference picture may be previous in time or even from the future. When images can be accurately synthesized from previously transmitted/stored images, the compression efficiency can be improved.

Motion compensation exploits the fact that, often, for many frames of a movie, the only difference between one frame and another is the result of either the camera moving or an object in the frame moving. In reference to a video file, this means much of the information that represents one frame will be the same as the information used in the next frame.

Using motion compensation, a video stream will contain some full (reference) frames; then the only information stored for the frames in between would be the information needed to transform the previous frame into the next frame.

Frame Blending may be another technique known to those skilled in the art. In some footage, using Optical Flow for creating smoother motion may not produce the desired results. In such scenarios, you can use one of the other time interpolation options—Frame Sampling or Frame Blending. Frame Sampling repeats or removes frames as needed to reach the desired speed. Frame Blending repeats frames, and it also blends between them as needed to help smooth out the motion.

While the above-described devices fulfill their respective, particular objectives and requirements, the aforementioned patents do not describe a real time video special effects system and method that allows creating special effects in video recordings while recording is in progress.

SUMMARY

In view of the foregoing disadvantages inherent in the known types of video speed rate changing systems and methods now present in the prior art, the present technology provides a novel real time video special effects system and method, and overcomes one or more of the mentioned disadvantages and drawbacks of the prior art. As such, the general purpose of the present technology, which will be described subsequently in greater detail, is to provide a new and novel real time video special effects system and method and method which has all the advantages of the prior art mentioned heretofore and many novel features that result in a real time video special effects system and method which is not anticipated, rendered obvious, suggested, or even implied by the prior art, either alone or in any combination thereof.

According to one aspect of the present technology, there is provided a video capture and display system for controlling a special effects operation of live video recording data in real time. The system can comprise a camera configured to capture video of a real world scene, at least one memory; and at least one processing unit operably connected or connectable to the camera, the graphical user interface and the at least one memory. The at least one processing unit can be configured to: play on the graphical user interface at normal speed the video being captured; and change the video playing speed on the graphical interface of the video being captured from the normal playing speed to a modified playing speed in response to a user input received by the graphical user interface.

According to another aspect, a method for controlling a special effects operation of live video capturing data in real time is provided. The method can comprise the steps of: capturing a video of real world scene with a camera; playing at normal speed on a graphical user interface the video being captured; changing the playing speed on the graphical user interface of the video being recorded from the normal playing speed as displayed on the graphical user device during live recording to a modified playing speed as displayed on the graphical user device during immediate playback of the recording in response to a user interface input received by the graphical user interface in real time while recording is in progress.

According to another aspect of the present technology, the present technology essentially can be a video recording system for controlling a special effects operation of live video recording data in real time. The video recording system includes at least one camera configured or configurable to provide raw video data at a native speed rate, at least one memory, and at least one processing unit in operable communication with the camera and the memory. Wherein the raw video data can at least in part correspond to images captured by the camera in real time. The processing unit can be configured or configurable to receive the raw video data from the camera in real time. After which, determine if the input is associated with changing the native speed rate of the raw video data and if so to modify at least one frame in the raw video data to create modified video data at one or more modified speed rate that are different to the native speed rate in real time with receiving the raw video data from the camera. Then, write at least one output video recording data to the memory, wherein the output video recording data is one of the raw video data at the native speed rate, the modified video data at the modified speed rate, and a combination of the raw video data and the modified video data.

According to another aspect of the present technology, the present technology can be a client-side electronic system for controlling a special effects operation of live video recording data in real time. The system can include a memory and a processor that are respectively configured to store and execute software instructions. The instructions are organized into: a raw data receiving component configured or configurable to receive a request to acquire raw video data at a native speed rate from a camera, wherein the raw video data can at least in part correspond to images captured by the camera in real time; a speed rate determination component configured or configurable to receive at least one request to change the native speed rate of the raw video data from the camera to at least one modified speed rate; a frame modification component configured or configurable to, upon receiving a request to change the native speed rate, identify at least one frame or location in the raw video data to be modified, and modifying the frame or location to create modified video data at the modified speed rate that is different to the native speed rate in real time with receiving the raw video data from the camera; and an output video recording data writing component configured or configurable to write output video recording data to one of the memory and a secondary memory in real time with receiving the raw video data from the camera, wherein the output video recording data is selected from one of the raw video data at the native speed rate, the modified video data at the modified speed rate, and a combination of the raw video data and the modified video data.

According to yet another aspect of the present technology, the present technology can be a method for controlling a special effects operation of live video recording data in real time. The method can include the steps of receiving, by at least one processing unit, raw video data at a native speed rate, wherein the raw video data at least in part corresponds to images captured by the camera in real time, and receiving, by the processing unit, at least one input from at least one interface that is operably associated with the processing unit. The method can include determining, by the processing unit, if the input is associated with changing the native speed rate of the raw video data and if so modifying the raw video data to create modified video data at one or more modified speed rate that are different to the native speed rate in real time with receiving the raw video data from the camera. The method can further include writing, by the processing unit, output video recording data to at least one memory, wherein the output video recording data is one of the raw video data at the native speed rate, the modified video data at the modified speed rate, and a combination of the raw video data and the modified video data.

According to another aspect of the present technology, the present technology can be a system for controlling a real time special effects operation of live video recording data. The system includes at least one camera configured or configurable to provide raw video data at a native speed rate, wherein the raw video data at least in part corresponds to images captured by the camera, at least one memory unit, and at least one processing unit in operable communication with the camera and the memory unit. The processing unit being configured or configurable to receive the raw video data from the camera in real time, and receive an input from at least one interface that is operably associated with the processing unit. The processing unit is further configured or configurable to determine if the input is associated with changing the native speed rate of the raw video data and if so to modify at least one frame in the raw video data to create modified video data at one or more modified speed rate that are different to the native speed rate in real time with receiving the raw video data from the camera. The processing unit is then configured or configurable to write at least one output video recording data to the memory, wherein the output video recording data is one of the raw video data at the native speed rate, the modified video data at the modified speed rate, and a combination of the raw video data and the modified video data.

According to yet another aspect of the present technology, the present technology can include an interface system including an interface in operable communication with a processing unit that is in operable communication with at least one camera configured or configurable to provide raw video data at a native speed rate, wherein the raw video data at least in part corresponds to images captured by the camera, at least one memory unit and at least one display. The interface can be associated with at least one computer-readable storage media in communication with the processing unit or a computer system including at least one processor. The interface can be a graphical user interface including a portion configured or configurable to generate an input associated with a desired speed rate of a raw video data received from the camera. The processing unit is configured or configurable to use the input to determine if the raw video data is to be modified to create a modified video data with a speed rate different to a native speed rate of the raw video data in real time with receiving the raw video data from the camera. The interface can be configured or configurable to display output video recording data in real time with receiving the raw video data from the camera. The output video recording data can be configured or configurable to include a combination of the raw video data and the modified video data, with a transitioning between the raw video data and the modified video data being dependent on the input.

According to another aspect of the present technology, the present technology can be a computer-implemented method for controlling a real time special effects operation of live video recording data. The method can include the steps of receiving, by at least one processing unit, raw video data at a native speed rate from a camera at a request by a user input from at least one interface that is operably associated with the processing unit, wherein the raw video data at least in part corresponds to images captured by the camera in real time. The method can include determining if the input is associated with changing the native speed rate of the raw video data and if so modifying the raw video data to create modified video data with one or more modified speed rate that is different to the native speed rate in real time with receiving the raw video data from the camera. The method can further include writing at least one output video recording data to the memory, wherein the output video recording data is one of the raw video data at the native speed rate, the modified video data at the modified speed rate, and a combination of the raw video data and the modified video data.

In some embodiments of the present technology, the method can include precluding the raw video data from being written to the memory from the camera.

In some embodiments of the present technology, the input is not associated with changing the native speed rate, then writing the raw video data to the memory.

In some embodiments, the method can include determining if the modified speed rate is less than the native speed rate, and if so wherein the modifying of the raw video data includes adding at least one new frame to the raw video data to create the modified video data.

In some embodiments, the method can include adding the new frame includes copying at least one raw frame to create the new frame, and adding the new frame to the raw video data adjacent to the raw frame.

In some embodiments, the new frame can be a plurality of new frames each being a copy of at least one raw frame from the raw video data.

In some embodiments of the present technology, each of the new frames can be added to the raw video data adjacent to the raw frame or adjacent to a second raw frame of the raw video data.

In some embodiments of the present technology, the method can include determining if the modified speed rate is greater than the native speed rate, and if so wherein the modifying of the raw video data includes removing at least one first raw frame from the raw video data to create the modified video data.

In some embodiments of the present technology, the method can include removing the first raw frame includes selecting the first raw frame to be removed, and then removing the first raw frame from the raw video data to create the modified video data.

In some embodiments, the interface can be a graphical user interface including a portion configured or configurable to generate the input that is associated with the native speed rate or the modified speed rate, and wherein the interface is configured or configurable to display the output video recording data.

In some embodiments, the output video recording data can be a combination of the raw video data and the modified video data, the modified video data is configured or configurable to include multiple subsets each having a speed rate dependent on the input, with a transitioning between the raw video data and any one of the subsets or between any of the subsets being dependent on the input, and wherein the output video recording data is displayed in the graphical user interface in real time with receiving the raw video data from the camera.

There are, of course, additional features of the present technology that will be described hereinafter and which will form the subject matter of the claims attached.

BRIEF DESCRIPTION OF THE DRAWINGS

The present technology will be better understood and objects other than those set forth above will become apparent when consideration is given to the following detailed description thereof. Such description makes reference to the annexed drawings wherein, with the phantom lines depicting environmental structure and forming no part of the claimed present technology:

The same reference numerals refer to the same parts throughout the various figures.

DETAILED DESCRIPTION OF THE PREFERRED EMBODIMENTS

Figure 1:
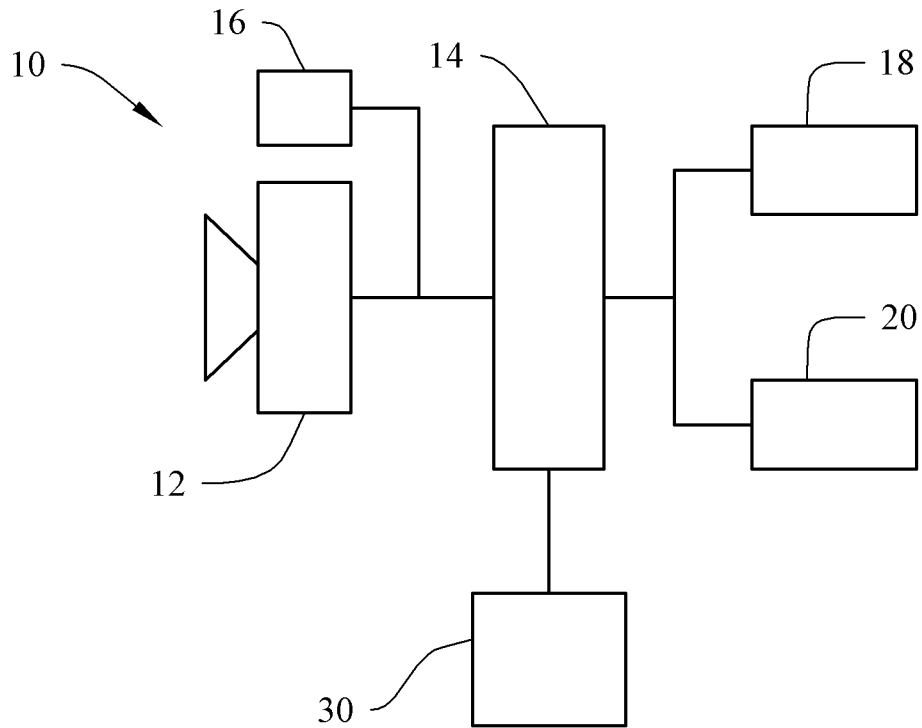
FIG. 1 is a block diagram of an embodiment of the real time video special effects system constructed in accordance with the principles of the present technology.

In the following description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

It is known that video recordings are made up a series of frames or group of pictures displayed at a speed rate to create motion. These frames of images or video can be characterized as digital frame data, which can be buffered in the playing back of the video. The frame rate (expressed in frames per second or fps) is the frequency (rate) at which these consecutive frames appear on a display. This can be applied equally to film and video cameras, computer graphics, and motion capture systems. Frame rate may also be called the frame frequency, and be expressed in hertz.

Real-time recording and/or playback of video is typically performed at a rate of thirty (30) fps. It is desirable in several situations to speed up or slow down the playback of the video. This is typically conducted while keeping the recording and playback frames per second at 30 fps in order to maintain compatibility with the existing components, such as the display devices, etc. For example, if a viewer wanted to speed up the playback of a video by a certain percentage from the standard real-time playback speed while keeping 30 fps, the information or data of a specific number of frames is required to be played back in a time segmented for 30 frames. A scheme to create this is to skip one frame, from the recorded video, out of every predetermine number of frames so that the appropriate number of frames of video are displayed at 30 fps. It is noted that these known systems and methods are provided as a post-recording process, which skips frames from a 30 fps recording. The recording is initially written to memory in real time at 30 fps, with no special effects.

The present technology solves the problem of requiring "post production editing" to insert the time modification special effects, which can be time and resource costly, especially for amateur filmmakers.

Furthermore, the present technology solves the problem of pre-setting the motion recording speed to either fast motion or slow motion where user cannot adjust the motion recording speed in real time during the recording process.

Even still further, the present technology solves the problem of presetting the motion recording speed where a user cannot adjust the motion recording speed continuously and vary from fast motion to slow motion in real time during the recording process.

The present technology alleviates and solves the issue requiring hardware support for every device. By using the software algorithm to simulate slow motion, it is not device dependent and the resulting file is much smaller than hardware supported slow motion video.

While the above-described devices fulfill their respective, particular objectives and requirements, the aforementioned devices or systems do not describe a real time video special effects system and method that allows creating special effects in video recordings while recording is in progress. The present technology additionally overcomes one or more of the disadvantages associated with the prior art by adding or removing frames from the frame strip provided by the camera in real time.

Still further, there is no known interface for the user to change the speed of recording and the duration to apply the special effects in real time while recording is in progress. Furthermore, the scene has to be relatively fixed, with the camera not panning or following the action. The algorithm associated with this known system uses a motion sensor while the camera remains steadily fixed on a scene and the subject has to traverse the scene while the rest of the scene remains fixed.

The present technology can utilize a user interface associated with the electronic device that modifies the frames from a camera in real time prior to recording or saving.

A need exists for a new and novel real time video special effects system and method that can be used for creating special effects in video recordings while recording is in progress. In this regard, the present technology substantially fulfills this need. In this respect, the real time video special effects system and method according to the present technology substantially departs from the conventional concepts and designs of the prior art, and in doing so provides an apparatus primarily developed for the purpose of creating special effects in video recordings while recording is in progress.

Users of the present technology can in "real time" produce videos that contain the special effect of user controlled variable time modification, aka fast motion or slow motion, by using the user interface programmed into the device's apps that run on their supported operating systems, and other embedded devices. The produced video is taken in one-shot, with all of the time modification commands entered in real time while recording.

For exemplary purposes, the present technology can utilizes a set video frame rate to 30 fps, resulting in 30 frames per second while recording.

In some embodiments of the present technology, a user can utilize a fast forward option of the present technology, which results in dropping frames according to the set fast forward rate (like 1×, 2×, 3×, etc.). If the user sets 2× fast forward video then the present technology can append the $1^{st}$ frame in writer and skips the $2^{nd}$ frame, then write the $3^{rd}$ frame, and then skip the $4^{th}$ frame and so on. The resultant video that is recorded is at the predefined fast forward speed in real time while retaining a 30 fps.

In some embodiments, a user can utilize a slow motion option of the present technology, which results in appending a same frame twice thereby repeating this frame so the final video that is recorded is in slow motion. For example, if the user sets 2× slow video then the present technology can append the $1^{st}$ frame in writer, and the same frame append to the next time/frame slot. The resultant video that is recorded is at the predefined slow motion speed in real time while retaining a 30 fps.

The present technology allows the user to control the recording device's (and any other video recording device) recording speed and other camera settings while recording through the use of the custom user interface, such that when the user plays the video immediately after the present technology algorithm has processed the commands, the playback speed of the scenes correspond with the commands during recording. The present technology accomplishes this with software simulation without having to increase the recording device's frame rate and is not device dependent and works across all platforms.

An additional aspect of the present technology can be to increase the frame rate of the recording device while recording is in progress. This requires application programming interface (API) access to limited number of supported hardware and there is no industry standard API, which limits the number of supported devices. The display shows the current time recording rate, from normal speed to 3× faster, or −3× slower (can be 4×, 5× or more). The user can control the recording rate by utilizing the interface.

Numerous advantages exist with the present technology, such as an easy to use custom user interface, wherein the user can add special effects of time modification into the video in real time while recording is in progress. This is an advantage over existing technology because the user can produce a video with the special effects (variable fast and slow motion recording speeds) while recording of that video is in progress. This reduces the time and costs to produce videos with these kinds of special effects by not requiring a separate video editing software and or paying a video editor to edit and produce a comparable video. User can enjoy viewing the videos they created with the special effects immediately once they have completed recording and brief processing time for the device to process adding the special effects and automatically producing a new video with the special effects implemented.

Another advantage of user's manual control of the special effect in real time is that the user can pan along with the movement of the scene, and capture the peak moment of the action and use continuously variable slow/fast motion at just the right time and for as long as desired, and then return back to normal speed as the user is recording.

Still another advantage is that the present technology is not hardware dependent for the slow or fast motion special effect to work. The software algorithm simulates the slow or fast motion.

Even still another advantage is that with the manual user interface, the camera does not have to remain stationary while pointing at a stationary scene for an AI software to determine the "action" to apply the special effects thereto.

Another advantage is that the present technology can accept input from, but not limited to, a remote camera feed, a joystick, a retina scanner, a body suit controller, on-screen subject gestures and a tactile user interface.

In some embodiments, the present technology can also be applied to add time modifying special effects to pre-existing videos. The user can control the time variable in the playback by using the same familiar easy to use left-right on a compatible device, such as a smartphone or tablet, to control and modify the values for the playback time value, from −3× to 4× in this case. It can be appreciated that there are additional abilities to the factor of time modification once digital processing technology has advanced sufficiently to be able to interpolate data and images in between frames captured one the video.

When the user slides towards the 4×, the recorded speed is played back faster than normal, up to 4× faster. When the user slides towards the −3×, the recorded speed is played back slower than normal, up to 3× slower.

In some embodiments, the raw video data can include data such as, but not limited to, streaming video data, video, audio, depth, object identification, histogram, and combination thereof.

In some aspects, the processing unit can be configured or configurable to preclude the raw video data from being written to the memory unit from the camera, such that the present technology can intercept the raw video data.

In some embodiments, the input can be one or more desired speed rate values that the modified speed rate is based on. Where the modified speed rates can be one of less than the native speed rate or greater than the native speed rate.

If the modified speed rate is less than the native speed rate, then the processing unit can be configured or configurable to add at least one frame to the raw video data to create the modified video data.

If the modified speed rate is greater than the native speed rate, then the processing unit can be configured or configurable to remove at least one frame from the raw video data to create the modified video data.

If the input is not a request to change the native speed, then the processing unit can be configured or configurable to keep all the frames from the raw video data and write the raw video data to memory.

In some embodiments, the interface can be a graphical user interface including a portion configured or configurable to generate the input that is associated with the native speed rate or the modified speed rate. The graphical user interface can be configured or configurable to display the output video recording data in real time with receiving the raw video data from the camera. The output video recording data can be configured or configurable to include a combination of the raw video data and the modified video data, with a transitioning between the raw video data and the modified video data being dependent on the input. It can be appreciated that the interface can be a joystick or can utilize a joystick.

In yet another aspect, the interface can be operable associated with at least one computer-readable storage media storing instructions that, when executed by the processing unit or a processor of a computer system, causes the processing unit to direct the raw video data from the camera to the processing unit and as well as to the memory unit in real time with receiving the raw video data from the camera, and to write the raw video data from the processing unit to the memory unit or apply at least one algorithm to the raw video data to create the modified video data and write the modified video data from the processing unit to the memory unit.

According to yet another aspect of the present technology, the present technology can be a method of recording a video at one or more speed rates in real time with receiving the raw video data from the camera. The method can include the steps of receiving, by at least one processing unit, raw video data at a native speed rate from a camera in real time with capturing images at least in part corresponding with the raw video data from the camera, and receiving an input from at least one interface that is operably associated with the processing unit. The method can include determining, by the processing unit, if the input is associated with changing the native speed rate of the raw video data and if so modifying the raw video data to create modified video data at one or more modified speed rates that are different to the native speed rate in real time with receiving the raw video data from the camera. The method can further include writing, by the processing unit, output video recording data to at least one memory, wherein the output video recording data is one of the raw video data at the native speed rate, the modified video data at the modified speed rate, and a combination of the raw video data and the modified video data.

Some embodiments of the present technology can include determining if the modified speed rate is less than the native speed rate, and if so then modifying the raw video data can include adding at least one new frame to the raw video data to create the modified video data.

In some embodiments, the method can include adding the new frame by copying at least one raw frame to create the new frame, and adding the new frame to the raw video data adjacent to the raw frame.

In some embodiments, the new frame to be added can be a plurality of new frames each being a copy of at least one raw frame from the raw video data, with the new frames being added to the raw video data adjacent to the raw frame that was copied.

In some embodiments, the method can include adding the new frame by frame blending at least two raw frames to create the new frame, and adding the new frame to the raw video data between the two raw frames.

In some embodiments, the new frame(s) to be added can be a plurality of new frames each being a blend of at least two raw frames from the raw video data, with the new frames being added to the raw video data between the raw frames that was blended.

In some embodiments, each of the new frames can be added to the raw video data adjacent to the raw frame or adjacent to a second raw frame of the raw video data.

Some embodiments can include the step of determining if the modified speed rate is greater than the native speed rate, and if so then modifying the raw video data can include removing at least one first raw frame from the raw video data to create the modified video data.

In some embodiments, the removing of the first raw frame can include selecting the first raw frame to be removed, and then removing the first raw frame from the raw video data to create the modified frame.

In some embodiments, the interface can be a graphical user interface including a portion configured or configurable to generate the input that is associated with the native speed rate or the modified speed rate, and wherein the interface is configured or configurable to display the output video recording data.

Some embodiments can include the output video recording data being a combination of the raw video data and the modified video data. With the modified video data configured or configurable to include multiple subsets each having a speed rate dependent on the input. Where a transitioning between the raw video data and any one of the subsets or between any of the subsets is dependent on the input, and wherein the output video recording data is displayed in the graphical user interface in real time with receiving the raw video data from the camera.

In some embodiments, the present technology can include an extreme slow motion subroutine at constant high recording fps. This subroutine can be utilized for slow motion speed ranges greater than or equal to −8×, by passing through an unchanged video stream or make copies of each frame a predetermined number of times.

In some embodiments, the present technology can include a segment time compression and expansion subroutine that provides an algorithm for slow motion and fast motion by speeding up or slowing down the playback time during video processing after the recording has stopped. This subroutine can set the device's recording and/or playback fps, and set video segment playback fps to equal the recording fps using an algorithm that utilizes in part the segment playback fps and record fps.

In some embodiments, the present technology can include a variable playback speed record subroutine that provides an algorithm for slow motion and fast motion by speeding up or slowing down the playback frame rate while video recording is in progress. This algorithm can produce a normal video with the fast/slow motion commands embedded in the video's metadata.

In some embodiments, the present technology can include a variable playback speed playback subroutine that provides an algorithm for playing a video file with slow motion and fast motion special effects by speeding up or slowing down the playback frame rate while video playback is in progress.

There has thus been outlined, rather broadly, features of the present technology in order that the detailed description thereof that follows may be better understood and in order that the present contribution to the art may be better appreciated.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

Even still another object of the present technology is to provide a real time video special effects system and method for creating special effects in video recordings while recording is in progress. This allows a user to control the speed rate of the video prior to and while recoding is in progress in real time while acquiring the video from the camera.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology. Whilst multiple objects of the present technology have been identified herein, it will be understood that the claimed present technology is not limited to meeting most or all of the objects identified and that some embodiments of the present technology may meet only one such object or none at all.

Referring now to the drawings, and particularly to FIGS. 1-25, some embodiments of the real time video special effects system and method of the present technology are shown and generally designated by the reference numeral 10. As a general outline, the system comprises a camera configured to capture video of a real world scene or any video remote video feed, including video games, a graphical user interface, at least one memory; and at least one processing unit operably connected or connectable to the camera, the graphical user interface and the at least one memory. The at least one processing unit is configured to: play on the graphical user interface at normal speed the video being captured; and change the video playing speed on the graphical interface of the video being captured from the normal playing speed to a modified playing speed in response to a user input received by the graphical user interface.

Referring now to some embodiments in more detail, new and novel real time video special effects system and method 10 of the present technology for creating special effects in video recordings while recording is in progress is illustrated and will be described with reference to FIG. 1. More particularly, the real time video special effects system and method 10 can include a camera 12, an image processor or processing unit 14, a user interface 30 associated with the processing unit, a storage or memory unit 18, a display unit 20. At least one RAM memory and/or at least one non-volatile long term memory can be operably connected or connectable with the processing unit 14. It can be appreciated that the camera 12 can be any device capable of capturing images and/or video, and can be associated or integrated with a microphone 16. The image processing unit 14 is in operable communication with the camera 12, microphone 16, the memory unit 18 and/or the display unit 20. The image processing unit 14 intercepts the raw video data from the camera 12 and/or microphone 16, processes the raw video data in real time in possible accordance with at least one algorithm, and then records output/final video recording data in the memory unit 18 and/or displays the output/final video recording data in the display unit 20.

It can be appreciated that the system 10 can be configured or configurable as a complete video system of an electronic device having one or more video cameras 12, one or more display devices 20, and one or more integrated circuits or processors. Alternatively, it can be appreciated that the imaging processing unit 14 can be configured or configurable as a module or integrated circuit chip embedded in the electronic device or with a component of the electronic device. Further in the alternative, the system 10 can be configured or configurable as a video data processing device such as, but not limited to, a graphics processing unit (GPU), digital signal processor (DSP), Active Server Pages (ASP), central processing unit (CPU), accelerated processing unit (APU), Application Specific Integrated Circuit (ASIC). Even further in the alternative, the system 10 can be configured or configurable as software or programming code as part of an operating system or application running on or controlling the electronic device or camera.

The electronic device including the camera 12, microphone 16 and display unit 20 can be, but not limited to, smart phones, smart watches, tablets, notebooks, desktop computers, laptops, DVD players, televisions digital cameras (point and shoot, single-lens reflex, video cameras, high end audio/visual gear), eyewear, drones, gimbals and other stabilizers, selfie sticks, closed circuit video monitoring system, dash cam for cars, endoscopes, microscopes, telescopes, camera and/or display embedded circuits, wearables, "Internet of Things" (IoT), and the like.

Figure 2:
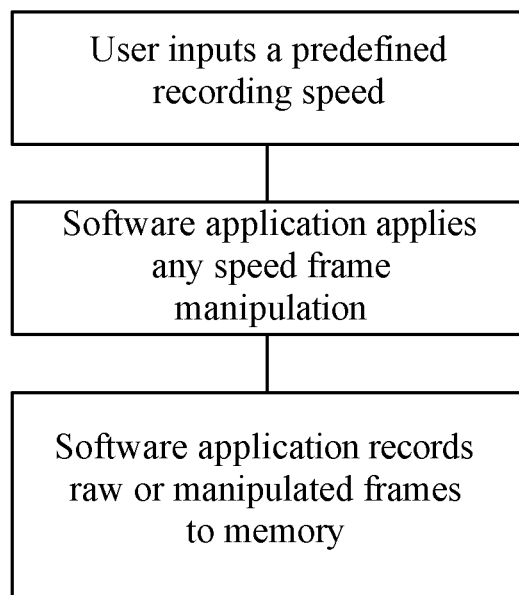
FIG. 2 is a block diagram view of the real time recording speed control method of the present technology.

With reference to FIG. 2, the processing unit 14 can be configured or configurable to receive an input of a user selection of a requested recording speed. The raw video data from the camera 12 can be diverted to the imaging processing unit 14, where the program and/or algorithm modifies or retains the raw frames contained in the raw video data from the camera 12. The raw frames in the data stream are either modified or retained by the imaging processing unit 14 in real time, and then passed to the memory unit 18 and/or display unit 20.

Figure 3A:
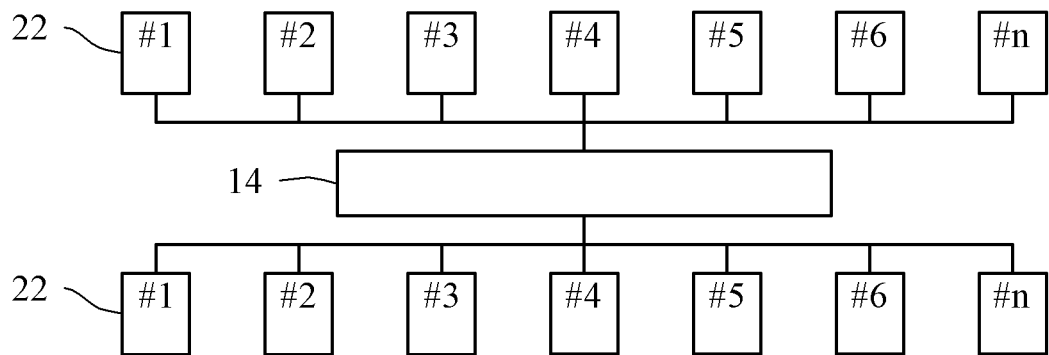
FIG. 3A is a representation of a series of video frames indicating an example of a native frame rate in accordance with the teachings of the present technology.

Examples of operations of the imaging process unit using frame adding, frame blending and frame dropping 14 are illustrated in FIGS. 3A-G. When actuated or while in operation, the imaging processing unit 14 intercepts the raw video data 22 from the camera 12, which includes a series of frames #1-#n at a native frame rate for proper presentation by the display unit 20. For exemplary purposes, the frame rate shown in FIG. 3A can be 30 fps. The imaging processing unit 14 receives the raw frames 22 and then can modify or retain the raw frames dependent on one or more inputs signals received by the imaging processing unit 14. If the imaging processing unit 14 receives no input signals requesting an adjustment of the frame speed rate, then all the raw frames contained in the raw video data 22 are passed through to other components such as the memory unit of the electronic device, as best illustrated in FIG. 3A.

Figure 3B:
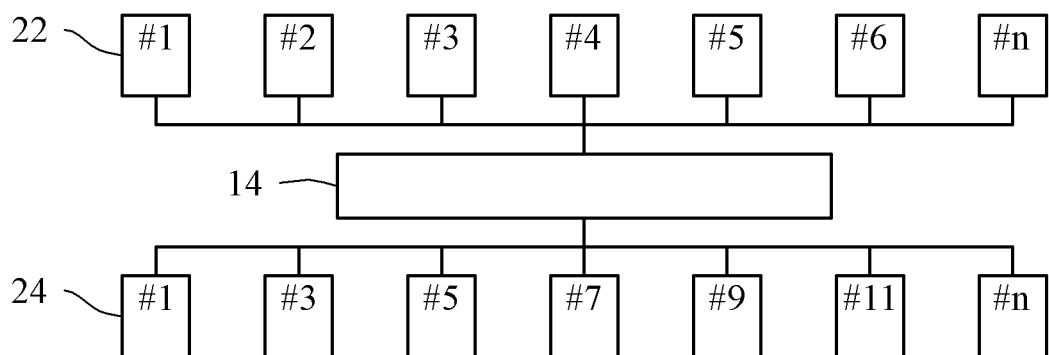
FIG. 3B is a representation of a series of video frames indicating an example of frame dropping in accordance with a fast motion speed at 2× the native frame rate.

In some embodiments, if the imaging processing unit 14 receives a special effect input signal associated with a fast motion recording operation, which represents a speed up or fast forward displaying at 2× the native frame rate, then the imaging processing unit 14 appropriately modifies the raw video data 22. Upon which, the raw frames 22 are processed using algorithm wherein every second frame is dropped, as best illustrated in FIG. 3B. Raw frame #1 can be appended in writer, raw frame #2 can be skipped/dropped, then raw frame #3 can be written, and then raw frame #4 can be skipped/dropped, and so on until a modified or output video recording data 24 is generated in 2× fast motion speed. This process is conducted in real time, and the fast motion output video is recorded in place of the raw video data 22, and/or displayed in real time.

Figure 3C:
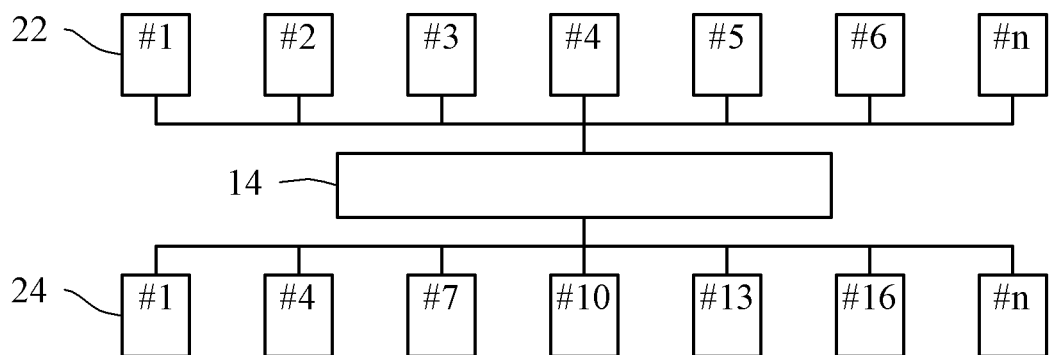
FIG. 3C is a representation of a series of video frames indicating an example of frame dropping in accordance with a fast motion speed at 3× the native frame rate.

In some embodiments, if the imaging processing unit 14 receives a special effect input signal associated with a fast motion recording operation, which represents a speed up or fast forward displaying at 3× the native frame rate, then the imaging processing unit 14 appropriately modifies the raw video data 22. Upon which, the raw frames 22 are processed using algorithm wherein every second and third frames are dropped, as best illustrated in FIG. 3C. Raw frame #1 can be appended in writer, the raw frames #2 and #3 can be skipped/dropped, then raw frame #4 can be written, then raw frames #5 and #6 can be skipped/dropped, and then raw frame #7 can be written, and so on until a modified or output video recording data 24 is generated in 3× fast motion speed. This process is conducted in real time, and the fast motion output video is recorded in place of the raw video data 22, and/or displayed in real time.

Figure 3D:
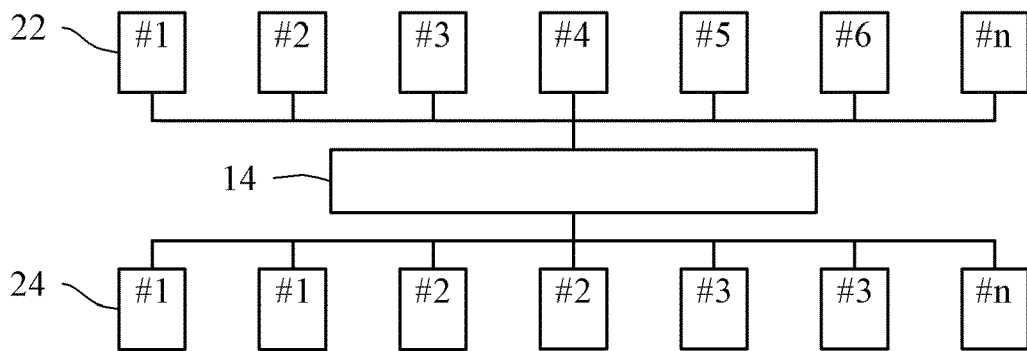
FIG. 3D is a representation of a series of video frames indicating an example of frame adding using frame copying in accordance with a slow motion speed at −2× the native frame rate.

For example, if the imaging processing unit 14 receives a special effect input signal associated with a slow motion recording operation, which represents a slow down or slow motion displaying at −2× the native frame rate. Upon which, the raw frames 22 are processed using algorithm wherein every frame is duplicated/repeated, as best illustrated in FIG. 3D. Raw frame #1 can be appended in writer, then raw frame #1 is duplicated and written, then raw frame #2 is written, then raw frame #2 is duplicated and written, then raw frame #3 is written, and then raw frame #3 is duplicated and written, and so on until a modified or output video recording data 24 is generated in −2× slow motion speed. This process is conducted in real time, and the slow motion output video is recorded in place of the raw video data 22, and/or displayed in real time or immediately after recording has stopped and the post recording algorithm has completed processing the commands entered while recording.

Figure 3E:
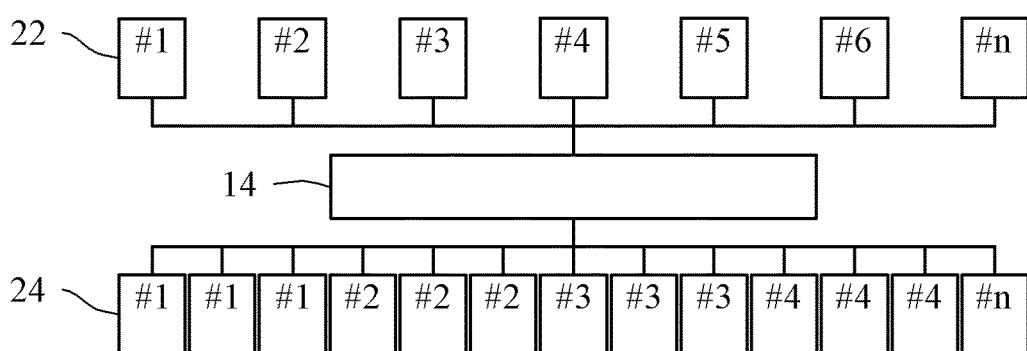
FIG. 3E is a representation of a series of video frames indicating an example of frame adding using frame copying in accordance with a slow motion speed at −3× the native frame rate.

In some embodiments, if the imaging processing unit 14 receives a special effect input signal associated with a slow motion recording operation, which represents a slow down or slow motion displaying at −3× the native frame rate, then the imaging processing unit 14 appropriately modifies the raw video data 22. Upon which, the raw frames are processed using algorithm wherein every frame is duplicated/repeated at least twice, as best illustrated in FIG. 3E. Raw frame #1 can be appended in writer, then raw frame #1 is duplicated twice and each is written, then raw frame #2 is written, then raw frame #2 is duplicated twice and each is written, then raw frame #3 is written, and then raw frame #3 is duplicated twice and each written, and so on until a modified or output video recording data 24 is generated in −3× slow motion speed. This process is conducted in real time, and the slow motion output video is recorded.

Figure 3F:
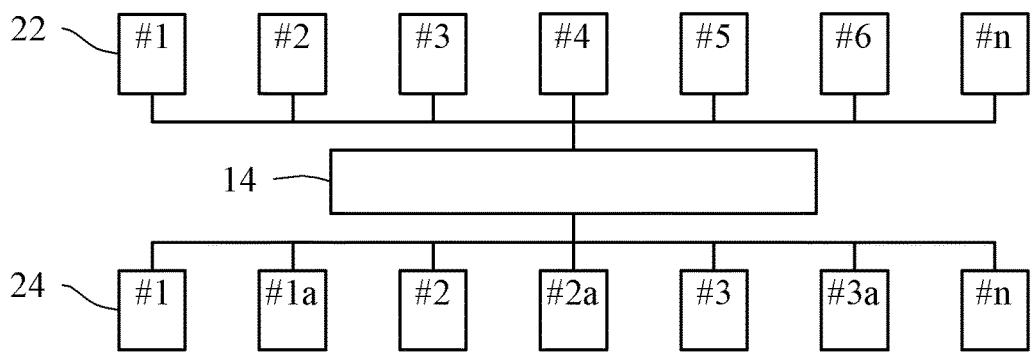
FIG. 3F is a representation of a series of video frames indicating an example of frame adding using frame blending in accordance with a slow motion speed at −2× the native frame rate.

In some embodiments, if the imaging processing unit 14 receives a special effect input signal associated with a slow motion recording operation, which represents a slow down or slow motion displaying at −2× the native frame rate. Upon which, the raw frames 22 are processed using algorithm wherein new frames are created as a result of "blending" of two adjacent frames, as best illustrated in FIG. 3F. Raw frame #1 can be appended in writer, then raw frame #1 is "blended" with raw frame #2 to create 1 new frame, #1a, and then #1a is written, then raw frame #2 is written, then raw frame #2 is "blended" with raw frame #3 to create 1 new frame, #2a, and then #2a is written, then raw frame #3 is written, then raw frame #3 is "blended" with raw frame #4 to create 1 new frame, #3a, and then #3a is written, and so on until a modified or output video recording data 24 is generated in −2× slow motion speed. This process is conducted in real time, and the slow motion output video is recorded in place of the raw video data 22, and/or displayed in real time or immediately after recording has stopped and the post recording algorithm has completed processing the commands entered while recording.

Figure 3G:
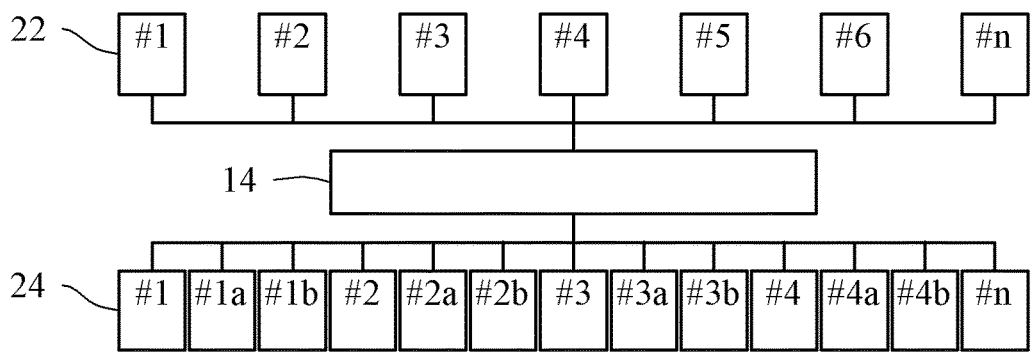
FIG. 3G is a representation of a series of video frames indicating an example of frame adding using frame blending in accordance with a slow motion speed at −3× the native frame rate.

In some embodiments, if the imaging processing unit 14 receives a special effect input signal associated with a slow motion recording operation, which represents a slow down or slow motion displaying at −3× the native frame rate. Upon which, the raw frames 22 are processed using algorithm wherein new frames are created as a result of "blending" of two adjacent frames, as best illustrated in FIG. 3G. Raw frame #1 can be appended in writer, then raw frame #1 is "blended" with raw frame #2 to create 2 new frame, #1a & 1b, and then #1a & #1b are written, then raw frame #2 is written, then raw frame #2 is "blended" with raw frame #3 to create 2 new frame, #2a & #2b, and then #2a & #2b are written, then raw frame #3 is written, then raw frame #3 is "blended" with raw frame #4 to create 2 new frame, #3a & #3b, and then #3a & #3b are written, and so on until a modified or output video recording data 24 is generated in −3× slow motion speed. This process is conducted in real time, and the slow motion output video is recorded in place of the raw video data 22, and/or displayed in real time or immediately after recording has stopped and the post recording algorithm has completed processing the commands entered while recording.

It can be appreciated that additional fast and/or slow motion operations can be performed with greater fast motion or slow motion speeds than those described above. It can further be appreciated that a combination of fast motion and slow motion speeds can be implemented to a single raw video data in real time. Thus creating output/final video recording data containing portions of native speed rate, fast motion speed, slow motion speed or any combination thereof.

Figure 4:
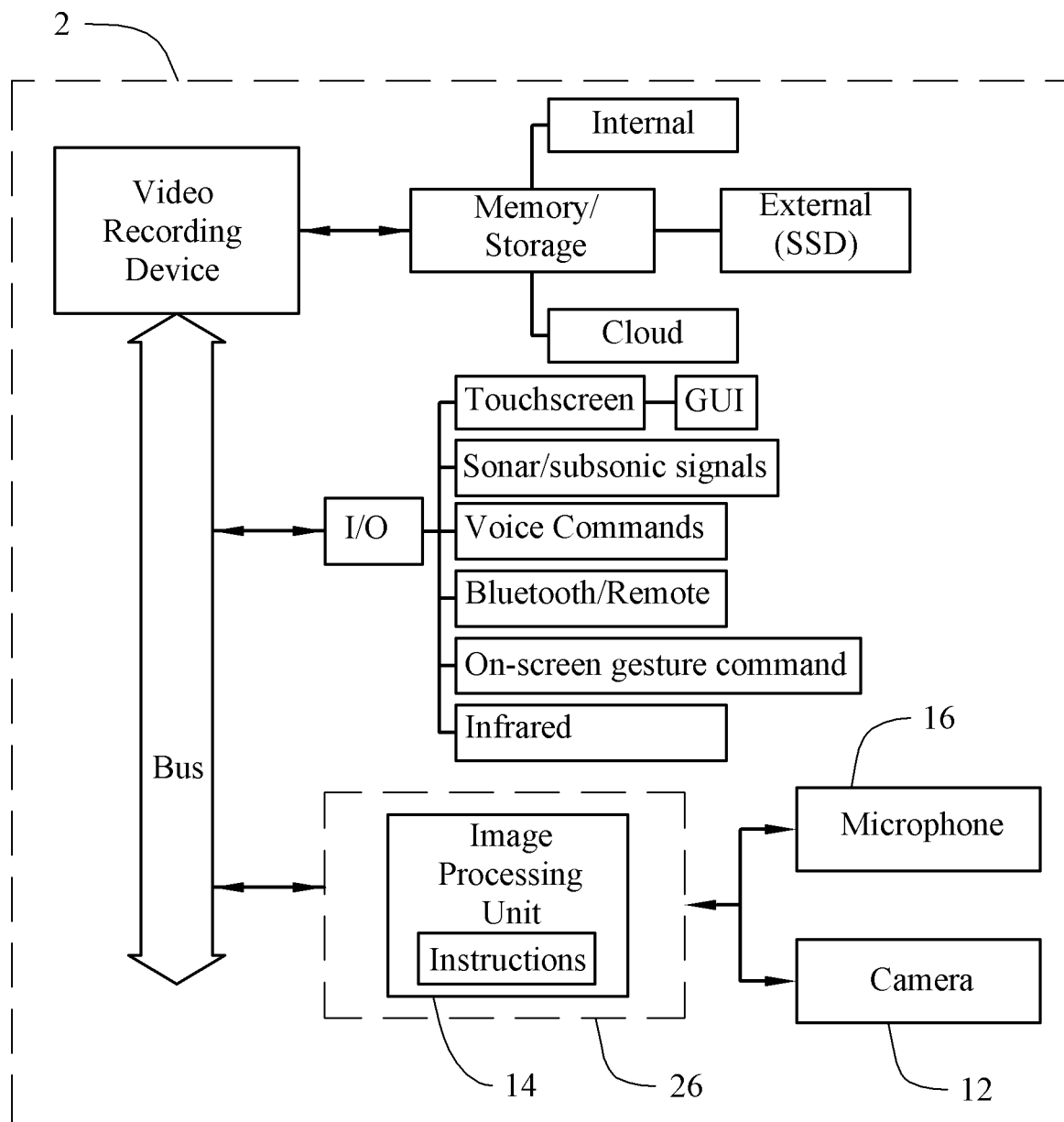
FIG. 4 illustrates an exemplary integrated circuit chip embedded in an electronic computing device that may be used to implement an embodiment of the present technology.
Figure 5:
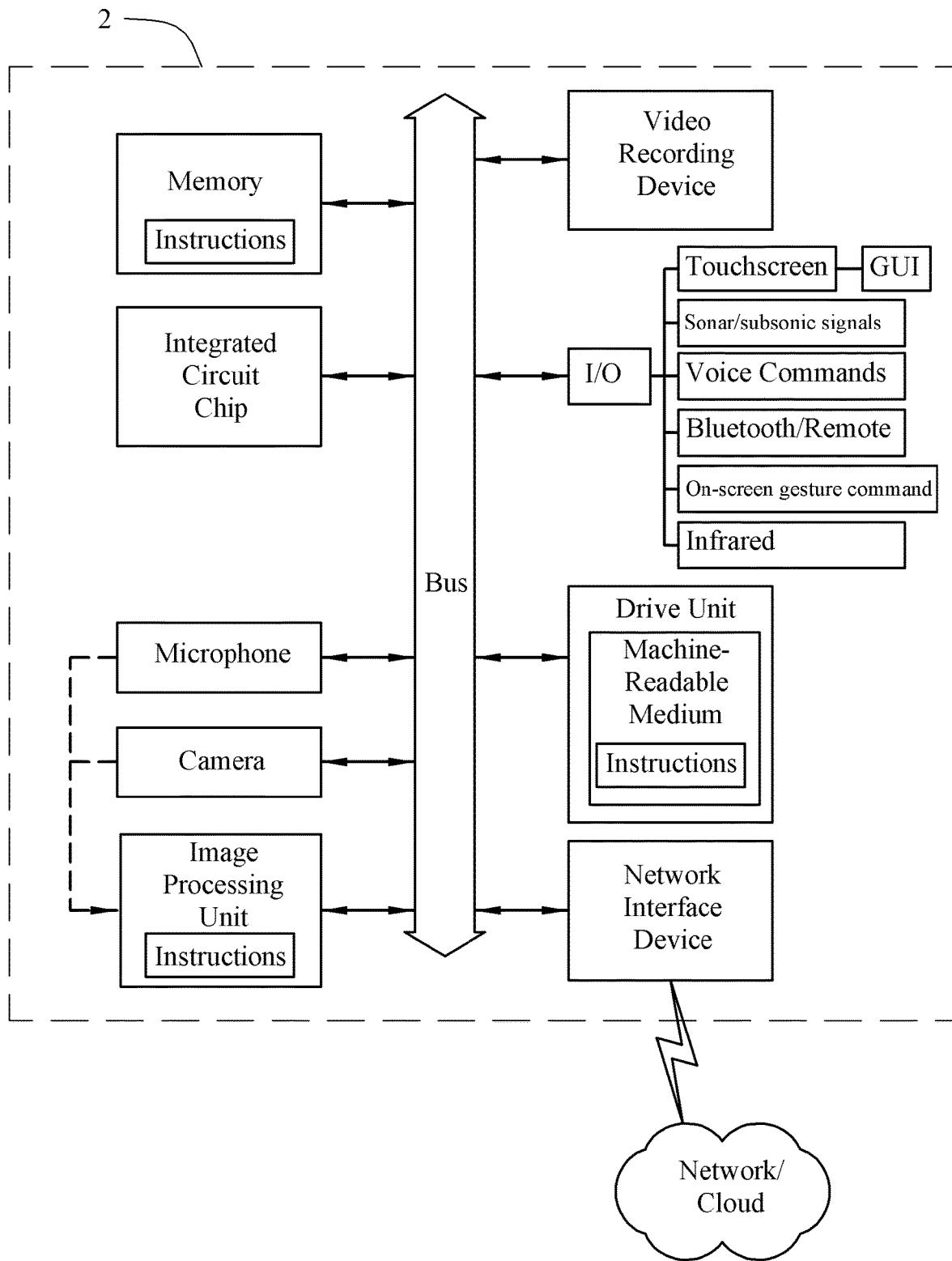
FIG. 5 illustrates an exemplary electronic computing device that may be used to implement an embodiment of the present technology.

With reference to FIGS. 4 and 5, a companion software application can be associated with and/or executed by the image processing unit 14 or an electronic computing device, machine or system 2 that is operably associated with the image processing unit 14. FIG. 4 is a diagrammatic representation of the image processing unit 14 incorporated with an integrated circuit chip 26, which can be embedded with an example machine or component thereof, such as the camera 12, in the form of the electronic device 2, within which a set of instructions for causing the component or electronic device to perform any one or more of the methodologies discussed herein may be executed. Integrated circuit chip 26 containing the image processing unit 14 can be configured or configurable to include firmware for its operation. It can be appreciated that the integrated circuit chip 26 can be embedded with the camera 12, the display unit 20, or other components of the electronic device 2. It can be appreciated that remote controls connected to the electronic device or camera through Bluetooth® or other protocols can be utilized.

The integrated circuit chip 26 can include a computer or machine-readable medium on which is stored one or more sets of instructions and data structures (e.g., instructions) embodying or utilizing any one or more of the methodologies or functions described herein. The instructions are configured or configurable for operation of the image processing unit 14, which can receive operational instructions from the interface or GUI.

The device 2 can further include a number of different input (including simultaneous input from multiple feeds) and/or output (I/O) systems such as, but not limited to, a touchscreen and GUI, sonar or subsonic transmitter, receiver and/or transceiver, voice command, Bluetooth®, remote controller, on-screen gesture command or infrared. The device 2 can further record video or images from the video recording device to a memory/storage system such as, but not limited to, an internal memory, an external memory, external solid-state drive (SSD) or the cloud.

FIG. 5 is a diagrammatic representation of the image processing unit 14 incorporated with the electronic device 2 within which a set of instructions for causing the electronic device to perform any one or more of the methodologies discussed herein may be executed.

In various example embodiments, the electronic device 2 operates as a standalone device or may be connected (e.g., networked) to other devices. In a networked deployment, the electronic device may operate in the capacity of a server or a client machine in a server-client network environment, or as a peer machine in a peer-to-peer (or distributed) network environment. The electronic device may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that device. Further, while only a single electronic device is illustrated, the term "device" shall also be taken to include any collection of devices that individually or jointly execute a set (or multiple sets) of instructions to perform any one or more of the methodologies discussed herein.

The example electronic device 2 includes a processor or multiple processors (e.g., CPU, GPU, or both), and a main memory and/or static memory, which communicate with each other via a bus. In other embodiments, the electronic device 2 may further include a video display (e.g., a liquid crystal display (LCD)). The electronic device 2 may also include an alpha-numeric input device(s) (e.g., a keyboard), a cursor control device (e.g., a mouse), a voice recognition or biometric verification unit (not shown), a drive unit (also referred to as disk drive unit), a signal generation device (e.g., a speaker), a universal serial bus (USB) and/or other peripheral connection, and a network interface device. In other embodiments, the electronic device 2 may further include a data encryption module (not shown) to encrypt data.

The image processing unit 14 can be a module operably associated with the drive unit, with the drive unit including a computer or machine-readable medium on which is stored one or more sets of instructions and data structures (e.g., instructions) embodying or utilizing any one or more of the methodologies or functions described herein. The instructions may also reside, completely or at least partially, within the memory and/or within the processors during execution thereof by the electronic device 2. The memory and the processors may also constitute machine-readable media.

The instructions may further be transmitted or received over a network via the network interface device utilizing any one of a number of well-known transfer protocols (e.g., Extensible Markup Language (XML)). While the machine-readable medium is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the device and that causes the device to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

It is appreciated that the software application is configured or configurable to be stored in any memory of the electronic device 2 or on a remote computer in communication with the electronic device 2. The software application is configured or configurable to include the interface capable of allowing a user to define a custom frame speed rate of the video to be recorded without changing the default frame speed rate by the camera 12.

Referring now in more to methods for controlling a special effects operation of live video capturing data in real time. As outline, in some embodiments, the methods comprise capturing a video of real world scene with the camera; playing at normal speed on a graphical user interface the video being captured; changing the playing speed on the graphical user interface of the video being recorded from the normal playing speed to a modified playing speed in response to a user interface input received by the graphical user interface. Reference will now be made in more detail to specific processes according to some embodiments for controlling special effects operations of live video capturing data in real time.

Figure 6:
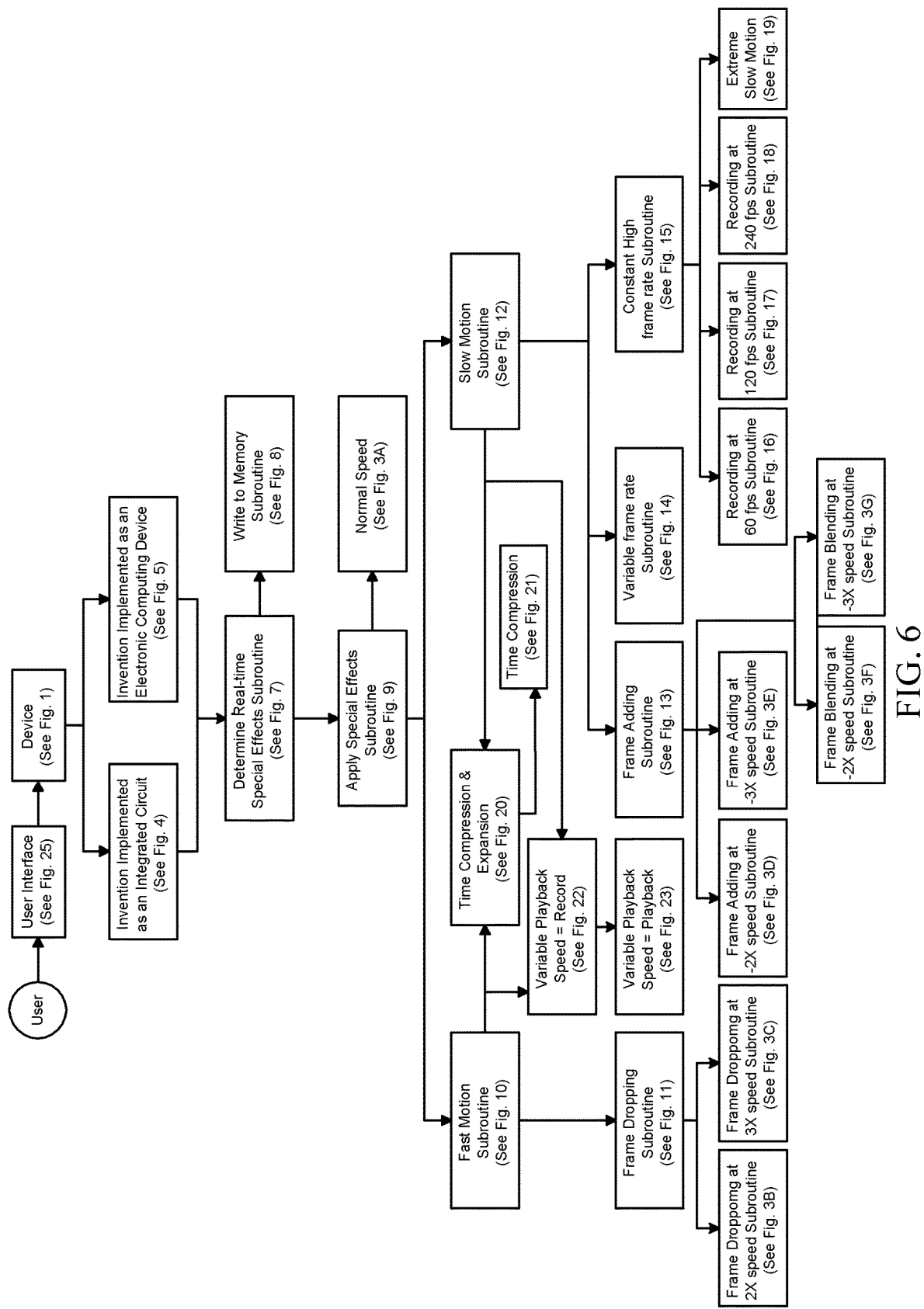
FIG. 6 is a flow chart of an example of the overall process including subroutines that can be utilized.
Figure 7:
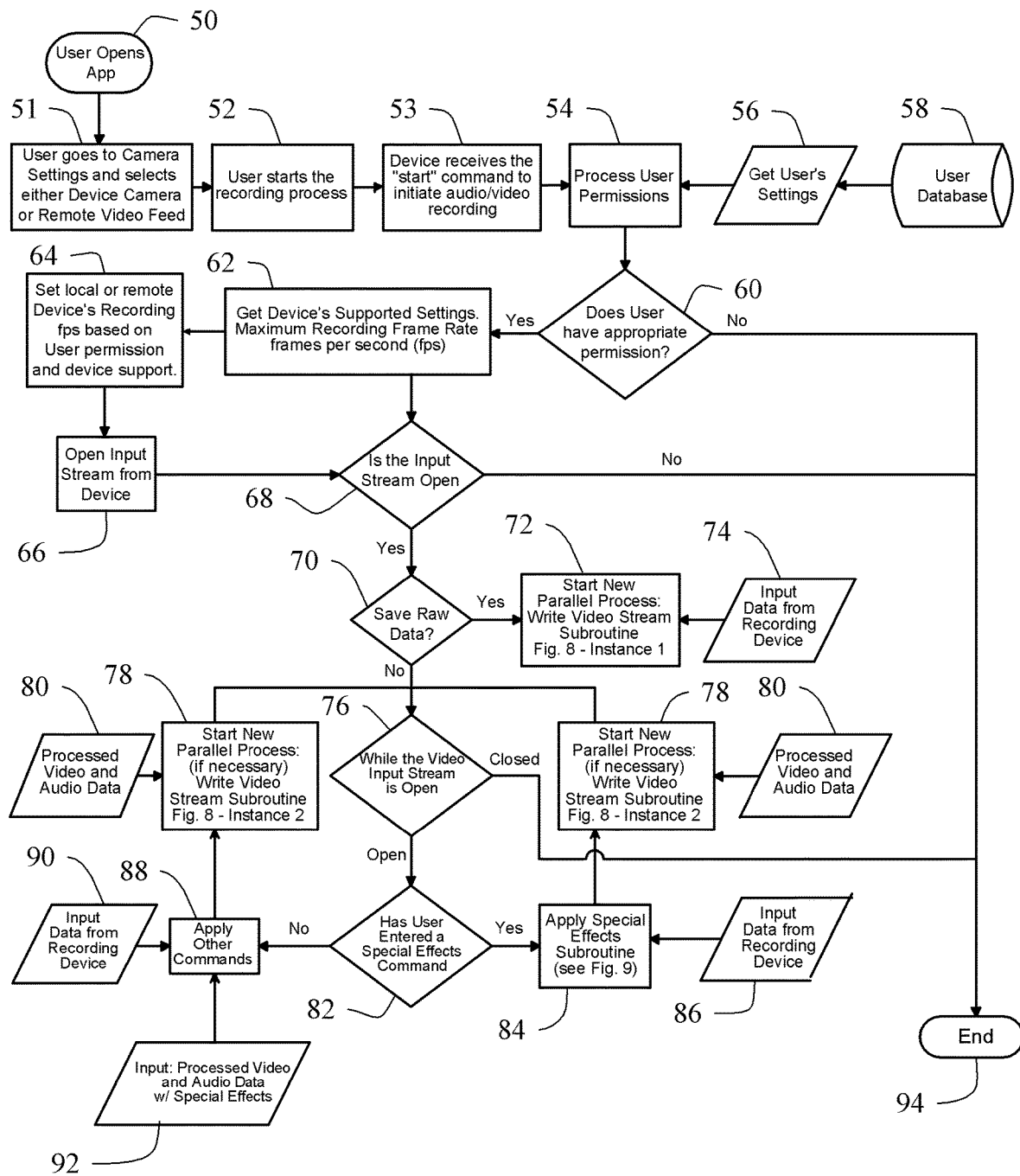
FIG. 7 is a flow chart of an example of a main process that initially determines if a speed up and/or slow down special effects should be utilized in real time.
Figure 24:
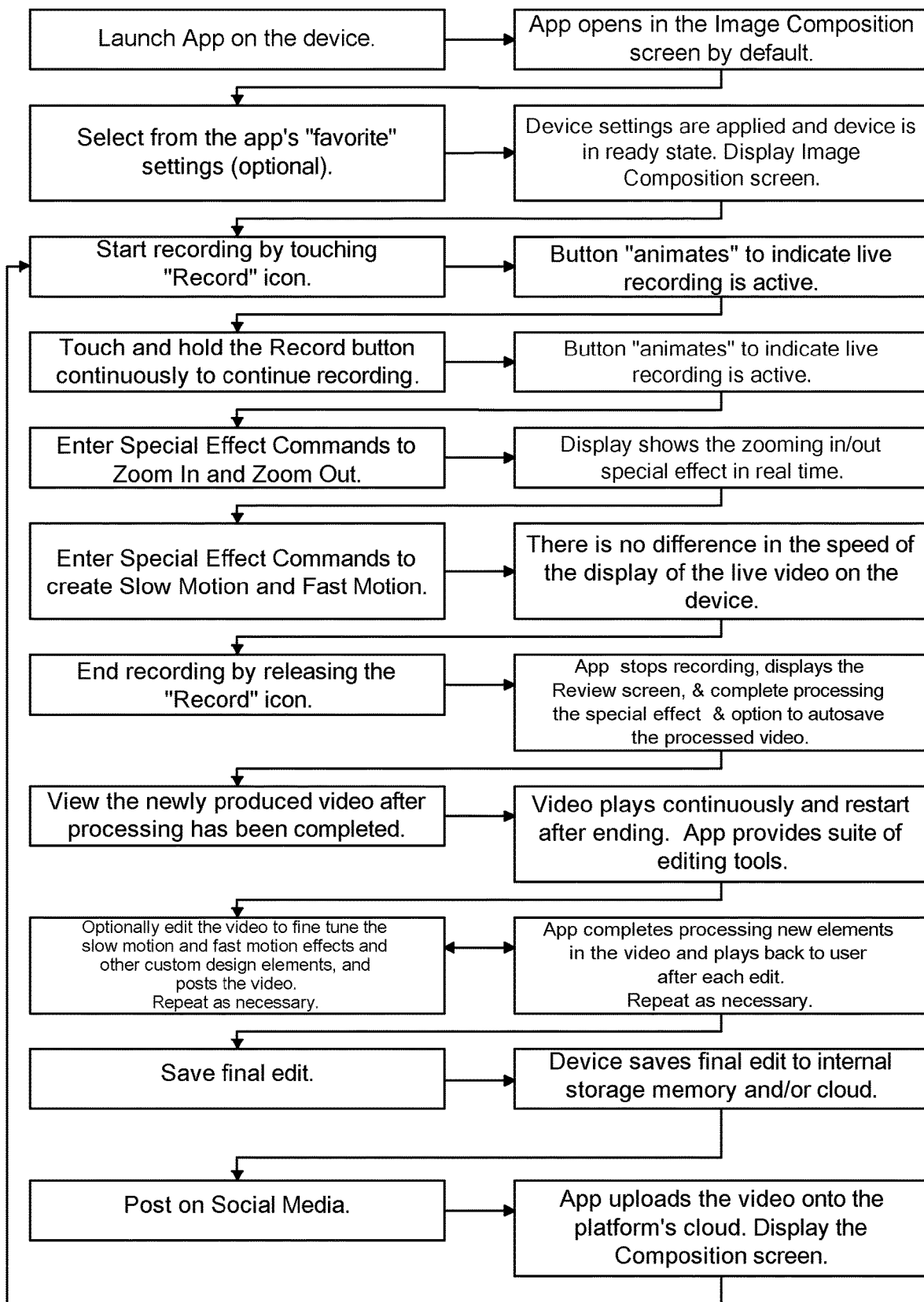
FIG. 24 is a flow chart of an example a possible process by a user utilizing the user interface associated with the present technology.

A possible process of the software application or interface is illustrated in FIGS. 6, 7 and 24. The interface and/or software application allows the user to select a predefined video recording speed rate in real time, without altering the raw speed rate provided by the camera. This makes the present technology not camera or device dependent. FIG. 6 illustrates an overall process of the present technology including the user interface, the device, and the subroutines associated with the overall process.

Referring to FIG. 7, the process of the present technology is described which determines if any special effects option has been requested for raw video data stream from the camera. For exemplary purposes, the special effects can be the changing of video speed rate by modifying of frames in the raw video data. The process can be configured or configurable to initiate subroutines and/or subprocesses to assist in the overall process.

The present technology software application is initiated and the user interface is provided to the user. An initial step can be for the user to opens the App 50. After which, step 51 allows the user to go into Camera Settings and selects either to use the electronic device's camera or a remote video feed. The process then proceeds to step 52 wherein the user starts the recording process. The camera or electronic device receives a "start" command 53 to initiate audio/video recording. It can be appreciated that the camera "start" command can be initiated by the present technology software application, a camera application, any other application associated with the electronic device or with a remote device in communication with the electronic device or camera.

Step 54 in the process can be to determine if the user has appropriate permission to proceed with the process. At step 56, permission attributes can be obtained from separate user settings, profiles, databases, keys, accounts, and the like. The permission attributes can be obtained from a user database 58.

Step 60 determines if the user has the appropriate permission, and if the user does not have the appropriate permission, then the process is stopped or ends (step 94). If the user does have appropriate permission then the process proceeds to step 62, which will get the device's supported settings, including a maximum recording frame rate frames per second (fps). Then the process sets the local or remote device's recording fps based on user permission and device support in step 64, and then opens an input stream from the device in step 66.

Once the raw data input stream from the camera is communicated to the image processing unit, then the process will then determine if the video data stream from the camera is opened in step 68, while receiving information from step 62. This request can be utilized to check if image processing unit is receiving the raw video data from the camera. The raw video data stream may include an integral or peripheral microphone, and can be passed to the image processing unit and not to the memory unit or video recording device. If the process determines that the input stream is not opened, then the process is stopped or ends (step 94).

If the input stream is open, then the process proceeds to step 70 to determine if the raw video data should be saved/recorded. If the raw video data is to be saved, then the process proceeds to step 72 to initiate a new parallel process utilizing the write video stream subroutine as illustrated in instance 1 in FIG. 8. Additional input data from the recording device (step 74) can be saved with the raw video data.

Figure 9:
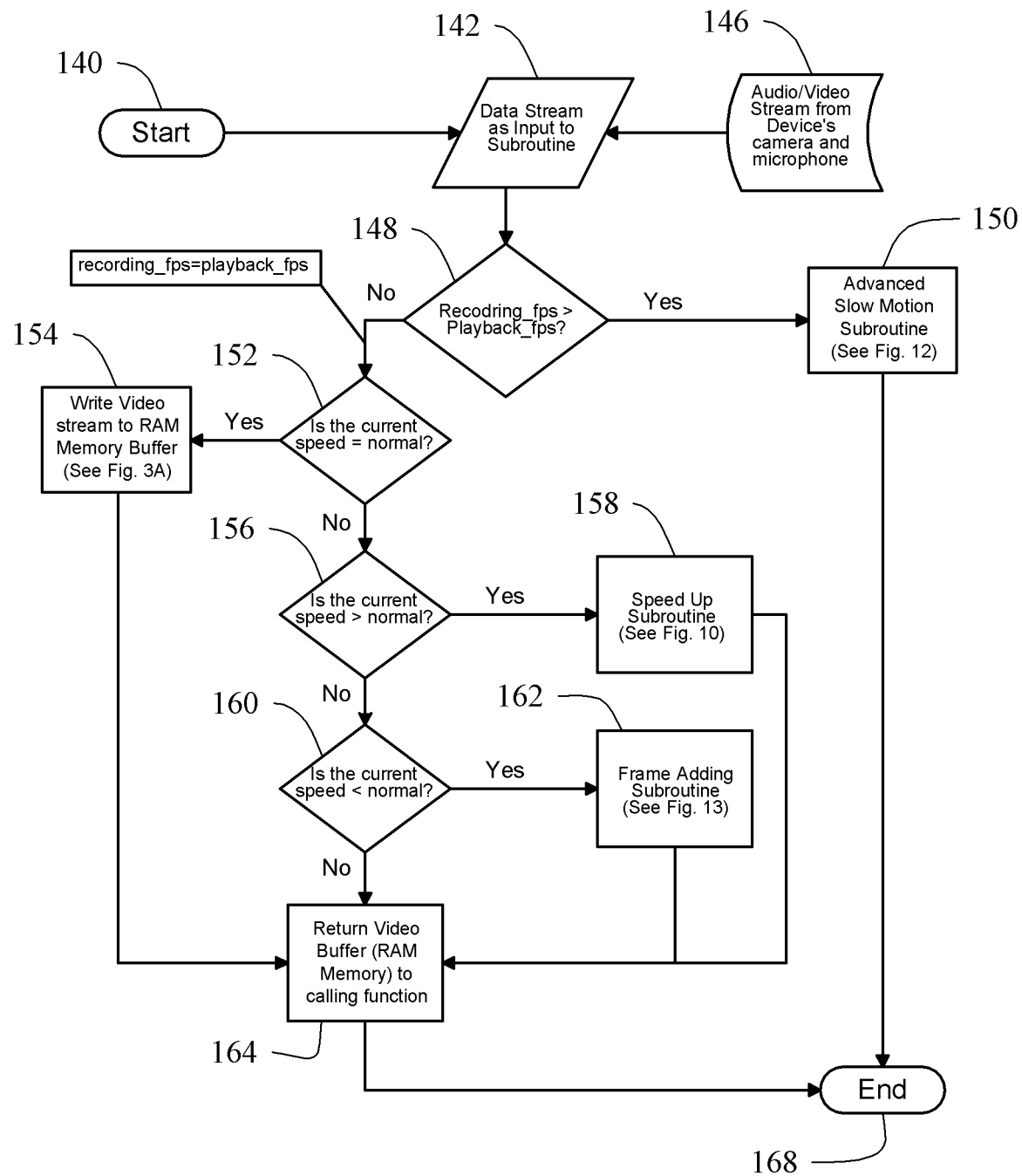
FIG. 9 is a flow chart of an example of the apply special effects subroutine associated with the present technology.

If it was determined in step 70 that the raw video data is not to be saved, then process proceeds to step 76 to determine if while the video input stream is open, and if it is open then the process proceeds to step 76 to determine if a special effect command has been entered by the user (step 82). The special effect command can be entered in this process by way of the interface. If the user entered a special effect command, then step 84 is initiated to apply a special effect subroutine, as best illustrated in FIG. 9. Additional input data from the recording device (step 86) can be included with the application of special effects in step 84.

If the user has not entered a request for a special effect in step 82, such as a change in video speed rate, then step 88 is initialized which applies other commands, such as input data from the recording device (step 90) and/or input processed video and audio data with special effects (step 92). Step 88 can include other information from step 84.

If the video input stream is determined to be closed in step 76, then the process stops or ends (step 94).

Figure 8:
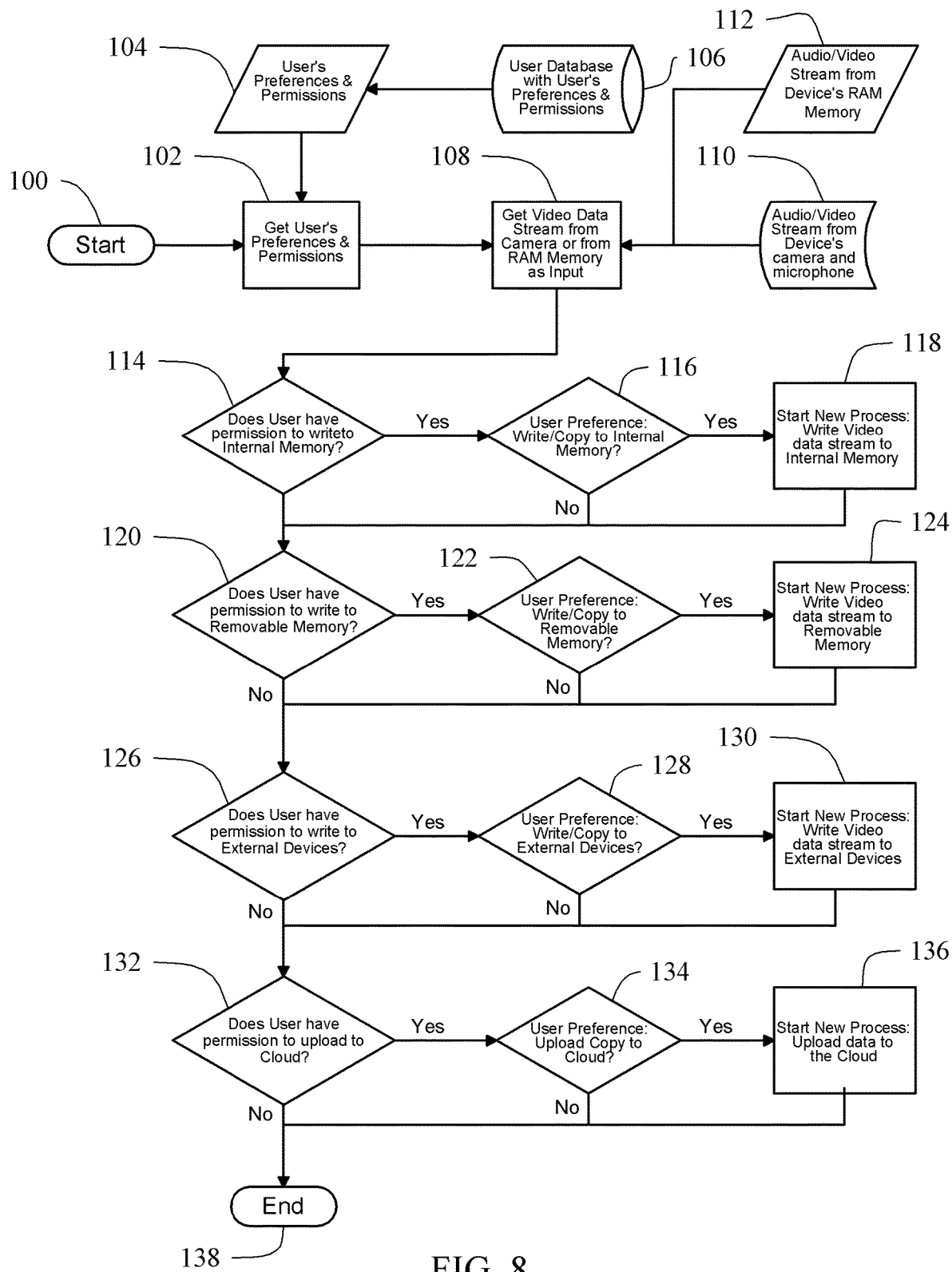
FIG. 8 is a flow chart of an example of the write video stream subroutine associated with the present technology.

If necessary, step 78 can initiate a new parallel process utilizing the write video stream subroutine as illustrated in instance 2 in FIG. 8. Additional processed video and audio data (step 80) can be saved with the video data from step 78. The new parallel process of step 78 can be initiated separately and independently from steps 84 and/or 88. After step 78 the process proceeds back to step 76.

This process can write the raw video stream using the write video stream subroutine after the raw video data stream has been either processed using apply special effect subroutine or has retained the raw video data stream.

Referring to FIG. 8, the write video stream subroutine is describe which provides the process to write/save/record the video data stream to one or more internal memory, to one or more removable memory in communication with the electronic device, to one or more external devices, and/or to upload to one or more cloud devices or accounts.

The present technology process determines in sequence which device or devices is the video data stream to be written to, and if the user has appropriate permission for each of the steps associated with the write video stream subroutine. If the user does have the appropriate permission to write to that particular device or devices, then the process writes the video data stream to that particular device or devices in accordance with any user preferences.

This subroutine starts (step 104) upon initiation by a command from the process in FIG. 7. This subroutine then proceeds to obtain user's preferences and permissions (step 102) from the process in FIG. 7 or a database (steps 104 and 106). After step 102, this subroutine acquires the raw video data stream from the camera as an input (step 108). The raw video data stream can be audio/video stream from the electronic device, the camera and/or the microphone, as per step 110 and/or audio/video stream from the device's RAM memory and/or non-volatile long term memory, as per step 112.

After acquisition of the raw video data stream, step 114 of this subroutine is initiated which determines if the user has permission to write to internal memory. If the user does have the appropriate permission and if the user preferences allows for a write/copy action to internal memory (step 116), then a new process is started at step 118 which writes the video data stream to the internal memory.

If the user does not have permission to write to the internal memory from step 114, or if the user preferences in step 116 do not allow the write/copy action in step 116, or after starting the process in step 118, then this subroutine continues to determine if the user has permission to write to removable memory (step 120). If the user does have the appropriate permission and if the user preferences allows for a write/copy action to removable memory (step 122), then a new process is started at step 124 which writes the video data stream to the removable memory.

If the user does not have permission to write to the removable memory from step 120, or if the user preferences in step 122 does not allow such an action, or after starting the process in step 124, then this subroutine continues to determine if the user has permission to write to external devices (step 126). If the user does have the appropriate permission and if the user preferences allows for a write/copy action to external devices (step 128) is requested, then a new process is started at step 130, which writes the video data stream to the external devices.

If the user does not have permission to write to the external devices from step 126, or if the user preferences in step 128 do not allow the write/copy action in step 128 does not allow such an action, or after starting the process in step 130 is completed, then this subroutine continues to determine if the user has permission to write to cloud (step 132). If the user does have the appropriate permission and if the user preferences allows for a write/copy action to the cloud (step 134), then a new process is started at step 136 which writes the video data stream to the cloud.

If the user does not have permission to write to the cloud from step 132, or if the user preferences from step 134 does not allow such an action, or after starting the process in step 136, then this subroutine stops or ends (step 138).

Referring to FIG. 9, the apply special effects subroutine is described which determines if a special effects option has been requested and to the specific operation of the special effects request. This subroutine starts (step 140) upon initiation by a command from the process in FIG. 7. After starting, this subroutine acquires the raw video data stream from the camera as an input (step 142). The raw video data stream can be audio/video stream from the electronic device, the camera and/or the microphone, as per step 146.

Figure 12:
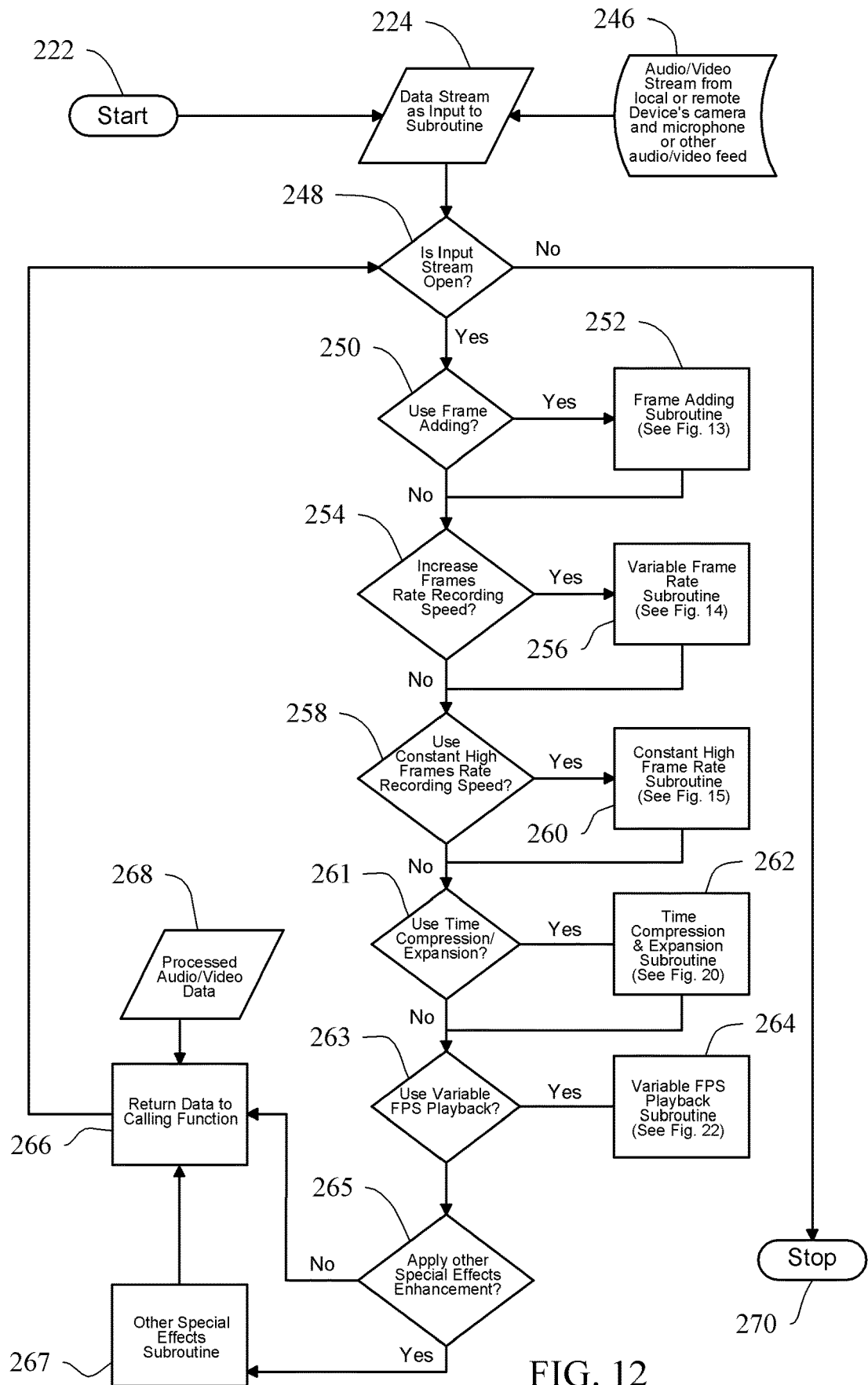
FIG. 12 is a flow chart of an example of the advanced slow motion subroutine associated with the present technology.

After acquisition of the raw video data stream, step 148 is initiated, which determines if the current speed is equal to the normal or native speed, such as but limited to Recording_fps is greater than the Playback_fps. If the user has made a speed change request, then step 150 initiates an advanced slow motion subroutine, as best illustrated in FIG. 12. After the completion of step 150, this subroutine stops or ends (step 168).

If the user has not made a speed change request such that the new speed is not set to normal, such as if the Recording_fps is not greater than the Playback_fps or if the Recording_fps is equal to the Playback_fps, then this subroutine proceeds to step 152 which determines if the current speed is equal to the normal or native speed. If the user has made a speed change request or if user has set the speed back to normal from a previously modified speed setting, then this subroutine continues to step 154 to write video stream to RAM memory and/or non-volatile long term memory buffer, as per FIG. 3A. After step 154 is completed, the subroutine proceeds to step 164 to return video buffer (RAM memory and/or non-volatile long term memory) to a calling function, which can be as step to determine if the video stream is open or this subroutine stops or ends (step 168).

Figure 10:
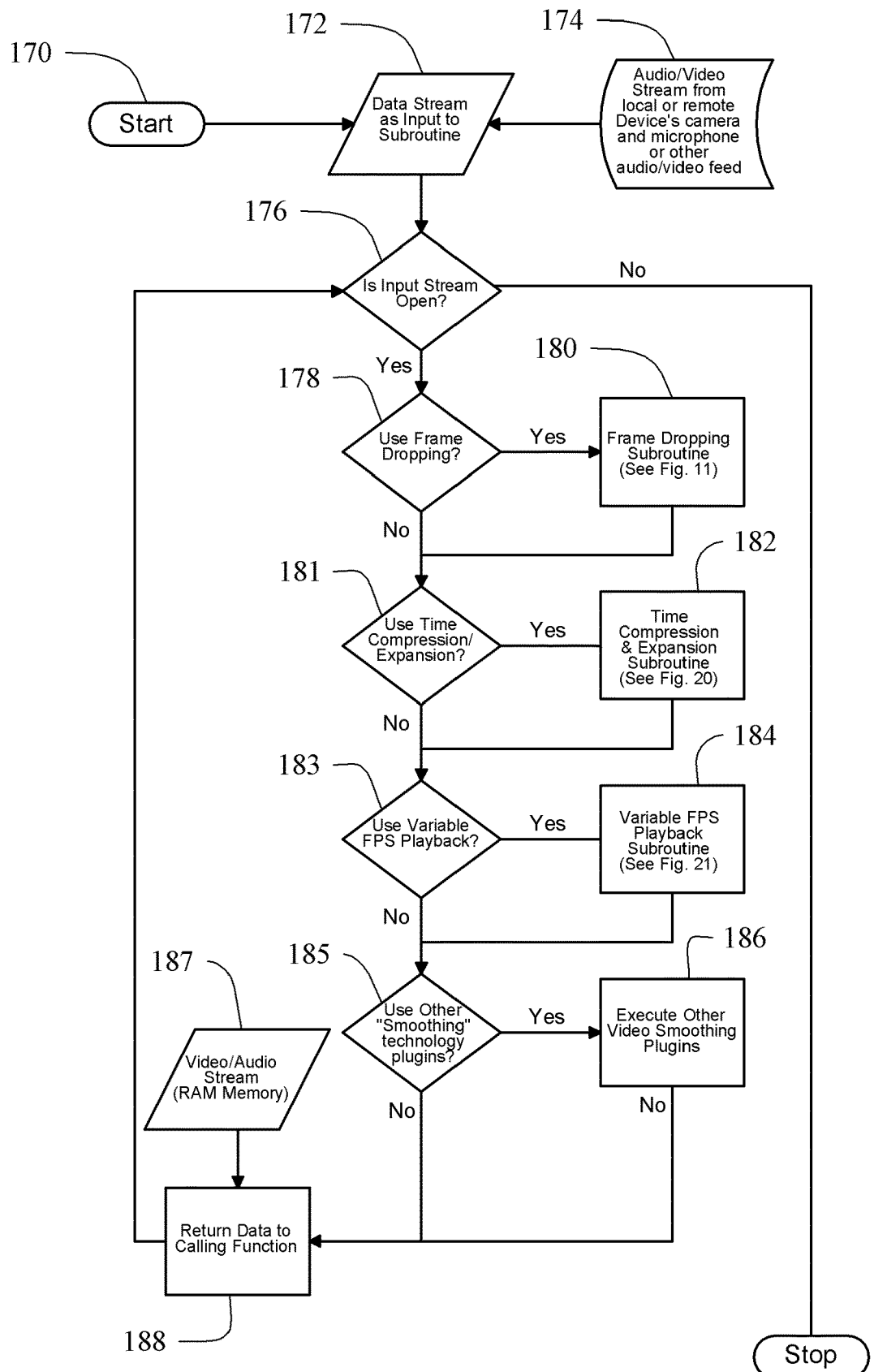
FIG. 10 is a flow chart of an example of the speed up subroutine associated with the present technology.

If the user has not made a speed change request such that the new speed is not set to normal, this subroutine will then proceed to step 156, which determines if the speed change request is faster or slower than the normal speed of the raw video data stream. This can be accomplished by determining if the current speed is greater than normal. If the current speed is greater than the normal spend, then this subroutine will initiate a speed up subroutine (step 158), as best illustrated in FIG. 10. After the speed up subroutine is completed, this subroutine will then initiate step 164 to return video buffer (RAM memory and/or non-volatile long term memory) to the calling function.

Figure 13:
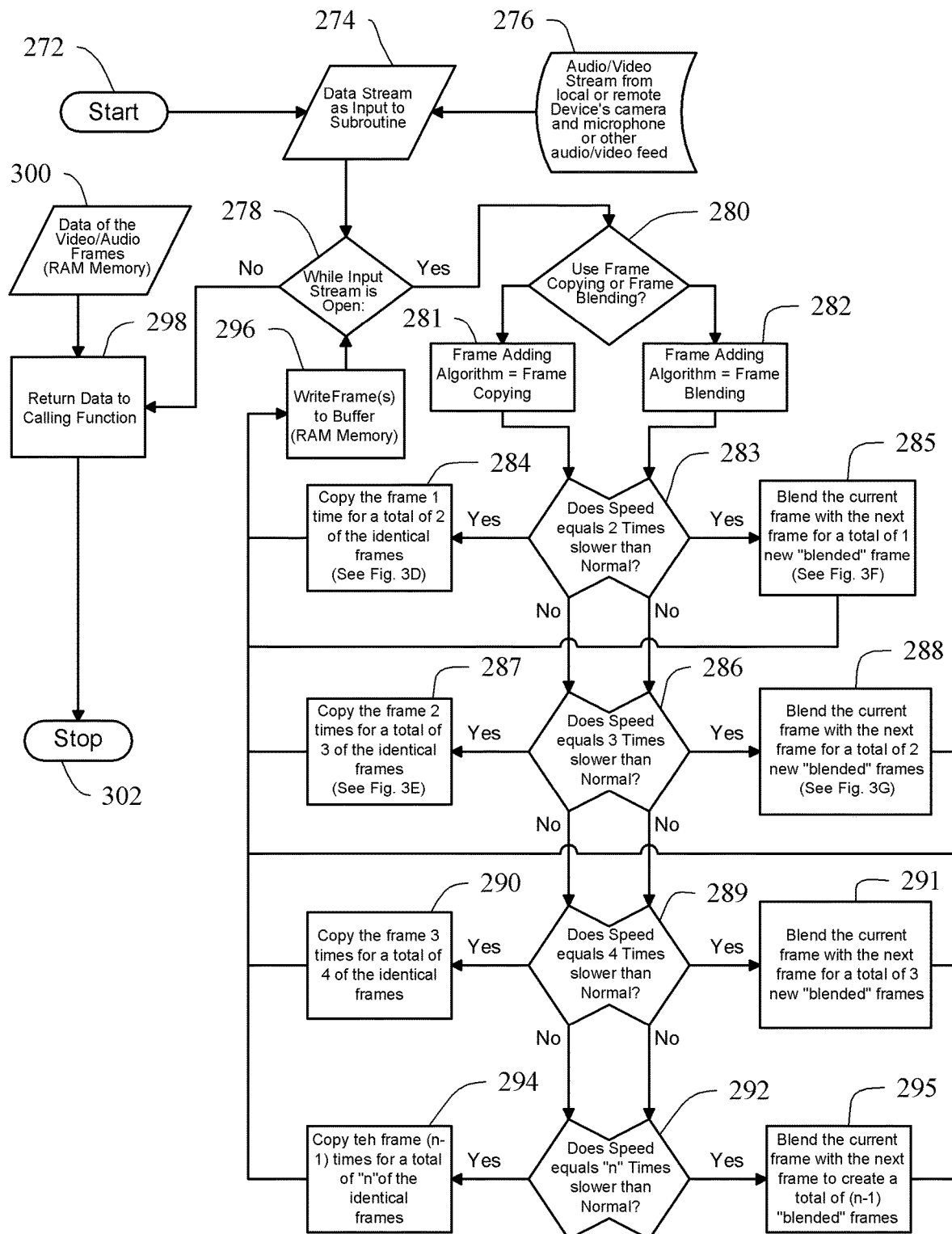
FIG. 13 is a flow chart of an example of the frame adding subroutine for simulating slow motion associated with the present technology.

If the requested current speed is not greater than the normal speed, then this subroutine continues to step 160 to determine if the current speed is to be less than normal. If the current speed is less than the normal spend, then this subroutine will initiate a slow down subroutine (step 162), as best illustrated in FIG. 13. After the slow down subroutine is completed or if the current speed is not to be less than normal, then this subroutine will initiate step 164 to return video buffer (RAM memory and/or non-volatile long term memory) to the calling function.

Referring to FIG. 10, the speed up subroutine is described which determines if a frame dropping option and/or other plugins are required. This subroutine starts (step 170) upon initiation by a command from the apply special effects subroutine (FIG. 9, step 158). After starting, this subroutine acquires the raw video data stream from the camera and/or from streamed input from a remote video feed as an input (step 172). The raw video data stream can be audio/video stream from the local electronic device including the camera and/or microphone, from a remote device including the camera and/or the microphone, or from other audio/video feeds, as per step 174.

After acquisition of the raw video data stream, step 176 of this subroutine is initiated which determines if the video data input stream from the camera is open. If it is not open then this subroutine proceeds to step 189, which stops or ends this subroutine.

Figure 11:
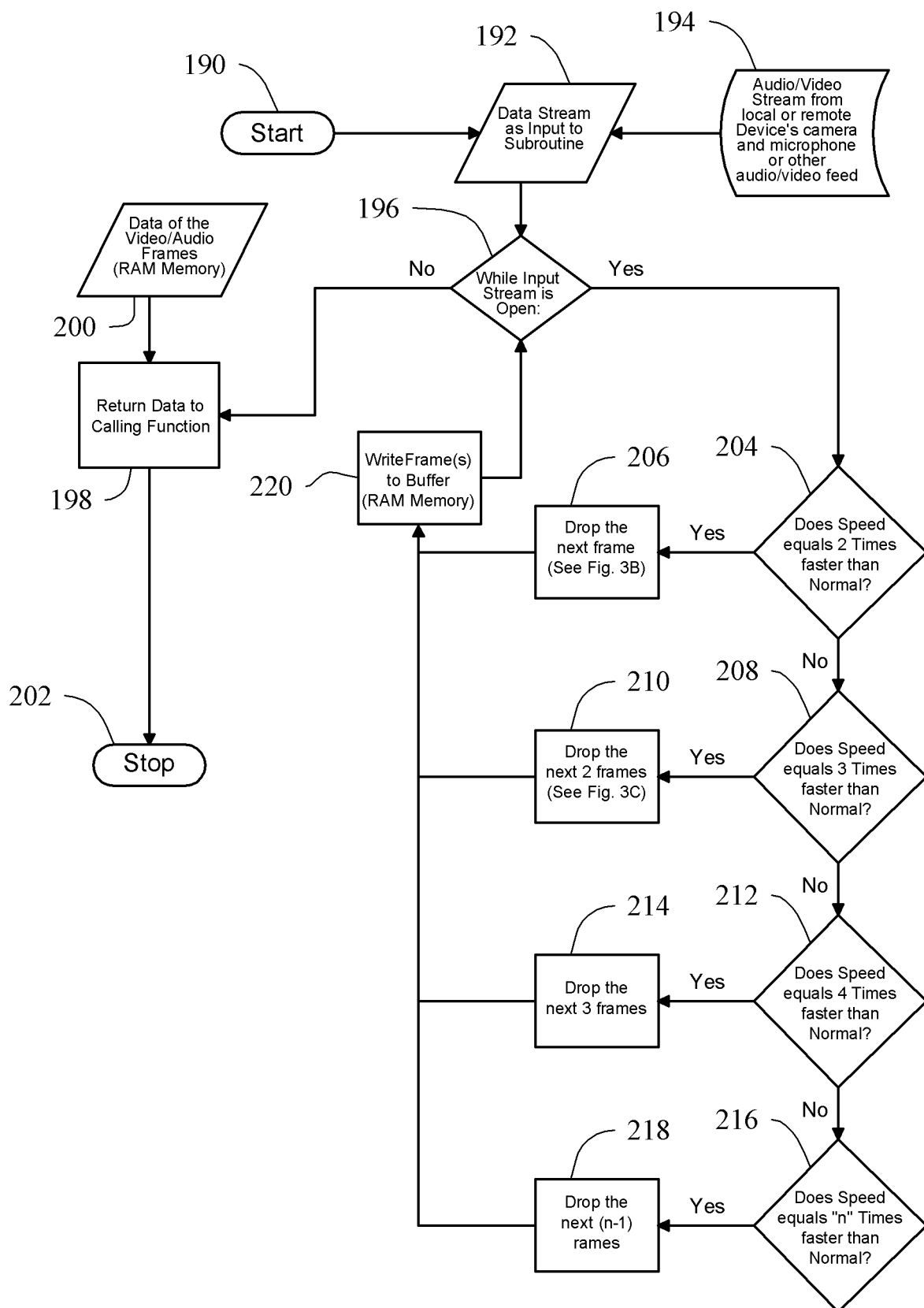
FIG. 11 is a flow chart of an example of the frame dropping subroutine for simulating fast motion associated with the present technology.

If the input stream is open then this subroutine determines if frame dropping is required (step 178), and if required then continues to step 180 that initiates a frame dropping subroutine as best illustrated in FIG. 11.

Figure 20:
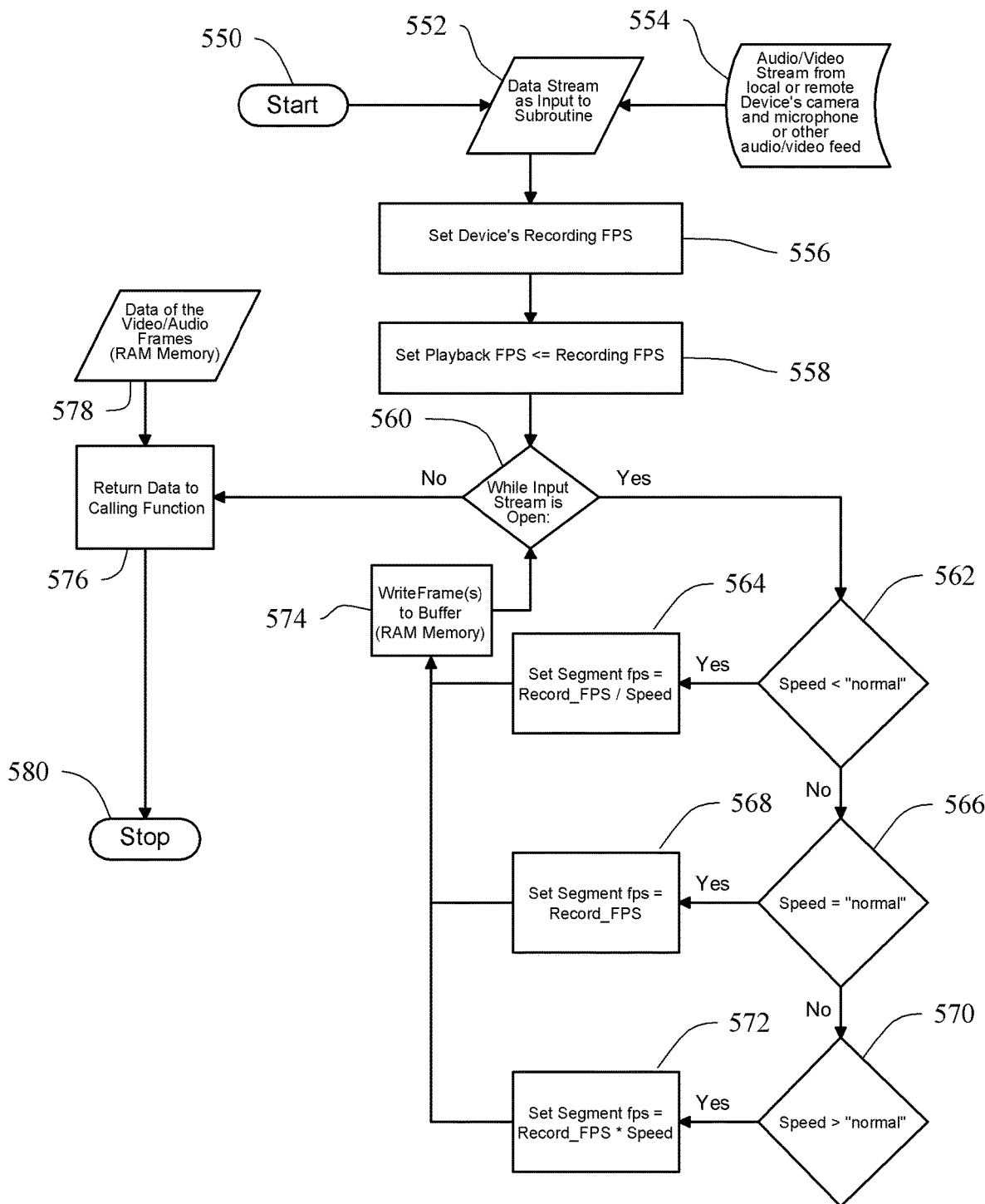
FIG. 20 is a flow chart of an example of time expansion and compression subroutine to simulate slow motion and fast motion associated with the present technology.

If frame dropping is not required from step 178 or after the frame dropping subroutine of step 180 is completed, then this subroutine proceeds to step 181 to determine if the use of time compression or expansion is requested, and if required then continues to step 182 that initiates a time compression and expansion subprocess as best illustrated in FIG. 20.

Figure 21:
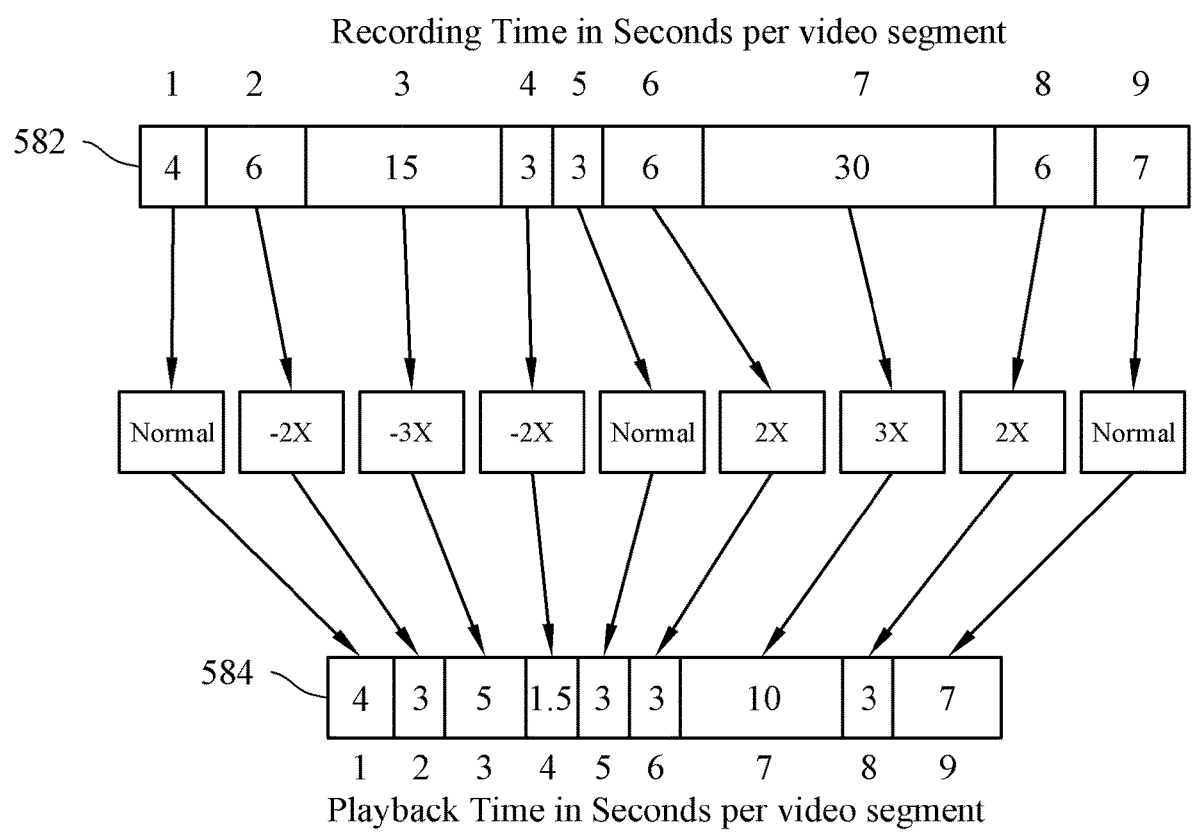
FIG. 21 is a representation of a series of associated recording and playback video segments per time in seconds indicating an example of a time compression of FIG. 20.

If frame time compression and/or expansion is not required from step 181 or after the time compression and/or expansion subprocess of step 182 is completed, then this subroutine proceeds to step 183 to determine if the use of variable FPS playback is requested, and if required then continues to step 184 that initiates a variable FPS playback subprocess as best illustrated in FIG. 21.

If frame variable FPS playback is not required from step 183 or after the variable FPS playback subprocess of step 184 is completed, then this subroutine proceeds to step 185 to determine if other plugins or applications are requested.

In the case that other plugins or application is requested, then this subroutine proceeds to step 186 to execute the other plugins or applications and apply their functions to the raw video stream from step 178 or modified video stream from any of steps 180, 182 and/or 184. For example, other plugins or applications can be, but not limited to, smoothing technology and the like. These other plugins or applications can be integrated with the present technology software application, or can be remote from the present technology but accessible and operable with present technology software application.

In the case the user does not request the use of other plugins or applications from step 185 or after the other plugin process of step 186 is completed, then this subroutine will continue to step 188 to return data to a calling function that loops back to step 176 to determine if the video input stream is open. Step 188 can receive video/audio streams from RAM memory and/or non-volatile long term memory (step 187).

It can be appreciated that this apply special effects subroutine includes a looped subprocess including steps 178, 180, 185, 186 and 188 until the input stream is determined to not be open in step 176.

With reference to FIG. 11, the frame dropping subroutine is described which determines if and which frames are dropped to simulate the requested fast motion video. An exemplary case for this subroutine can be if the Record_fps is equal to the Playback_fps. This subroutine starts (step 190) upon initiation by a command from the speed up subroutine. After starting, this subroutine acquires the raw video data stream from the camera as an input (step 192). The raw video data stream can be audio/video stream from the local electronic device including the camera and/or microphone, from a remote device including the camera and/or the microphone, or from other audio/video feeds, as per step 194.

After acquisition of the raw video data stream, step 196 of this subroutine is initiated which determines if the video data input stream from the camera is open. If step 196 determines that the input stream is not open, then this subroutine proceeds to step 198, which returns data to a calling function being step 180 in FIG. 10. Step 198 can receive data of the video/audio frames from RAM memory and/or non-volatile long term memory (step 200). After the step 198 is completed, then this subroutine stops or ends (step 202).

While the input stream is open from step 196, this subroutine determines if the speed equals 2 times faster than normal (step 204). If so then step 206 is initialized which will drop the next frame, as per FIG. 3B. After which, this subroutine proceeds to step 220 to write frame(s) to buffer (RAM memory and/or non-volatile long term memory). After step 220, this subroutine returns to step 196.

If the speed does not equal 2 times faster than normal (step 204), then this subroutine determines if the speed equals 3 times faster than normal (step 208). If so then step 210 is initialized which will drop the next 2 frames, as per FIG. 3C. After which, this subroutine proceeds to step 220 and then returns to step 196.

If the speed does not equal 3 times faster than normal (step 208), then this subroutine determines if the speed equals 4 times faster than normal (step 212). If so then step 214 is initialized which will drop the next 3 frames. After which, this subroutine proceeds to step 220 and then returns to step 196.

If the speed does not equal 4 times faster than normal (step 212), then this subroutine will sequentially continue to determine if the speed equals "n" times faster than normal (step 216). If so then each "$n^{th}$" step will initialize a drop the next (n−1) frames action (step 218). After which, this subroutine proceeds to step 220 and then returns to step 196.

It can be appreciated that this frame dropping subroutine determines if a frame should or should not be dropped on a frame-by-frame basis. The result is a modified video stream with specific frames removed to simulate a fast motion video of predetermined speed. This modified video stream is then written/saved to memory in real time.

It can be appreciated that this frame dropping subroutine includes a looped subprocess including steps 204-220 until the input stream is determined to not be open in step 196.

Referring to FIG. 12, the advanced slow motion subroutine is described which determines if a frame adding option or other plugins are required. This subroutine starts (step 222) upon initiation by a command from the apply special effects subroutine. After starting, this subroutine acquires the raw video data stream from the camera as an input (step 224). The raw video data stream can be audio/video stream from the local electronic device including the camera and/or microphone, from a remote device including the camera and/or the microphone, or from other audio/video feeds, as per step 246.

After acquisition of the raw video data stream, step 248 of this subroutine is initiated which determines if the video data input stream from the camera is open. If step 248 determines that the input stream is not open, then this subroutine proceeds to step 270, which stops this subroutine.

While the input stream is open from step 248, this subroutine determines if frame adding is required (step 250), and if required then continues to step 252 that initiates a frame adding subroutine, as best illustrated in FIG. 13.

Figure 14:
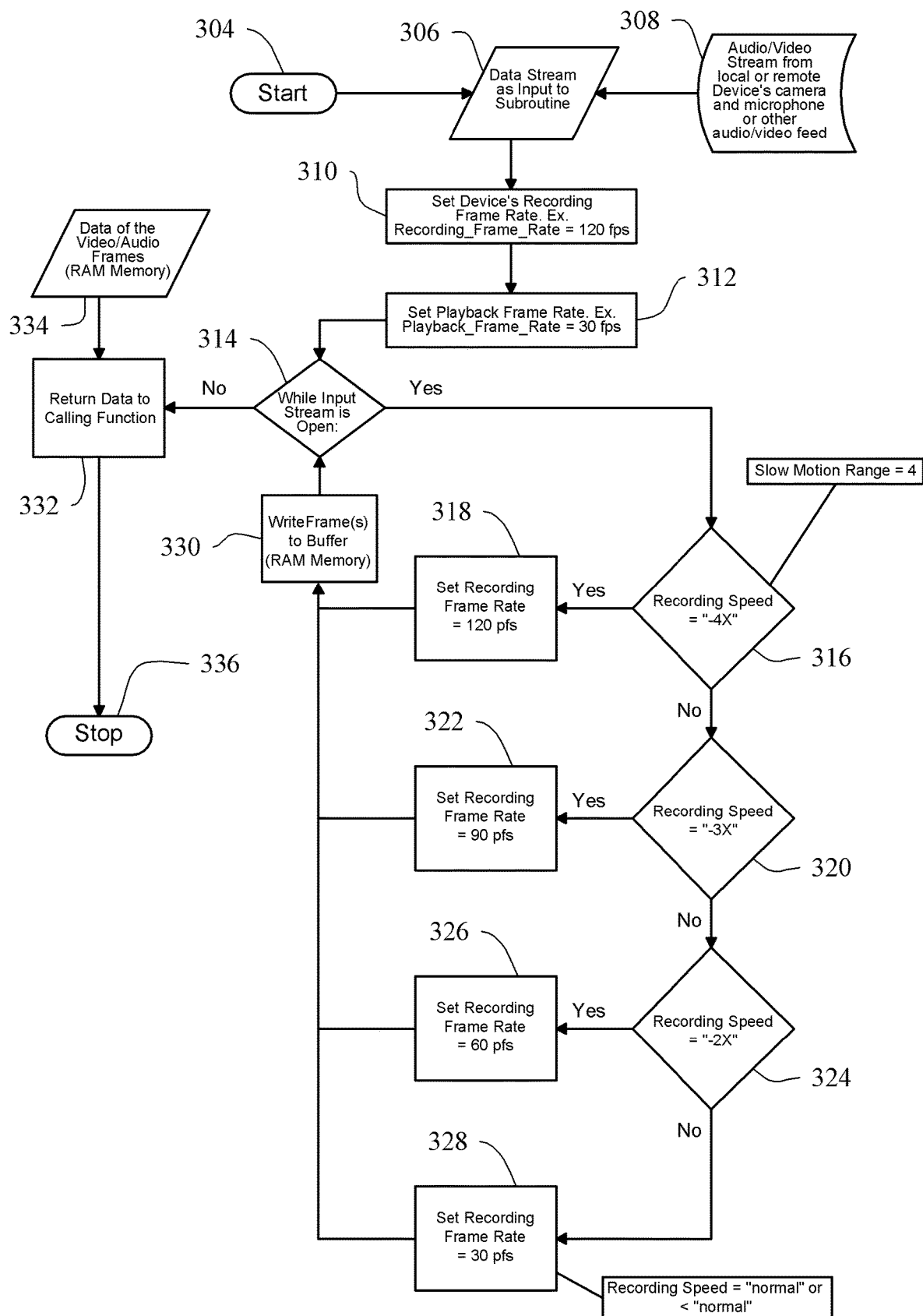
FIG. 14 is a flow chart of an example of the variable high recording fps subroutine (120 fps) for simulating slow motion associated with the present technology.

If frame adding is not required from step 250 or after the frame adding subroutine from step 252 is completed, then this subroutine proceeds to step 254 to determine if an increase in frames rate recording speed is required. If so, then this subroutine continues to step 256, which initiates a variable frame rate subroutine or an increase frame rate subroutine, as best illustrated in FIG. 14.

Figure 15:
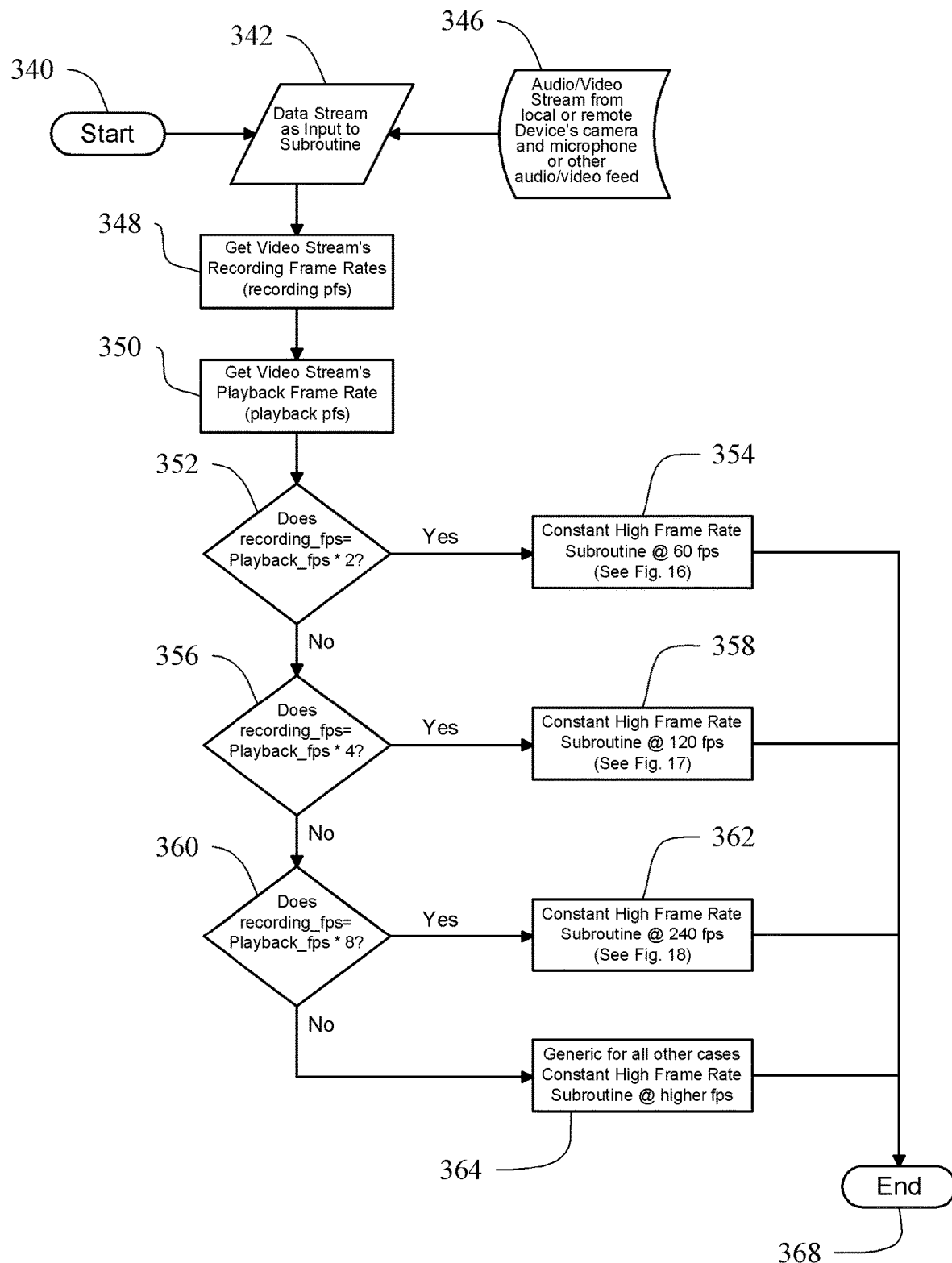
FIG. 15 is a flow chart of an example of the constant frame rate slow motion subroutine associated with the present technology.

If increase in frames rate recording speed is not required from step 254 or after the variable frame rate subroutine from step 256 is completed, then this subroutine proceeds to step 258 to determine if a constant high frames rate recording speed is to be used. If so, then this subroutine proceeds to step 260, which initiates a constant high frame rate subroutine, as best illustrated in FIG. 15.

If frame constant high frames rate recording speed is not required from step 258 or after the constant high frames rate recording speed subroutine of step 260 is completed, then this subroutine proceeds to step 261 to determine if the use of time compression or expansion is requested, and if required then continues to step 262 that initiates a time compression and expansion subprocess as best illustrated in FIG. 20.

Figure 22:
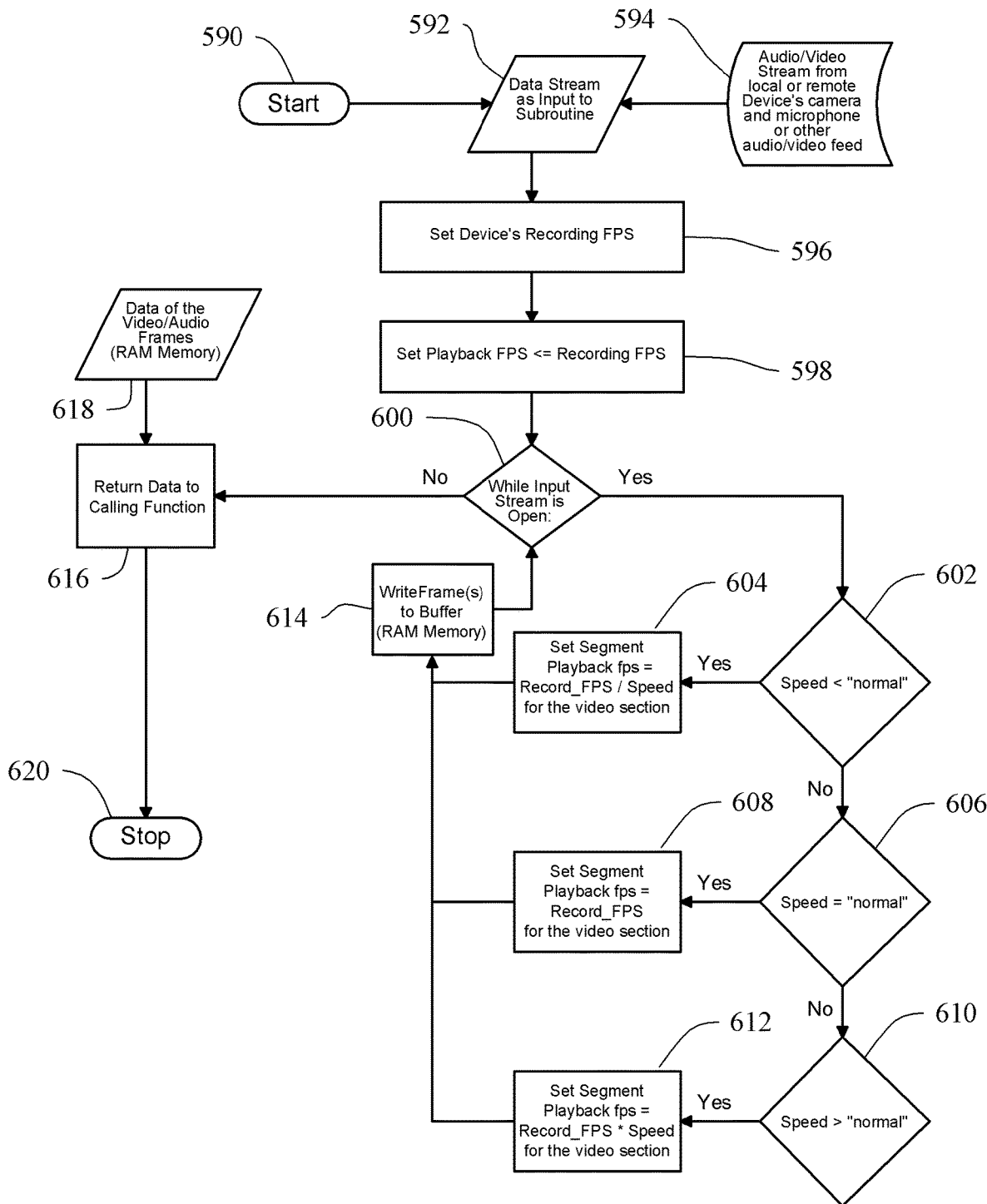
FIG. 22 is a flow chart of an example of a recording using a variable playback rate to simulate slow motion and fast motion associated with the present technology.

If frame time compression and/or expansion is not required from step 261 or after the time compression and/or expansion subprocess of step 262 is completed, then this subroutine proceeds to step 263 to determine if the use of variable FPS playback is requested, and if required then continues to step 264 that initiates a variable FPS playback subprocess as best illustrated in FIG. 22.

If frame variable FPS playback is not required from step 263 or after the variable FPS playback subprocess of step 264 is completed, then this subroutine proceeds to step 265 to determine if other special effects enhancement is requested. In the case that other special effects enhancement is requested, then this subroutine proceeds to step 267, which can execute the other special effects subroutine and apply their functions to the raw or modified video stream. This other special effects subroutine can be integrated with the present technology software application, or can be remote from the present technology but accessible and operable with present technology software application.

In the case the user does not request the use of other special effects enhancement from step 265 or after the other special effects subroutine from step 267 is completed, then this subroutine will continue to step 266 to return data to a calling function that loops back to step 248 to the determine if the video input stream is open. It can be appreciated that other processed audio/video data can be part of the data returned to the calling function, as per step 268.

It can be appreciated that this advanced slow motion subroutine includes a looped subprocess including steps 250-266 until the input stream is determined to not be open in step 248.

With reference to FIG. 13, the frame adding subroutine associated with the slow down subroutine of FIG. 12 is described which determines if and which frames are added to simulate the requested slow motion video. This subroutine assumes that recording fps=playback fps. This subroutine starts (step 272) upon initiation by a command from the slow down subroutine. After starting, this subroutine acquires the raw video data stream from the camera as an input (step 274). The raw video data stream can be audio/video stream from the local electronic device including the camera and/or microphone, from a remote device including the camera and/or the microphone, or from other audio/video feeds, as per step 276.

After acquisition of the raw video data stream, step 274 of this subroutine is initiated which determines if the video data input stream from the camera is open. If step 278 determines that the input stream is not open, then this subroutine proceeds to step 298, which returns data to a calling function being step 252 in FIG. 12. Step 298 can receive data of the video/audio frames from RAM memory and/or non-volatile long term memory (step 300). After step 298 is completed, then this subroutine stops or ends (step 302).

While the input stream is open from step 278, this subroutine determines the type of frame adding to utilize in step 280, either simple frame copying (step 281) or a more CPU intensive frame blending (step 282). If the user has selected frame copying, then the process proceeds to step 281 and the algorithm and its description are unchanged. However, if the user selected "Frame Blending" and their hardware supports it, then the process proceeds to step 282 and the algorithm can include new or additional steps.

It can be appreciated that if frame copying was selected during step 280 then for each of the speed "checks", logically, the process will proceed along the left algorithm path. It can be further appreciated that if frame blending was selected during step 280 then for each of the speed "checks", logically, the process will proceed along the right algorithm path.

The subroutine continues to determine if the speed equals 2 times slower than normal (step 283). If so, for the frame copying path, then step 284 is initialized which will copy the frame 1 time for a total of 2 of the identical frames, as per FIG. 3D. After which, this subroutine proceeds to step 296 to write frame(s) to buffer (RAM memory and/or non-volatile long term memory). After step 296, this subroutine returns to step 278. For the frame blending path, then step 285 is initialized which will blend the current frame with the next frame for a total of 1 new "blended" frame, as per FIG. 3F. After which, this subroutine proceeds to step 296.

If the speed does not equal 2 times slower than normal (step 283), then this subroutine determines if the speed equals 3 times slower than normal (step 286). If so, for the frame copying path, then step 287 is initialized which will copy the frame 2 times for a total of 3 of the identical frames, as per FIG. 3E. After which, this subroutine proceeds to step 296 and then returns to step 278. For the frame blending path, then step 288 is initialized which will blend the current frame with the next frame for a total of 2 new "blended" frames, as per FIG. 3G. After which, this subroutine proceeds to step 296.

If the speed does not equal 3 times slower than normal (step 286), then this subroutine determines if the speed equals 4 times slower than normal (step 289). If so, for the frame copying path, then step 290 is initialized which will copy the frame 3 times for a total of 4 of the identical frames. After which, this subroutine proceeds to step 296 and then returns to step 278. For the frame blending path, then step 291 is initialized which will blend the current frame with the next frame for a total of 3 new "blended" frames. After which, this subroutine proceeds to step 296.

If the speed does not equal 4 times slower than normal (step 289), then this subroutine will continue to determine if the speed equals "n" times slower than normal (step 292). If so, for the frame copying path, then each "$n^{th}$" step will copy the frame (n−1) times for a total of "n" of the identical frames. After which, this subroutine proceeds to step 296 and then returns to step 278. For the frame blending path, then step 295 is initialized which will blend the current frame with the next frame for a total of (n−1) new "blended" frames. After which, this subroutine proceeds to step 296.

It can be appreciated that this frame adding subroutine includes a looped subprocess including steps 280-296 until the input stream is determined to not be open in step 278.

With reference to FIG. 14, an example of the variable high recording fps subroutine (120 FPS) associated with the variable frame rate subroutine of FIG. 12 is described. This variable frame rate subroutine can be utilized for simulating slow motion, such as but limited to, slow motion range=recording speed/playback fps=120 fps/30 fps=4.

This subroutine starts (step 304) upon initiation by a command from the slow down subroutine. After starting, this subroutine acquires the raw video data stream from the camera as an input (step 306). The raw video data stream can be audio/video stream from the local electronic device including the camera and/or microphone, from a remote device including the camera and/or the microphone, or from other audio/video feeds, as per step 308.

After acquisition of the raw video data stream, step 310 of this subroutine is initiated to set the device's recording frame rate, for example to Recording_Frame_Rate=120 fps. After which, step 312 sets the device's playback frame rate, for example to Playback_Frame_Rate=30 fps.

Step 314 of this subroutine is initiated which determines if the video data input stream from the camera is open. If step 314 determines that the input stream is not open, then this subroutine proceeds to step 332, which returns data to a calling function being step 256 in FIG. 12. Step 332 can receive data of the video/audio frames from RAM memory and/or non-volatile long term memory (step 334). After step 332 is completed, then this subroutine stops or ends (step 336).

While the input stream is open from step 314, this subroutine determines if the recording speed equals "−4×" (step 316), which can be a slow motion range of 4. If so then step 318 is initialized which sets the recording frame rate to 120 fps. After which, this subroutine proceeds to step 330 to write frame(s) to buffer (RAM memory and/or non-volatile long term memory). After step 330, this subroutine returns to step 314.

If the recording speed does not equal "−4×" (step 316), then this subroutine determines if the recording speed equals "−3×" (step 320). If so then step 322 is initialized which sets the recording frame rate to 90 fps. After which, this subroutine proceeds to step 330 to write frame(s) to buffer (RAM memory and/or non-volatile long term memory). After step 330, this subroutine returns to step 314.

If the recording speed does not equal "−3×" (step 320), then this subroutine determines if the recording speed equals "−2×" (step 324). If so then step 326 is initialized which sets the recording frame rate to 60 fps. After which, this subroutine proceeds to step 330 to write frame(s) to buffer (RAM memory and/or non-volatile long term memory). After step 330, this subroutine returns to step 314.

If the recording speed does not equal "−2×" (step 324), then this subroutine will set the recording frame rate to 30 fps (step 328), which can be a recording speed equal to or less than "normal". After which, this subroutine proceeds to step 330 to write frame(s) to buffer (RAM memory and/or non-volatile long term memory). After step 330, this subroutine returns to step 314.

It can be appreciated that this variable high recording fps subroutine includes a looped subprocess including steps 316-330 until the input stream is determined to not be open in step 314.

With reference to FIG. 15, an example of the constant frame rate slow motion subroutine associated with the constant high frame rate subroutine of FIG. 12 is described. This constant frame rate slow motion subroutine can be utilized for simulating slow motion.

This subroutine starts (step 340) upon initiation by a command from the slow down subroutine. After starting, this subroutine acquires the raw video data stream from the camera as an input (step 342). The raw video data stream can be audio/video stream from the local electronic device including the camera and/or microphone, from a remote device including the camera and/or the microphone, or from other audio/video feeds, as per step 346.

After acquisition of the raw video data stream, step 348 of this subroutine is initiated which gets the video stream's recording frame rates (recording fps), and then continues to step 350 that gets the video stream's playback frame rates (playback fps).

Figure 16:
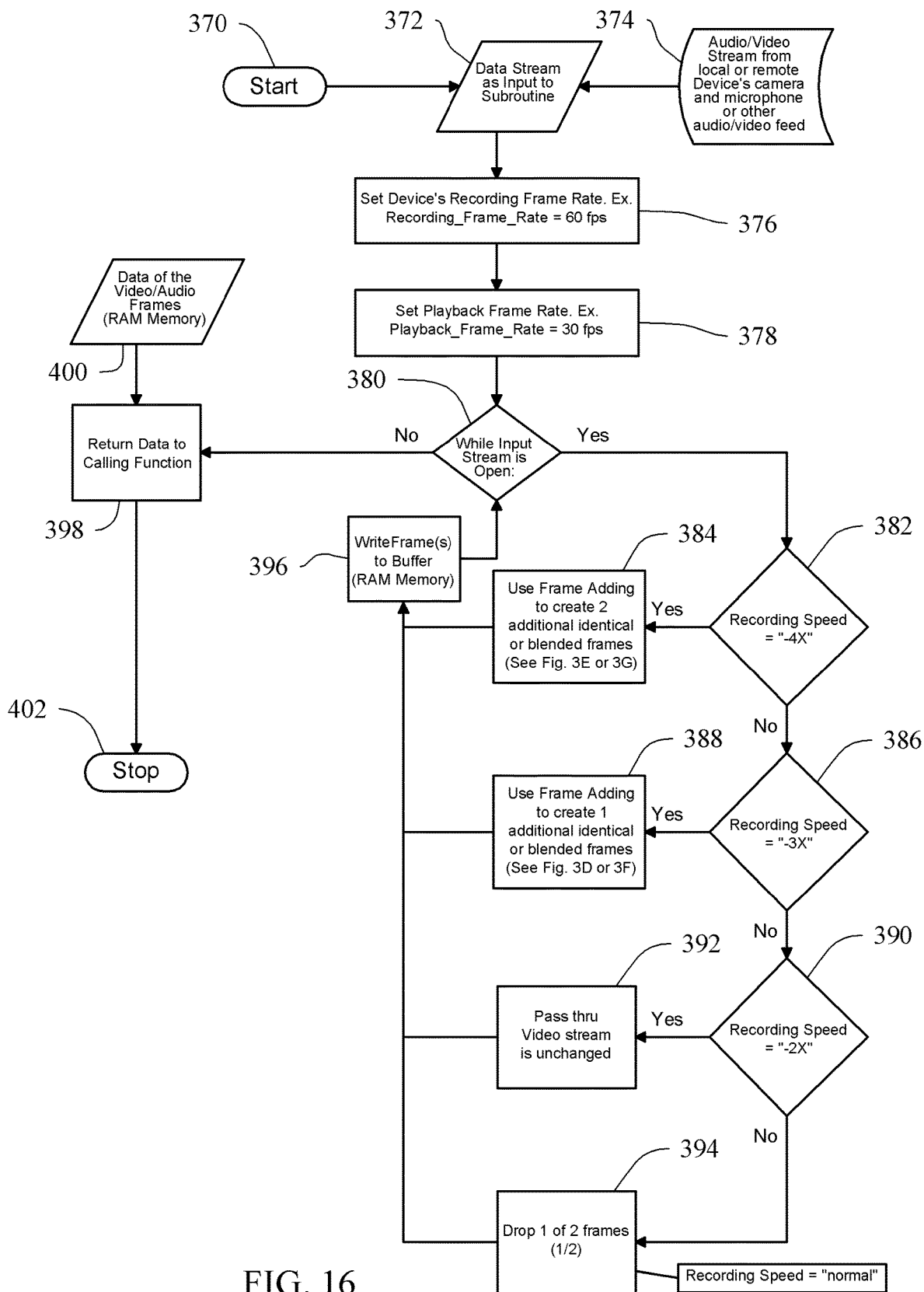
FIG. 16 is a flow chart of an example of the constant high recording fps subroutine (60 fps) for simulating slow motion associated with the present technology.

With the recording and playback frame rates acquired, this subroutine then determines if the recording_fps=playback_fps*2 (step 352). If so, then it proceeds to step 354 to initiate a constant high frame rate subroutine at 60 fps, as best illustrated in FIG. 16. After which, this subroutine stops or ends (step 368).

Figure 17:
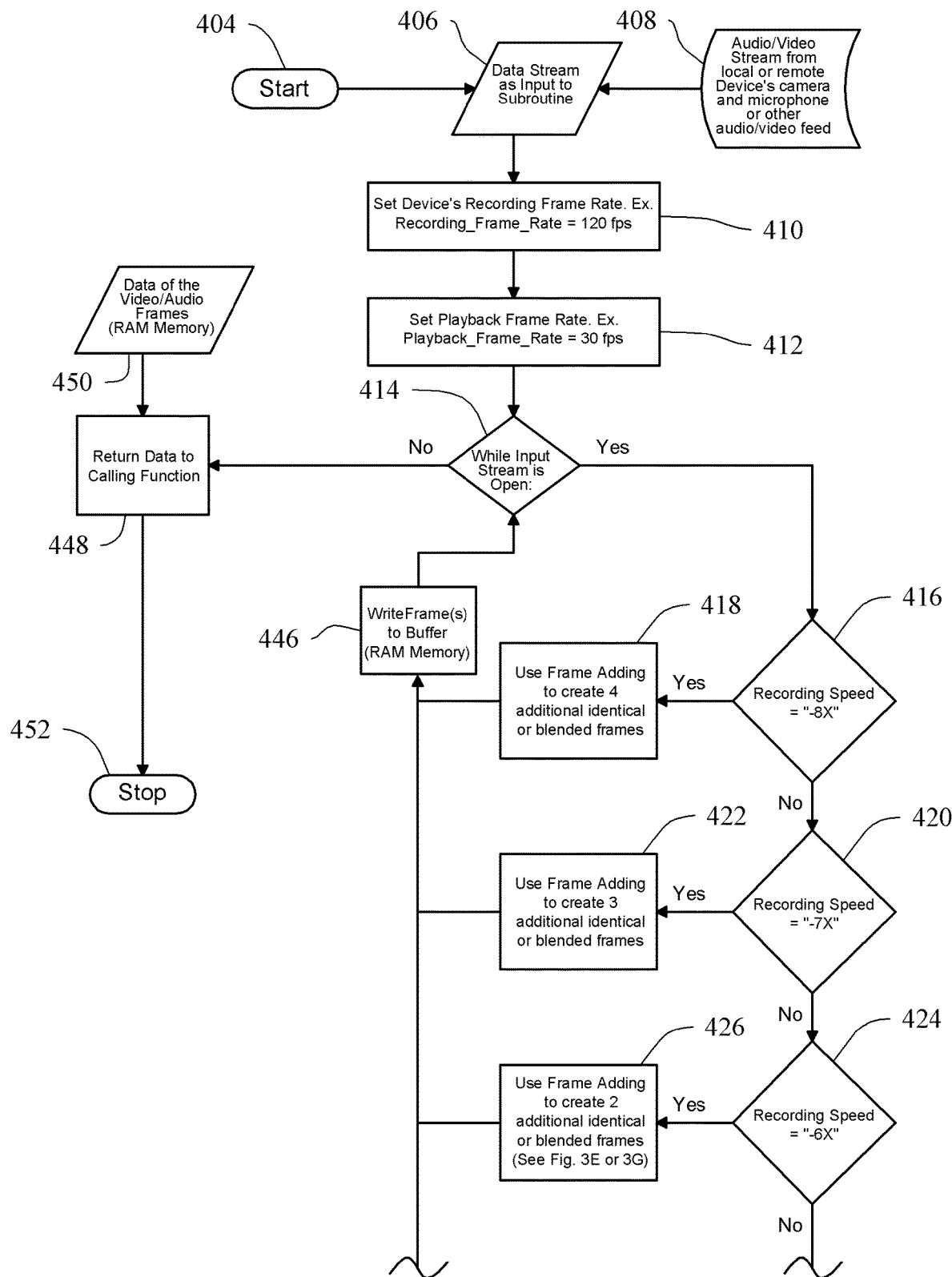
FIG. 17 is a flow chart of an example of the constant high recording fps subroutine (120 fps) for simulating slow motion associated with the present technology.

If is not found that the recording_fps=playback_fps*2, then this subroutine proceeds to step 356 to determine if the recording_fps=playback_fps*4. If so, then it proceeds to step 358 to initiate a constant high frame rate subroutine at 120 fps, as best illustrated in FIG. 17. After which, this subroutine stops or ends (step 368).

Figure 18:
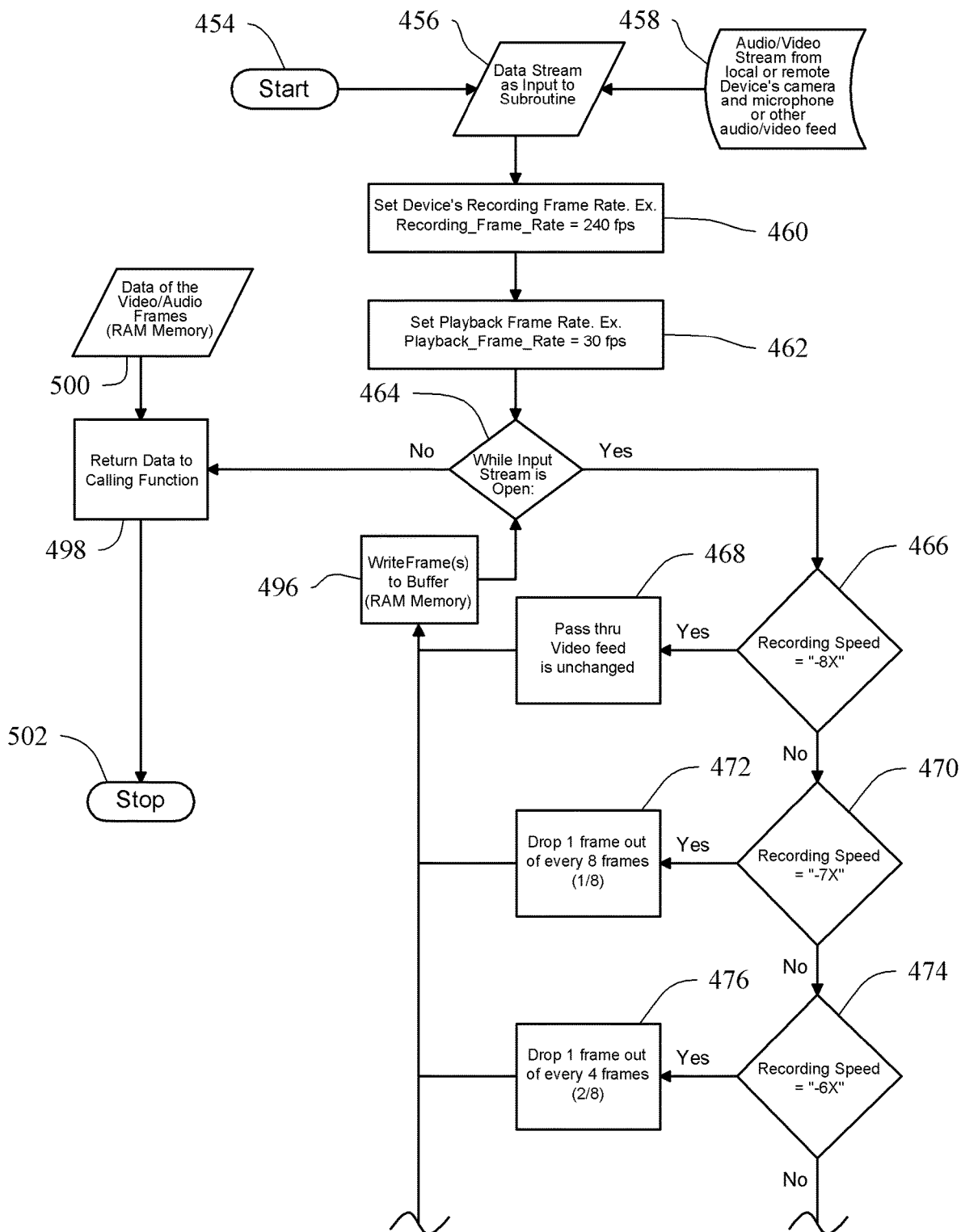
FIG. 18 is a flow chart of an example of the constant high recording fps subroutine (240 fps) for simulating slow motion associated with the present technology.

If is not found that the recording_fps=playback_fps*4, then this subroutine proceeds to step 360 to determine if the recording_fps=playback_fps*8. If so, then it proceeds to step 362 to initiate a constant high frame rate subroutine at 240 fps, as best illustrated in FIG. 18. After which, this subroutine stops or ends (step 368).

If is not found that the recording_fps=playback_fps*8, then this subroutine proceeds to step 364, which is generic for all other cases and initiates a constant high frame rate subroutine at higher fps. After which, this subroutine stops or ends (step 368).

With reference to FIG. 16, an example of the constant high recording fps subroutine (60 FPS) associated with the constant high frame rate subroutine of FIG. 15 is described. This constant high frame rate subroutine can be utilized for simulating slow motion, such as but limited to, slow motion range=recording speed/playback fps=60 fps/30 fps=2.

"Slow motion range" is defined as the multiple factor that a slow motion effect can be created with the record and playback fps settings such that the algorithm does not have to use "frame adding" of any type.

This subroutine starts (step 370) upon initiation by a command from the slow down subroutine. After starting, this subroutine acquires the raw video data stream from the camera as an input (step 372). The raw video data stream can be audio/video stream from the local electronic device including the camera and/or microphone, from a remote device including the camera and/or the microphone, or from other audio/video feeds, as per step 374.

After acquisition of the raw video data stream, step 376 of this subroutine is initiated which set the device's recording frame rate, for example to Recording_Frame_Rate=60 fps. After which, step 378 sets the device's playback frame rate, for example to Playback_Frame_Rate=30 fps.

Step 380 of this subroutine is initiated which determines if the video data input stream from the camera is open. If step 380 determines that the input stream is not open, then this subroutine proceeds to step 398, which returns data to a calling function being step 354 in FIG. 15. Step 398 can receive data of the video/audio frames from RAM memory and/or non-volatile long term memory (step 400). After step 398 is completed, then this subroutine stops or ends (step 402).

While the input stream is open from step 380, this subroutine determines if the recording speed equals "−4×" (step 382). If so then step 384 is initialized which copies each frame in the stream 2 times for a total 3 identical frames, as per FIG. 3E or blended frames as per FIG. 3G. After which, this subroutine proceeds to step 396 to write frame(s) to buffer (RAM memory and/or non-volatile long term memory). After step 396, this subroutine returns to step 380.

If the recording speed does not equal "−4×" (step 382), then this subroutine determines if the recording speed equals "−3×" (step 386). If so then step 388 is initialized which copies each frame in the stream 1 time for a total 2 identical frames, as per FIG. 3D or blended frames as per FIG. 3F. After which, this subroutine proceeds to step 396 to write frame(s) to buffer (RAM memory and/or non-volatile long term memory). After step 396, this subroutine returns to step 380.

If the recording speed does not equal "−3×" (step 386), then this subroutine determines if the recording speed equals "−2×" (step 390). If so then step 392 is initialized which passes thru an unchanged video stream. After which, this subroutine proceeds to step 396 to write frame(s) to buffer (RAM memory and/or non-volatile long term memory). After step 396, this subroutine returns to step 380.

If the recording speed does not equal "−2×" (step 390), then this subroutine will drop 1 of 2 frames (1/2) (step 394) for a recording speed equal to "normal". After which, this subroutine proceeds to step 396 to write frame(s) to buffer (RAM memory and/or non-volatile long term memory). After step 396, this subroutine returns to step 380.

It can be appreciated that this constant high recording fps subroutine (60 FPS) includes a looped subprocess including steps 382-396 until the input stream is determined to not be open in step 380.

With reference to FIG. 17, an example of the constant high recording fps subroutine (120 FPS) associated with the constant high frame rate subroutine of FIG. 15 is described. This constant high frame rate subroutine can be utilized for simulating slow motion, such as but limited to, slow motion range=recording speed/playback fps=120 fps/30 fps=4.

This subroutine starts (step 404) upon initiation by a command from the slow down subroutine. After starting, this subroutine acquires the raw video data stream from the camera as an input (step 406). The raw video data stream can be audio/video stream from the local electronic device including the camera and/or microphone, from a remote device including the camera and/or the microphone, or from other audio/video feeds, as per step 408.

After acquisition of the raw video data stream, step 410 of this subroutine is initiated which sets the device's recording frame rate, for example to Recording_Frame_Rate=120 fps. After which, step 412 sets the device's playback frame rate, for example to Playback_Frame_Rate=30 fps.

Step 414 of this subroutine is initiated which determines if the video data input stream from the camera is open. If step 414 determines that the input stream is not open, then this subroutine proceeds to step 448, which returns data to a calling function being step 358 in FIG. 15. Step 448 can receive data of the video/audio frames from RAM memory and/or non-volatile long term memory (step 450). After step 448 is completed, then this subroutine stops or ends (step 452).

While the input stream is open from step 414, this subroutine determines if the recording speed equals "−8×" (step 416). If so then step 418 is initialized which copies the frame 4 times for a total 5 identical frames or blended frames. After which, this subroutine proceeds to step 446 to write frame(s) to buffer (RAM memory and/or non-volatile long term memory). After step 446, this subroutine returns to step 414.

If the recording speed does not equal "−8×" (step 416), then this subroutine determines if the recording speed equals "−7×" (step 420). If so then step 422 is initialized which copies the frame 3 times for a total 4 identical frames or blended frames. After which, this subroutine proceeds to step 446 to write frame(s) to buffer (RAM memory and/or non-volatile long term memory). After step 446, this subroutine returns to step 414.

If the recording speed does not equal "−7×" (step 420), then this subroutine determines if the recording speed equals "−6×" (step 424). If so then step 426 is initialized which copies the frame 2 times for a total 3 identical frames, as per FIG. 3E or blended frames as per FIG. 3G. After which, this subroutine proceeds to step 446 to write frame(s) to buffer (RAM memory and/or non-volatile long term memory). After step 446, this subroutine returns to step 414.

If the recording speed does not equal "−6×" (step 424), then this subroutine determines if the recording speed equals "−5×" (step 428). If so then step 430 is initialized copies the frame 1 time for a total 2 identical frames, as per FIG. 3D or blended frames as per FIG. 3F. After which, this subroutine proceeds to step 446 to write frame(s) to buffer (RAM memory and/or non-volatile long term memory). After step 446, this subroutine returns to step 414.

If the recording speed does not equal "−5×" (step 428), then this subroutine determines if the recording speed equals "−4×" (step 432). If so then step 434 is initialized which passes thru an unchanged video stream. After which, this subroutine proceeds to step 446 to write frame(s) to buffer (RAM memory and/or non-volatile long term memory). After step 446, this subroutine returns to step 414.

If the recording speed does not equal "−4×" (step 432), then this subroutine determines if the recording speed equals "−3×" (step 436). If so then step 438 is initialized which drops 1 of 4 frames (1/4) (step 438). After which, this subroutine proceeds to step 446 to write frame(s) to buffer (RAM memory and/or non-volatile long term memory). After step 446, this subroutine returns to step 414.

If the recording speed does not equal "−3×" (step 436), then this subroutine determines if the recording speed equals "−2×" (step 440). If so then step 442 is initialized which drops 2 of 4 frames (2/4) (step 442). After which, this subroutine proceeds to step 446 to write frame(s) to buffer (RAM memory and/or non-volatile long term memory). After step 446, this subroutine returns to step 414.

If the recording speed does not equal "−2×" (step 440), then this subroutine will drop 3 of 4 frames (3/4) (step 444) for a recording speed equal to "normal". After which, this subroutine proceeds to step 446 to write frame(s) to buffer (RAM memory and/or non-volatile long term memory). After step 446, this subroutine returns to step 414.

It can be appreciated that this constant high recording fps subroutine (120 FPS) includes a looped subprocess including steps 416-446 until the input stream is determined to not be open in step 414.

With reference to FIG. 18, an example of the constant high recording fps subroutine (240 FPS) associated with the constant high frame rate subroutine of FIG. 15 is described. This constant high frame rate subroutine can be utilized for simulating slow motion, such as but limited to, slow motion range=recording speed/playback fps=240 fps/30 fps=8.

This subroutine starts (step 454) upon initiation by a command from the slow down subroutine. After starting, this subroutine acquires the raw video data stream from the camera as an input (step 456). The raw video data stream can be audio/video stream from the local electronic device including the camera and/or microphone, from a remote device including the camera and/or the microphone, or from other audio/video feeds, as per step 458.

After acquisition of the raw video data stream, step 460 of this subroutine is initiated which set the device's recording frame rate, for example to Recording_Frame_Rate=240 fps. After which, step 462 sets the device's playback frame rate, for example to Playback_Frame_Rate=30 fps.

Step 464 of this subroutine is initiated which determines if the video data input stream from the camera is open. If step 464 determines that the input stream is not open, then this subroutine proceeds to step 498, which returns data to a calling function being step 362 in FIG. 15. Step 498 can receive data of the video/audio frames from RAM memory and/or non-volatile long term memory (step 500). After step 498 is completed, then this subroutine stops or ends (step 502).

While the input stream is open from step 464, this subroutine determines if the recording speed equals "−8×" (step 466). If so then step 468 is initialized which passes thru an unchanged video stream. After which, this subroutine proceeds to step 496 to write frame(s) to buffer (RAM memory and/or non-volatile long term memory). After step 496, this subroutine returns to step 464.

If the recording speed does not equal "−8×" (step 466), then this subroutine determines if the recording speed equals "−7×" (step 470). If so then step 472 is initialized which drops 1 frame out of every 8 frames (1/8). After which, this subroutine proceeds to step 496 to write frame(s) to buffer (RAM memory and/or non-volatile long term memory). After step 496, this subroutine returns to step 464.

If the recording speed does not equal "−7×" (step 470), then this subroutine determines if the recording speed equals "−6×" (step 474). If so then step 476 is initialized which drops 1 frame out of every 4 frames (2/8). After which, this subroutine proceeds to step 496 to write frame(s) to buffer (RAM memory and/or non-volatile long term memory). After step 496, this subroutine returns to step 464.

If the recording speed does not equal "−6×" (step 474), then this subroutine determines if the recording speed equals "−5×" (step 478). If so then step 480 is initialized which drops 3 frame out of every 8 frames (3/8). After which, this subroutine proceeds to step 496 to write frame(s) to buffer (RAM memory and/or non-volatile long term memory). After step 496, this subroutine returns to step 464.

If the recording speed does not equal "−5×" (step 478), then this subroutine determines if the recording speed equals "−4×" (step 482). If so then step 484 is initialized which drops 1 frame out of every 2 frames (4/8). After which, this subroutine proceeds to step 496 to write frame(s) to buffer (RAM memory and/or non-volatile long term memory). After step 496, this subroutine returns to step 464.

If the recording speed does not equal "−4×" (step 482), then this subroutine determines if the recording speed equals "−3×" (step 486). If so then step 488 is initialized which drops 5 frame out of every 8 frames (5/8). After which, this subroutine proceeds to step 496 to write frame(s) to buffer (RAM memory and/or non-volatile long term memory). After step 496, this subroutine returns to step 464.

If the recording speed does not equal "−3×" (step 486), then this subroutine determines if the recording speed equals "−2×" (step 490). If so then step 492 is initialized which drops 3 frame out of every 4 frames (6/8). After which, this subroutine proceeds to step 496 to write frame(s) to buffer (RAM memory and/or non-volatile long term memory). After step 496, this subroutine returns to step 464.

If the recording speed does not equal "−2×" (step 490), then this subroutine will drop 7 frame out of every 8 frames (7/8) (step 494). After which, this subroutine proceeds to step 496 to write frame(s) to buffer (RAM memory and/or non-volatile long term memory). After step 496, this subroutine returns to step 464.

It can be appreciated that this constant high recording fps subroutine (240 FPS) includes a looped subprocess including steps 466-496 until the input stream is determined to not be open in step 464.

Figure 19:
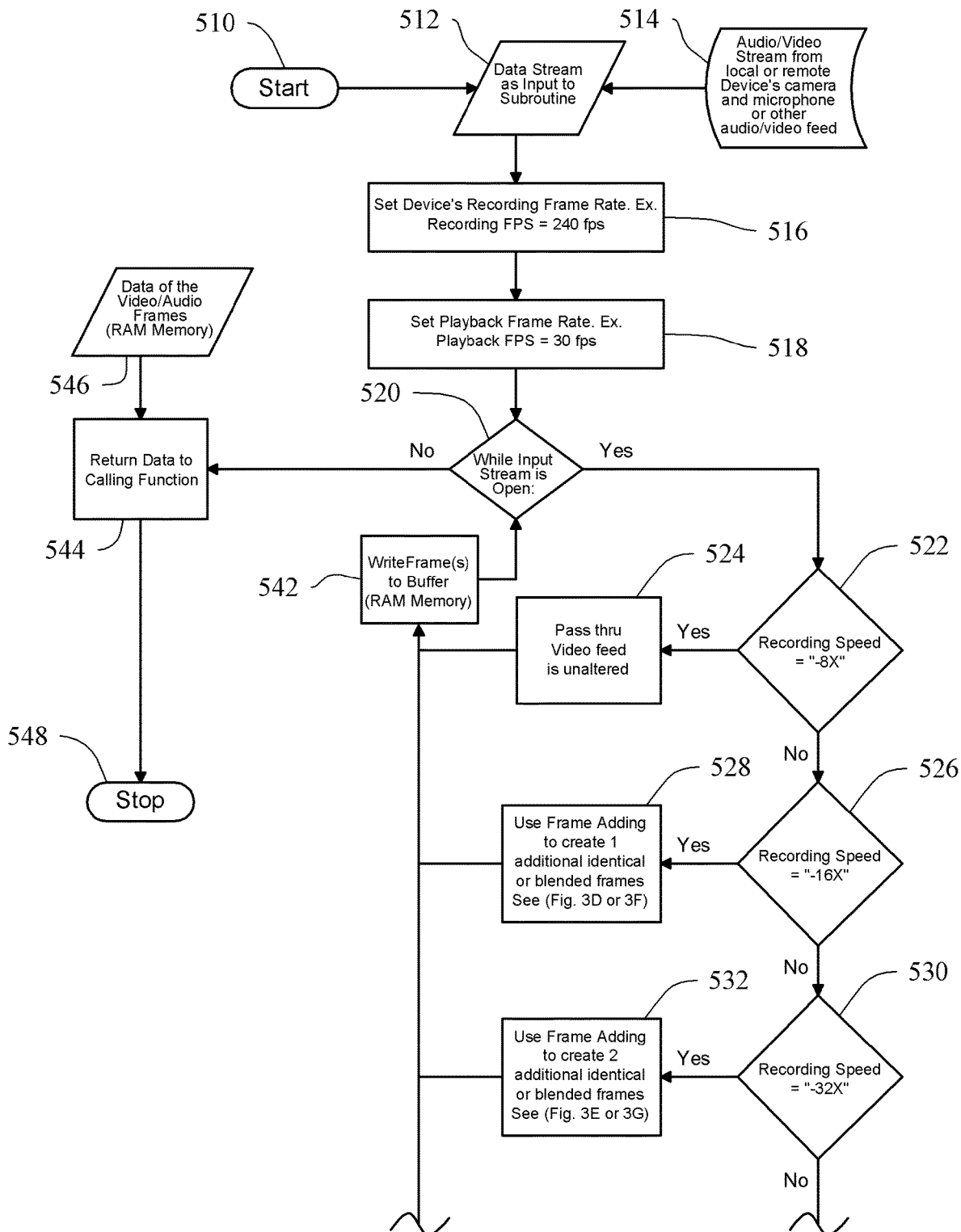
FIG. 19 is a flow chart of an example of extreme slow motion subroutine associated with the present technology.

With reference to FIG. 19, an example of an extreme slow motion at constant high recording fps subroutine (240 FPS) associated with the constant high frame rate subroutine of FIG. 15 is described. This constant high frame rate subroutine can be utilized for simulating extreme slow motion, such as but limited to, slow motion range of −8× to −128× speed. Constant High Recording FPS with Frame Adding Subroutine of FIG. 19 illustrates an exemplary flow chart algorithm for the combination of high frames per second recording rate, "normal" playback frames per seconds, and frame adding to boost the slow motion special effect. This subroutine further illustrates speeds that are >=−8× and perfect multiples of 2, with speeds slower than −8× being best illustrated in FIG. 18.

This subroutine starts (step 510) upon initiation by a command from the slow down subroutine. After starting, this subroutine acquires the raw video data stream from the camera as an input (step 512). The raw video data stream can be audio/video stream from the electronic device, the camera and/or the microphone, as per step 514.

After acquisition of the raw video data stream, step 516 of this subroutine is initiated which set the device's recording frame rate, for example to Recording Frame Rate=240 fps. After which, step 518 sets the device's playback frame rate, for example to Playback Frame Rate=30 fps.

Step 520 of this subroutine is initiated which determines if the video data input stream from the camera is open. If step 520 determines that the input stream is not open, then this subroutine proceeds to step 544, which returns data to a calling function being step 358 in FIG. 15. Step 544 can receive data of the video/audio frames from RAM memory and/or non-volatile long term memory (step 546). After step 544 is completed, then this subroutine stops or ends (step 548).

While the input stream is open from step 520, this subroutine determines if the recording speed equals "−8×" (step 522). If so then step 524 is initialized which passes thru an unaltered/unchanged video stream. After which, this subroutine proceeds to step 542 to write frame(s) to buffer (RAM memory and/or non-volatile long term memory). After step 542, this subroutine returns to step 520.

If the recording speed does not equal "−8×" (step 522), then this subroutine determines if the recording speed equals "−16×" (step 526). If so then step 528 is initialized which copies each frame 1 times for a total of 2 identical frames as per FIG. 3D or blended frames as per FIG. 3F. After which, this subroutine proceeds to step 542 to write frame(s) to buffer (RAM memory and/or non-volatile long term memory). After step 542, this subroutine returns to step 520.

If the recording speed does not equal "−16×" (step 526), then this subroutine determines if the recording speed equals "−32×" (step 530). If so then step 532 is initialized which copies each frame 2 times for a total of 3 identical frames as per FIG. 3E or blended frames as per FIG. 3G. After which, this subroutine proceeds to step 542 to write frame(s) to buffer (RAM memory and/or non-volatile long term memory). After step 542, this subroutine returns to step 520.

If the recording speed does not equal "−32×" (step 530), then this subroutine determines if the recording speed equals "−64×" (step 534). If so then step 536 is initialized which copies each frame 4 times for a total of 5 identical frames or blended frames. After which, this subroutine proceeds to step 542 to write frame(s) to buffer (RAM memory and/or non-volatile long term memory). After step 542, this subroutine returns to step 520.

If the recording speed does not equal "−64×" (step 534), then this subroutine determines if the recording speed equals "−128×" (step 538). If so then step 540 is initialized which copies each frame 8 times for a total of 9 identical frames or blended frames. After which, this subroutine proceeds to step 542 to write frame(s) to buffer (RAM memory and/or non-volatile long term memory). After step 542, this subroutine returns to step 520.

It can be appreciated that this constant high recording fps subroutine (240 FPS) includes a looped subprocess including steps 520-542 until the input stream is determined to not be open in step 520.

With reference to FIG. 20, an example of a segment time compression and expansion subroutine is illustrated and will be described, which provides a flow chart algorithm for slow motion and fast motion by speeding up or slowing down the playback time during video processing after the recording has stopped. Frame adding/dropping can be performed in the time compression/expansion algorithm to simulate the slow motion special effect.

Video files that are created with this algorithm/subroutine can be played normally in all video players and requires no metadata. This is in alternative to other video files created in the present technology.

This subroutine starts (step 550) upon initiation by a command from the slow down subroutine. After starting, this subroutine acquires the raw video data stream from the camera as an input (step 552). The raw video data stream can be audio/video stream from the local electronic device including the camera and/or microphone, from a remote device including the camera and/or the microphone, or from other audio/video feeds, as per step 554.

After acquisition of the raw video data stream, step 556 of this subroutine is initiated which set the device's recording FPS. After which, step 558 sets the playback FPS to less than or equal to (<=) the recording FPS.

Step 560 of this subroutine is initiated which determines if the video data input stream from the camera is open. If step 560 determines that the input stream is not open, then this subroutine proceeds to step 576. Step 576 can receive data of the video/audio frames from RAM memory and/or non-volatile long term memory (step 578). After step 576 is completed, then this subroutine stops or ends (step 580).

While the input stream is open from step 560, this subroutine determines if the speed is less than "normal" (step 562). If so then step 564 is initialized which sets video segment fps to equal the recording fps divided by the speed (Segment FPS=Record_FPS/Speed). After which, this subroutine proceeds to step 574 to write frame(s) to buffer (RAM memory and/or non-volatile long term memory). After step 574, this subroutine returns to step 560.

If the speed is not less than "normal" (step 562), then this subroutine determines if the speed equals "normal" (step 566). If so then step 568 is initialized which sets video segment fps to equal the recording fps (Segment FPS=Record_FPS). After which, this subroutine proceeds to step 574 to write frame(s) to buffer (RAM memory and/or non-volatile long term memory). After step 574, this subroutine returns to step 560.

If the recording speed does not equal "normal" (step 566), then this subroutine determines if the speed is greater than "normal" (step 570). If so then step 572 is initialized which sets video segment fps to equal the recording fps times the speed (Segment FPS=Record_FPS*Speed). After which, this subroutine proceeds to step 574 to write frame(s) to buffer (RAM memory and/or non-volatile long term memory). After step 574, this subroutine returns to step 560.

It can be appreciated that this segment time compression and expansion subroutine includes a looped subprocess including steps 560-574 until the input stream is determined to not be open in step 560.

An example of the segment time compression and expansion subroutine is best illustrated in FIG. 21, which illustrates the results of the algorithm in FIG. 20. The top bar represents the video segments 582 in seconds per video segment in a continuous recording. The recording video segments 582, in seconds, are process by the segment time compression and expansion subroutine. The segments 582 are created when the user/AI changes the speed variable. The time special effects are applied to the raw video segment, and written into the processed video stream RAM, where each segment is either compressed, expanded or unchanged. The resultant playback video segments 584 are then provided in seconds per video segment corresponding to the recording segments time in seconds. With reference to FIG. 22, an example of a variable playback speed record subroutine is illustrated and will be described, which provides a flow chart algorithm for slow motion and fast motion by speeding up or slowing down the playback frame rate while video recording is in progress. This algorithm can produce a normal video with the fast/slow motion commands embedded in the video's metadata. The metadata is data embedded in the video file that does not show up in the video recording.

This subroutine starts (step 590) upon initiation by a command from the slow down subroutine in FIG. 12 (step 264). After starting, this subroutine acquires the raw video data stream from the camera as an input (step 592). The raw video data stream can be audio/video stream from the local electronic device including the camera and/or microphone, from a remote device including the camera and/or the microphone, or from other audio/video feeds, as per step 594.

After acquisition of the raw video data stream, step 596 of this subroutine is initiated which set the device's recording FPS. After which, step 598 sets the playback FPS to less than or equal to (<=) the recording FPS.

Step 600 of this subroutine is initiated which determines if the video data input stream from the camera is open. If step 600 determines that the input stream is not open, then this subroutine proceeds to step 616. Step 616 can receive data of the video/audio frames from RAM memory and/or non-volatile long term memory (step 618). After step 616 is completed, then this subroutine stops or ends (step 620).

While the input stream is open from step 600, this subroutine determines if the speed is less than "normal" (step 602). If so then step 604 is initialized which sets the segment playback fps to equal the recording fps divided by the speed for that video section (Segment FPS=Record_FPS/Speed). After which, this subroutine proceeds to step 614 to write frame(s) to buffer (RAM memory and/or non-volatile long term memory). After step 614, this subroutine returns to step 600.

If the speed is not less than "normal" (step 602), then this subroutine determines if the speed equals "normal" (step 606). If so then step 608 is initialized which sets the segment playback fps to equal the recording fps for that video section (Segment FPS=Record_FPS). After which, this subroutine proceeds to step 614 to write frame(s) to buffer (RAM memory and/or non-volatile long term memory). After step 614, this subroutine returns to step 600.

If the recording speed does not equal "normal" (step 606), then this subroutine determines if the speed is greater than "normal" (step 610). If so then step 612 is initialized which sets the segment playback fps to equal the recording fps times by the speed for that video section (Segment FPS=Record_FPS*Speed). After which, this subroutine proceeds to step 614 to write frame(s) to buffer (RAM memory and/or non-volatile long term memory). After step 614, this subroutine returns to step 600.

It can be appreciated that this segment time compression and expansion subroutine includes a looped subprocess including steps 600-614 until the input stream is determined to not be open in step 600.

Figure 23:
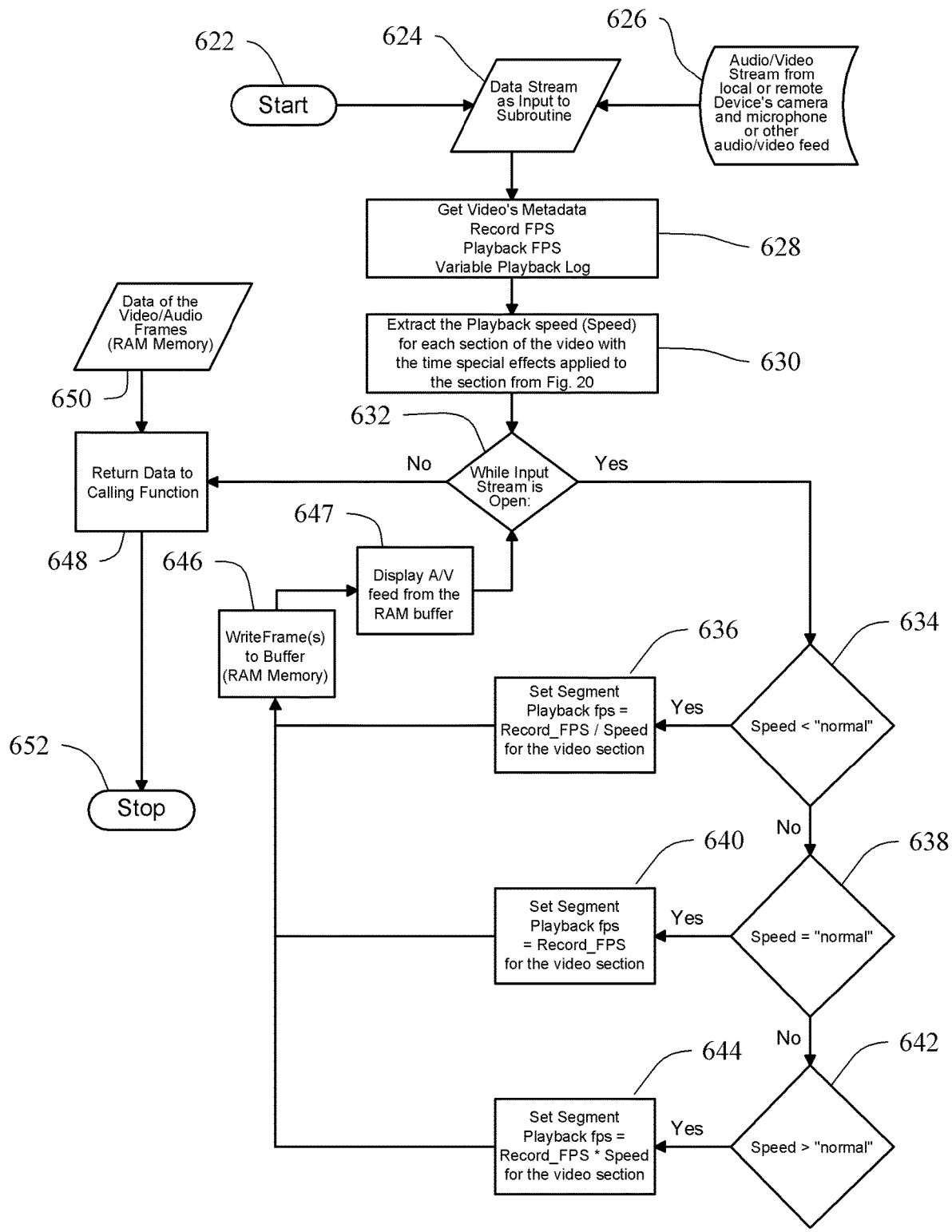
FIG. 23 is a flow chart of an example of a playback device playing a video file created by an application employing the algorithm in FIG. 22 to simulate slow motion and fast motion associated with the present technology.

With reference to FIG. 23, an example of a variable playback speed playback subroutine is illustrated and will be described, which provides a flow chart algorithm for playing a video file with slow motion and fast motion special effects by speeding up or slowing down the playback frame rate while video playback is in progress. An application employing the algorithm in FIG. 23 is required to play a video produced by the algorithm in FIGS. 20 and 21. This application must be capable of decoding the information in the metadata and/or an accompanying "video project file" and applying the speed up and slow down commands to the playback frame rate while the video is playing. A video project contains the video file plus an accompanying file that has the special effects commands to be executed, that a custom player can decode and apply in real-time playback.

If the video is played with an incompatible player, then the speed up and slow down special effects commands in the metadata are ignored and the video plays continuously in the same speed.

This subroutine starts (step 622) upon initiation by a command from the slow down subroutine. After starting, this subroutine acquires the raw video data stream from the video project file residing in device's memory as an input (step 624). The raw video data stream can be audio/video stream in the video project file from the electronic device, or remote video project files, as per step 626.

After acquisition of the raw video data stream, step 628 of this subroutine is initiated which gets the video's metadata, record FPS, playback FPS and variable playback log. After which, step 630 extracts the playback speed (Speed) for each section of the video with the time special effects applied to the section from FIG. 20.

Step 632 of this subroutine is initiated which determines if the video data input stream from the camera is open. If step 632 determines that the input stream is not open, then this subroutine proceeds to step 648. Step 648 can receive data of the video/audio frames from RAM memory and/or non-volatile long term memory (step 950). After step 648 is completed, then this subroutine stops or ends (step 652).

While the input stream is open from step 632, this subroutine determines if the speed is less than "normal" (step 634). If so then step 636 is initialized which sets the segment playback fps to equal the recording fps divided by the speed for that video section (Segment FPS=Record_FPS/Speed). After which, this subroutine proceeds to step 646 to write frame(s) to buffer (RAM memory and/or non-volatile long term memory). The subroutine then proceeds to step 647 which displays the Audio/Video feed from the RAM buffer, and after which continues to step 632.

If the speed is not less than "normal" (step 634), then this subroutine determines if the speed equals "normal" (step 638). If so then step 340 is initialized which sets the segment playback fps to equal the recording fps for that video section (Segment FPS=Record_FPS). After which, this subroutine proceeds to step 646 to write frame(s) to buffer (RAM memory and/or non-volatile long term memory). After step 646, this subroutine returns to step 632.

If the recording speed does not equal "normal" (step 638), then this subroutine determines if the speed is greater than "normal" (step 642). If so then step 644 is initialized which sets the segment playback fps to equal the recording fps times by the speed for that video section (Segment FPS=Record_FPS*Speed). After which, this subroutine proceeds to step 646 to write frame(s) to buffer (RAM memory and/or non-volatile long term memory). After step 646, this subroutine continues to step 647 to display the audio/video (NV) feed from the RAM buffer, and then returns to step 632.

It can be appreciated that this segment time compression and expansion subroutine includes a looped subprocess including steps 632-647 until the input stream is determined to not be open in step 632.

A possible method of using the present technology is illustrated in FIG. 24. A user can launch an application software (App) on a device capable of running the App, utilizing a user interface of the present technology. The App can open in an image composition screen, which can be as a default setting. Favorite or predetermined settings can optionally be selectable by the user. Device settings are applied and the device is in a ready state, while optionally still in the image composition screen.

The user can the start recording, utilizing the device's camera, a remote camera or a remote video stream, by touching or activating a "Record" icon associated with the App or user interface. Optionally, the user can touch and hold the Record icon or button continuously to continue recording. One aspect can be that the icon or a button associated with the icon can be animated to indicate a live recording is active.

While the recording is in progress, the user can enter special effect commands being to zoom in or zoom out. The video being displayed by the device is configured or configurable to show the zooming in or out special effect associated with the video in real time.

While the recording is in progress, the user can enter special effect commands being to create slow motion and/or fast motion. One aspect is that there is no difference in the speed of the display of the live video on the device.

The user can end recording by releasing or removing the touching of the Record icon or button. After which, the App stops recording, displays a "Review" screen, completes processing the special effect, and provides an option to save or autosave the processed video.

After saving, the newly produced video can be viewed by the device or a remote device after the processing has been completed. The video can play continuously and restart after ending. The App can provide a suite of editing tools that can be utilized to further edit or modify the raw or processed video. Optionally, the video can be edited to fine tune the slow motion and fast motion effects, along with other custom design elements, and post the video. This process can be repeated until a desired video result is created.

The App completes processing any new elements in the video and play back to the user after each edit is completed. This process can be repeated until a desired video result is created.

After processing the video and/or any additional editing to the video is complete, the App can save a final video or edit. The App can save the final video to the device's internal memory, to an external memory and/or to the cloud.

The App can further provide an option allowing the user to post the final video to social media platform. The App can upload the final video onto additional platforms and/or clouds, and display the composition screen allowing the user to start recording a new video. In some embodiments, the App can allow the user of the device to post the video to the user's story or social media page within the app or shared externally to other social media apps like Instagram®, Facebook®, Twitter®, etc.

Figure 25:
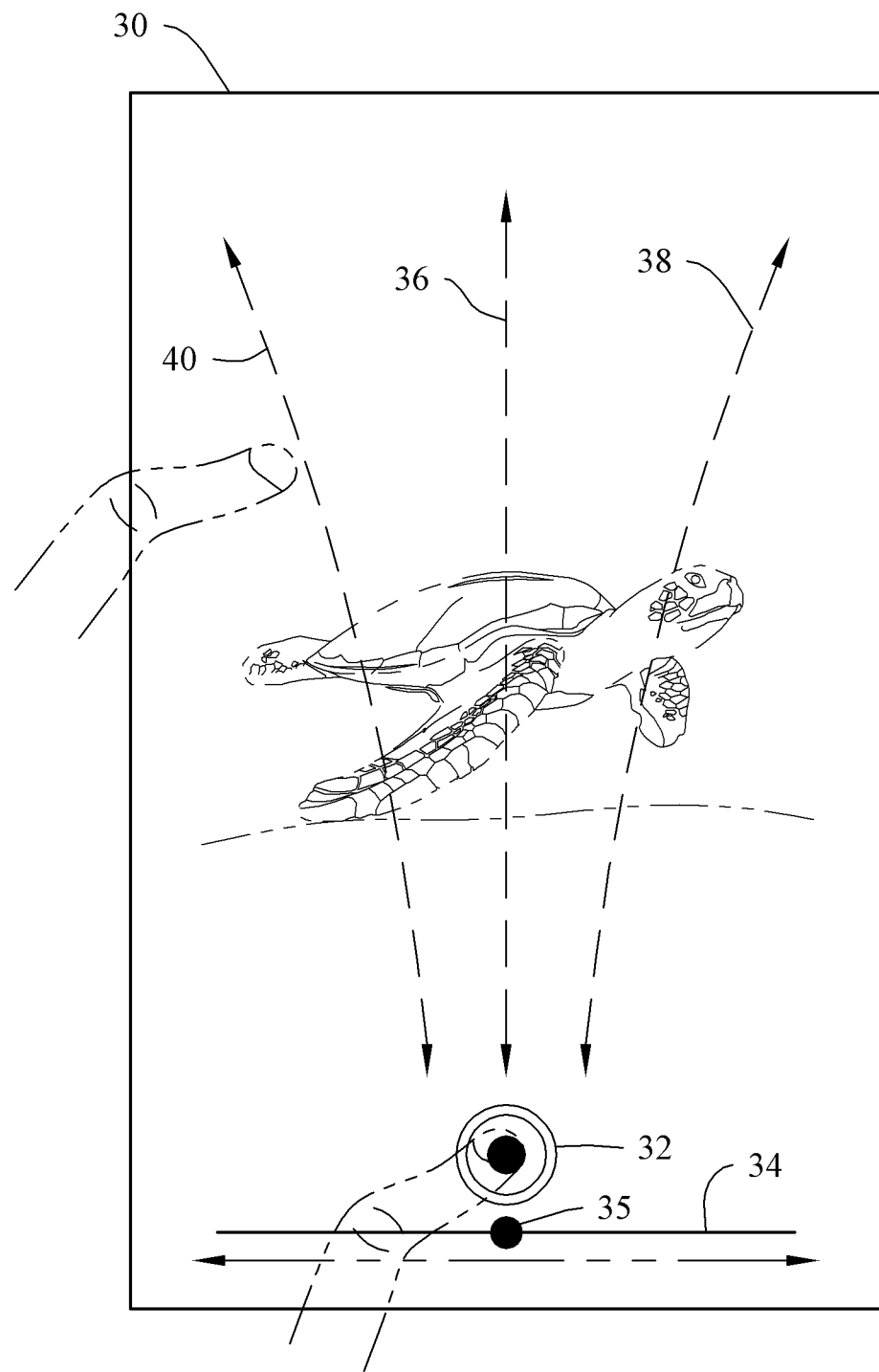
FIG. 25 is a sample graphical user interface (GUI) screen-shot of the interface system of the present technology.

With reference to FIG. 25, at least a portion of the interface 30 is described. The interface 30 can be, but not limited to, a GUI interface capable of providing a screen for device optimized parameters or variables. The GUI 30 can be configured or configurable to include a recording start/stop control 32 provided anywhere on the screen, and a speed selection region 34 provided anywhere on the screen that can provide a default or predefined frame rate speed that is used to manipulate the frame in the raw video data from the camera 12. The speed selection region 34 can include a speed control indicator 35 that can travel along the speed selection region 34 via control by the user to indicate the current or selectable speed. The GUI interface 30 can also include regions anywhere on the screen for controlling zoom 36, zoom and fast motion speed rate 38, and/or zoom and slow motion speed rate 40. In another example, the GUI interface 30 can provide the user an ability to use a "pinch-to-zoom" operation, where the user uses a multi-touch gesture to quickly zoom in and out, while the "zoom factor" adjusts up and down accordingly.

In some embodiment, a user can touch and/or hold the start/stop control 32 to initiate, stop or pause the recording function of the camera. Additionally, a user can interact with the speed selection region 34 by touching the region with a finger or stylus-like device, and making a sliding motion along the region in any direction. The processing unit can be configured or configurable to interpret this sliding movement as a special effect input command. For example, sliding from a central area of the speed selection region 34 toward the right could change the speed rate from the native speed rate to 2×, 3×, 4×, "n"× the native speed rate, depending on how far right the sliding motion travels on the speed selection region 34. Sliding from the central area of the speed selection region 34 toward the left could change the speed rate from the native speed rate to −2×, −3×, −4×, −"n"× the native speed rate, depending on how far left the sliding motion travels on the speed selection region 34.

In some embodiments, a user could control the zoom function of the camera by making a vertical sliding motion from a lower region of the GUI toward an upper region. A user could further control a combination of zoom and speed rate by making a curving vertical sliding motion from a lower region of the GUI toward an upper right or left region, depending if a zoom and fast motion or slow motion effect is desired.

Alternatively, the GUI interface 30 can be configured or configurable to include areas, icons or windows where functions, attributes, operations, settings and/or characteristics of the camera and/or display can be controlled. Examples of these functions, attributes, operations, settings and/or characteristics can be, but not limited to, flash, hands free, timer, mute, selfie, broadcast, sharing, filters, media, stop/start recording, and the like. The GUI interface 30 can be configured or configurable to be used to preset a minimum, a maximum or a range of the speed rate of the raw video.

Still further and optionally, the GUI interface 30 can be configured or configurable to include areas, icons or windows providing editing options to the video data stream. The editing options can include, but not limited to, adding text, adding drawings, adding sounds, face filters, adding decorations, creating a video loop, adding a cover, and the like.

The GUI interface 30 can be configured or configurable to include a display of the output video recording data, which can be the raw video data and/or the modified video data, or the edited video data stream can be displayed. It can be appreciated that the output video recording data displayed by the GUI interface 30 can be dynamically changing in real time due to changes in the input. Thus, the present technology can display, in real time, a seamless transition between the raw video data, any number of the modified video data or subsets thereof, while the camera acquires the video and while recording is in progress. The modified video data can include any number of fast to slow motion subsets, and these subsets can be in combination with subsets of the raw video data. The displaying of the raw video data and/or any number of modified video data is accomplished live or in real time as the camera is capturing images associated with the raw video data. It can be appreciated that the present technology renders the displayed output video data as the camera captures the images and while the output video is written to memory. Consequently, allowing the user to move, pan, zoom, etc. the camera while still capturing the video and at the same time applying and displaying any number of special effects to the raw video data.

In use, it can now be understood that a user could initiate a camera operation using an electronic device that includes or is operably associated with the present technology software application, or the user could initiate camera operation using present technology software application that is operably associated with the camera.

Upon operation of the present technology software application, a user interface is provided to the user for controlling the functions of the present technology software application and/or the camera.

The user can initiate a recording function of the camera using the interface, at which time the present technology software application would receive any raw video data from the camera or remote video feed, which can be associated with a microphone or a peripheral microphone(s). During this operation, the raw video data from the camera and/or microphone is diverted to the present technology software application instead of a memory unit, which would normally receive the raw data from the camera.

The interface provides a simple input from the user to control the recording speed rate of the raw video data received from the camera. For exemplary purposes, this input by the user on the interface can be movement across a portion of a touchscreen or pressure applied to a portion of the touchscreen. It can be appreciated that this input can come in a variety of forms such as, but not limited to, movement of a cursor, voice commands, activation of icons, operation of switches or buttons, on-screen gestures, infrasonic devices, and the like.

If the user does not provide input to change the speed rate, then the raw video data from the camera is displayed and is written to memory.

In some embodiments, the user can utilize a "One-Touch" mode to manipulate the video's time. In this mode, recording operation can be initiated by touching the screen, and taking a finger off the screen will stop recording operation. Alternatively, recording is in operation while touching the screen. Exemplary operation can include: moving the touching finger to the left of a middle of the screen will slow down video's time; moving the touching finger to the middle of screen returns video's time to normal speed; moving the touching finger to the right left of the middle of the screen will speed up video's time; the touching finger can quickly go from extreme left to extreme right (and vice-versa); moving the touching finger up will initiate a zoom in (telephoto) operation; moving the touching finger down will initiate a zoom out (wide angle) operation; and adjusting other settings separately live, such as but not limited to, flash, mute, etc., with other finger while recording is in progress and while the touching finger is on the screen.

Still further, some embodiments can include a "Multiple Touch" mode that allows the user to individually select functions through user interface whilst video is being recorded is shown in the user interface.

In some embodiments, a "Hands-Free" mode can be utilized, for example, the user can tap the speed marker or indicator 35 or slide the indicator 35 to a desired speed location on the speed selection region 34.

Still further, a "Hands-On" mode can be utilized, for example, the user can press and hold the "Record" button 32 and slide his finger to the left and the button follows directly under the user's finger, so that the button is vertically above the "−2×" affordance label in this example. It can be appreciated that the speed indicator 35 can automatically move along the speed selection region 34 to follow the movement of the "Record" button 32. Thus, it can be appreciated that in the "Hands-On" mode, the speed indicator 35 located on the speed selection region 34 moves accordingly with movement of the "Record" button 32.

Alternatively, if the user does provide input to change the speed rate, then the raw video data is processed using the present technology software application and its associated algorithms in real time. The raw video data includes one or more frames, and these frames processed to create in a final video data stream that corresponds to the speed rate inputted by the user.

This is accomplished utilizing the present technology software application to create a modified video data stream. This modified video data stream can be created by dropping specifically identified frames from the raw video data or adding frames to the raw video data by copying specially identified frames and adding these copied frames adjacent to their original frame or by "frame blending", which interpolates one or more frames in between two reference frames. The number of dropped frames or added frames can be determined and repeated by the present technology software application until the desired speed rate is achieved.

The present technology software application can then write the raw video data or the modified video data stream to memory, thereby providing to be displayed a video in a normal speed rate, a fast motion speed rate or a slow motion speed rate.

It can be appreciated that the speed rate of the video is not modified after writing to memory, thereby recording the video in real time with or without special effects and omitting the need for postproduction editing to change the video speed rate.

The present technology can be configured or configurable so that the algorithm creates a smoother time modification of the video data stream. For example, the algorithm could fill in video gaps when the user jumps from one speed to another. The algorithm can interpolate data between two or more data points, thus creating even more smoothness, for example, when going from −3× slow to 4× fast.

During playback, the video can be very abrupt. This can be algorithmically corrected to smooth out the video to enhance the viewer's experience with perceived higher resolution during the transition into the beginning of each special effect, during each special effect and the transition from the special effect to normal time—occurring while the user is moving around and panning the camera as a user would need while capturing special moments (peak moments) in an active sporting event.

An example of "Peak moment" is when an object being videoed jumps, it is the instant where there is no more upward momentum, but the person has not yet begun to fall. Artificial intelligence (AI) can be utilized to calculate "peak moment" of the action in a scene being recorded, and take a predetermined desired action, such as using slow motion slightly before and slightly after the "peak moment".

The present technology can be embedded to any camera device, such as action cameras like GoPro®, DSLR's, mirrorless cameras, Pro Level video gear, gimbals, tripods, on the camera and remotely triggered flash lighting, eye glass cameras, drones, webcams. The present technology can be embedded into remote controls and connected through Bluetooth® or other protocols, to existing electronic gear that does not have the present technology embedded.

The user interface of the present technology can be represented in 3-D or 2-D. The user can slide a finger or stylus side to side on the touchscreen of the electronic device in one plane of motion. With a 3-D user interface, the electronic device can sense the changes in depth of the user's controllers, the amount of pressure the user is applying, and adjust the special effects appropriately. Joysticks can be employed and utilized with the present technology.

The user interface could be pressure sensitive so that the user could press harder or softer on the device and the device would interpret these as controls to modify the playback speed with the fast forward and slow motion special effects.

The present technology can allow for recording at sufficiently high frames per seconds with the resulting "raw" unedited video (recorded with no special effects applied) can be edited post recording, and the slow motions will remain smooth because the high recording frame rate supports it relative to a slower playback fps.

It can be appreciated that brainwave sensing devices, implanted or surface attachment, or wireless remote sensing, can be utilized with the present technology to directly control the time speed special effects with a thought.

Compression technology can be utilized with the present technology to improve recording at even higher frame rate to record finer details in the scenery and reduce file size. Device performance can improve and users can therefore record at even higher frame rate to record finer details in the scenery while reducing the file size.

Audio processing algorithms can be utilized with the present technology to give the clearest and most understandable audios to the videos during segments where the scene speeds up and slows down. Third party API's from companies such as Dolby Labs, DTS, Inc., Fraunhofer Institut, Philips, Technicolor, IMAX, Sony, and others can be utilized to perform the audio processing.

Data encryption algorithms can be utilized with the present technology to provide secure transmission and storage of the videos.

Cryptography and blockchain technology algorithms can be utilized with the present technology to create a distributed ledger to record the original content creator of the videos produced with the present technology. The videos can be accessed by requiring cryptographic tokens to be "redeemed" for access permission.

While embodiments of the real time video special effects system and method have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above described. And although creating special effects in video recordings while recording is in progress have been described, it should be appreciated that the real time video special effects system and method herein described is also suitable for change frame attributes, change record frame rate, change playback frame rate, and time compression and expansion and other real-time special effects associated with any data stream in real time.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

What is claimed as being new and desired to be protected by Letters Patent of the United States is as follows:

1. A non-transitory computer readable medium embodying a set of executable instructions, the set of executable instructions to manipulate a control component to:

receive raw video data from a camera in real time;
receive at least one input;
determine if the input is associated with changing the native speed rate of the raw video data;
in response to determining the input is associated with changing the native speed rate of the raw video data, modify at least one frame in the raw video data to create modified video data at one or more modified speed rate that is different to the native speed rate in real time with receiving the raw video data from the camera.

2. The non-transitory computer readable medium of claim 1, wherein the set of executable instructions include further instructions to preclude the raw video data from being written to the memory from the camera.

3. The non-transitory computer readable medium of claim 1, wherein the modified speed rate is selected from one of less than the native speed rate, and greater than the native speed rate.

4. The non-transitory computer readable medium of claim 3, wherein the set of executable instructions include further instructions to add at least one new frame to the raw video data to create the modified video data when the modified speed rate is less than the native speed rate.

5. The non-transitory computer readable medium of claim 3, wherein the set of executable instructions include further instructions to remove the frame from the raw video data to create the modified video data when the modified speed rate is greater than the native speed rate.

6. The non-transitory computer readable medium of claim 1, wherein the set of executable instructions include further instructions to receive at least one input from an interface, and to determine if the input is associated with changing the native speed rate to the modified speed rate.

7. The non-transitory computer readable medium of claim 6,
wherein the set of executable instructions include further instructions to:
display in real time with receiving the raw video data from the camera live video from the raw video data;
receive, while said at least one frame in the raw video data is being displayed in the live video, the at least one input from the interface.

8. The non-transitory computer readable medium of claim 7, wherein the camera and the interface are incorporated in a same electronic device or the camera is remote from the electronic device, wherein the electronic device comprises a smartphone, computer, personal digital assistant (pda) or tablet device.

9. A method for controlling a special effects operation of video data in real time, the method comprising:
receiving a request to acquire video data at a first speed rate in real time, wherein the video data corresponds to at least images captured by a camera;
receiving at least one request to change the first speed rate of the video data to one or more modified speed rate;
upon receiving a request to change the first speed rate, identifying at least one frame or location in the video data to be modified, and modifying the frame or location to create modified video data at the modified speed rate that is different to the first speed rate in real time with receiving the video data.

10. The method according to claim 9, further comprising precluding the video data from being written to the memory from the camera.

11. The method according to claim 9, wherein the modified speed rate is selected from one of less than the first speed rate, and greater than the first speed rate.

12. The method according to claim 11, further comprising adding at least one new frame to the video data to create the modified video data when the modified speed rate is less than the first speed rate.

13. The method according to claim 11, further comprising removing the frame from the video data to create the modified video data when the modified speed rate is greater than the first speed rate.

14. The method according to claim 9, further comprising receiving at least one input from an interface and determining whether the input is associated with changing the first speed rate to the modified speed rate.

15. The method of claim 14, the method further comprising:
displaying in real time with receiving the raw video data from the camera live video from the raw video data;
receiving, while said at least one frame in the raw video data is being displayed in the live video, the at least one input from the interface.

16. A non-transitory computer readable medium embodying a set of executable instructions, the set of executable instructions to manipulate a control component to:
receive a request to acquire video data at a first speed rate in real time, wherein the video data corresponds to at least images captured by a camera;
receive at least one request to change the first speed rate of the video data to one or more modified speed rate;
upon receiving a request to change the first speed rate, identify at least one frame or location in the video data to be modified, and modifying the frame or location to create modified video data at the modified speed rate that is different to the first speed rate in real time with receiving the video data.

17. The non-transitory computer readable medium of claim 16, wherein the set of executable instructions include further instructions to preclude the video data from being written to the memory from the camera.

18. The non-transitory computer readable medium of claim 16, wherein the modified speed rate is selected from one of less than the first speed rate, and greater than the first speed rate.

19. The non-transitory computer readable medium of claim 18, wherein the set of executable instructions include further instructions to add at least one new frame to the video data to create the modified video data when the modified speed rate is less than the first speed rate.

20. The non-transitory computer readable medium of claim 18, wherein the set of executable instructions include further instructions to remove the frame from the video data to create the modified video data when the modified speed rate is greater than the first speed rate.

21. The non-transitory computer readable medium of claim 16, wherein the set of executable instructions include further instructions to receive at least one input from an interface and determine whether the input is associated with changing the first speed rate to the modified speed rate.

22. The non-transitory computer readable medium of claim 21,
wherein the set of executable instructions include further instructions to:
display in real time with receiving the raw video data from the camera live video from the raw video data;
receive, while said at least one frame in the raw video data is being displayed in the live video, the at least one input from the interface.

* * * * *